United States Patent
Gopalan et al.

(10) Patent No.: US 9,456,383 B2
(45) Date of Patent: Sep. 27, 2016

(54) DEVICE AND METHOD FOR ADAPTIVE RATE MULTIMEDIA COMMUNICATIONS ON A WIRELESS NETWORK

(71) Applicant: QUALCOMM Incorporated, San Diego, CA (US)

(72) Inventors: Rahul Gopalan, Sunnyvale, CA (US); Hyukjune Chung, San Diego, CA (US); Prasanjit Panda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 13/973,885

(22) Filed: Aug. 22, 2013

(65) Prior Publication Data

US 2014/0056162 A1 Feb. 27, 2014

Related U.S. Application Data

(60) Provisional application No. 61/693,469, filed on Aug. 27, 2012, provisional application No. 61/814,720, filed on Apr. 22, 2013.

(51) Int. Cl.
*H04L 12/26* (2006.01)
*H04N 7/26* (2006.01)
(Continued)

(52) U.S. Cl.
CPC .......... *H04W 28/10* (2013.01); *H04L 43/0876* (2013.01); *H04L 47/263* (2013.01);
(Continued)

(58) Field of Classification Search
CPC . H04L 43/0876; H04L 28/10; H04L 47/263; H04L 47/30; H04L 47/38; H04N 19/00193; H04N 19/166; H04N 19/17; H04N 21/2343; H04N 21/23805; H04N 21/44209; H04N 21/6373; H04N 21/6582; H04N 19/115; H04N 19/164; H04W 8/10; H04W 28/10
USPC ........................................................ 370/252
See application file for complete search history.

(56) References Cited

U.S. PATENT DOCUMENTS 6,359,883 B1  3/2002  Lechleider
6,438,702 B1  8/2002  Hodge
(Continued)

FOREIGN PATENT DOCUMENTS

CN  102595093 A  7/2012
WO  WO-0178489 A2  10/2001

OTHER PUBLICATIONS

Kanakia H., et al., "An Adaptive Congestion Control Scheme for Real Time Packet Video Transport", IEEE / ACM Transactions on Networking, IEEE / ACM, New York, NY, US, vol. 3, No. 6, Dec. 1, 1995, pp. 671-682, XP000544171, ISSN: 1063-6692.
(Continued)

*Primary Examiner* — Andrew Chriss
*Assistant Examiner* — Ellen A Kirillova
(74) *Attorney, Agent, or Firm* — Knobbe Martens Olson & Bear LLP

(57) ABSTRACT

Methods, apparatus, and computer readable media may adjust an encoding rate based on network conditions between a transmitter and a receiver. Either the transmitter, receiver, or both the transmitter and receiver may determine the encoding rate. In one aspect, a ratio of received network data to transmitted network data is determined. An encoding parameter is then determined based on the determined ratio. In one aspect, the encoding parameter may be used to adjust an encoder. In another aspect, the determined encoding parameter may be transmitted to an encoding or transmitting node. In another aspect, an amount of data buffered in a network is determined. A sustainable throughput of the network is also determined. A transmission rate is then determined based on the sustainable throughput and the amount of data buffered. An encoding parameter is then adjusted based on the transmission rate.

20 Claims, 23 Drawing Sheets

(51) Int. Cl.

| | | |
|---|---|---|
| *H04W 28/10* | (2009.01) | |
| *H04W 8/00* | (2009.01) | |
| *H04L 12/811* | (2013.01) | |
| *H04L 12/825* | (2013.01) | |
| *H04L 12/835* | (2013.01) | |
| *H04N 21/2343* | (2011.01) | |
| *H04N 21/238* | (2011.01) | |
| *H04N 21/2662* | (2011.01) | |
| *H04N 21/442* | (2011.01) | |
| *H04N 21/6373* | (2011.01) | |
| *H04N 21/658* | (2011.01) | |
| *H04N 19/115* | (2014.01) | |
| *H04N 19/164* | (2014.01) | |
| *H04N 19/166* | (2014.01) | |
| *H04N 19/17* | (2014.01) | |

(52) U.S. Cl.
CPC ........... *H04L 47/30* (2013.01); *H04L 47/38* (2013.01); *H04N 19/115* (2014.11); *H04N 19/164* (2014.11); *H04N 19/166* (2014.11); *H04N 19/17* (2014.11); *H04N 21/2343* (2013.01); *H04N 21/23805* (2013.01); *H04N 21/2662* (2013.01); *H04N 21/44209* (2013.01); *H04N 21/6373* (2013.01); *H04N 21/6582* (2013.01); *H04W 8/00* (2013.01)

(56) References Cited

U.S. PATENT DOCUMENTS

| | | |
|---|---|---|
| 6,445,679 B1 | 9/2002 | Taniguchi et al. |
| 6,894,974 B1 | 5/2005 | Aweva et al. |
| 7,058,431 B2 | 6/2006 | Sasaki |
| 7,120,090 B2 | 10/2006 | Smith et al. |
| 7,225,267 B2 | 5/2007 | Key et al. |
| 7,251,241 B1 | 7/2007 | Jagadeesan et al. |
| 7,260,153 B2 | 8/2007 | Nissani et al. |
| 7,581,019 B1 | 8/2009 | Amir et al. |
| 7,787,438 B2 | 8/2010 | Dowse |
| 7,962,637 B2 | 6/2011 | Su et al. |
| 7,974,233 B2 | 7/2011 | Banerjee |
| 7,975,063 B2 | 7/2011 | Lefebvre |
| 8,009,687 B2 | 8/2011 | Chew et al. |
| 8,166,186 B2 | 4/2012 | Inokuchi |
| 8,175,167 B2 | 5/2012 | Bouton et al. |
| 8,279,968 B2 | 10/2012 | Lindblom et al. |
| 8,281,356 B2 | 10/2012 | Ohno et al. |
| 8,306,058 B2 | 11/2012 | Bai et al. |
| 8,774,233 B1 * | 7/2014 | Loc et al. ............ 370/519 |
| 2002/0040396 A1 * | 4/2002 | Yoshihara et al. ....... 709/225 |
| 2002/0129290 A1 | 9/2002 | Couillard |
| 2002/0136164 A1 | 9/2002 | Fukuda et al. |
| 2005/0030887 A1 | 2/2005 | Jacobsen et al. |
| 2005/0100100 A1 | 5/2005 | Unger et al. |
| 2005/0281198 A1 | 12/2005 | Miyamoto et al. |
| 2007/0053446 A1 | 3/2007 | Spilo |
| 2007/0091815 A1 | 4/2007 | Tinnakornsrisuphap et al. |
| 2007/0091816 A1 | 4/2007 | Lee et al. |
| 2007/0200738 A1 | 8/2007 | Reznik et al. |
| 2007/0233764 A1 | 10/2007 | Reznik et al. |
| 2007/0260850 A1 | 11/2007 | Kameyama et al. |
| 2008/0084925 A1 | 4/2008 | Rozen et al. |
| 2008/0101466 A1 | 5/2008 | Swenson et al. |
| 2008/0186849 A1 | 8/2008 | Kampmann et al. |
| 2008/0192710 A1 | 8/2008 | Balachandran et al. |
| 2008/0212599 A1 | 9/2008 | Chen et al. |
| 2008/0260042 A1 | 10/2008 | Shah et al. |
| 2009/0034610 A1 | 2/2009 | Lee et al. |
| 2009/0046595 A1 | 2/2009 | Clark |
| 2009/0154353 A1 | 6/2009 | Loiacono et al. |
| 2009/0180379 A1 | 7/2009 | Leung et al. |
| 2010/0082834 A1 | 4/2010 | Joung et al. |
| 2010/0098033 A1 * | 4/2010 | Lee ................. H04W 8/00 370/338 |
| 2010/0098047 A1 | 4/2010 | Zhou et al. |
| 2010/0124275 A1 | 5/2010 | Yeh et al. |
| 2010/0135332 A1 | 6/2010 | Siemens et al. |
| 2010/0195548 A1 * | 8/2010 | Navda et al. ........... 370/311 |
| 2011/0060792 A1 | 3/2011 | Ebersviller |
| 2011/0228845 A1 | 9/2011 | Banerjee |
| 2011/0276710 A1 | 11/2011 | Mighani et al. |
| 2011/0286560 A1 | 11/2011 | Pignatelli |
| 2011/0307604 A1 | 12/2011 | Wakuda |
| 2012/0005361 A1 | 1/2012 | Knittle |
| 2012/0039332 A1 | 2/2012 | Jackowski et al. |
| 2012/0120254 A1 * | 5/2012 | Tan ............. H04N 21/23805 348/184 |
| 2012/0120813 A1 | 5/2012 | Johansson et al. |
| 2012/0151009 A1 | 6/2012 | Bouazizi et al. |
| 2012/0230390 A1 | 9/2012 | Akkor |
| 2012/0307886 A1 | 12/2012 | Agarwal et al. |
| 2012/0311168 A1 | 12/2012 | Dougan et al. |
| 2012/0314761 A1 | 12/2012 | Melnyk et al. |
| 2012/0327789 A1 | 12/2012 | Grenier et al. |
| 2013/0010858 A1 | 1/2013 | Kishigami et al. |
| 2013/0111060 A1 | 5/2013 | Nilsson et al. |
| 2014/0056145 A1 | 2/2014 | Gopalan et al. |
| 2014/0059167 A1 | 2/2014 | Gopalan et al. |
| 2014/0071819 A1 | 3/2014 | Gopalan et al. |

OTHER PUBLICATIONS

Bridges P.G., et al., "Cholla: A Framework for Composing and Coordinating Adaptations in Networked Systems", IEEE Transactions on Computers, IEEE Service Center, Los Alamitos, CA, US, vol. 58, No. 11, Nov. 1, 2009, pp. 1456-1469, XP011268282, ISSN: 0018-9340.

International Search Report and Written Opinion—PCT/US2013/056498—ISA/EPO—Apr. 1, 2014.

\* cited by examiner

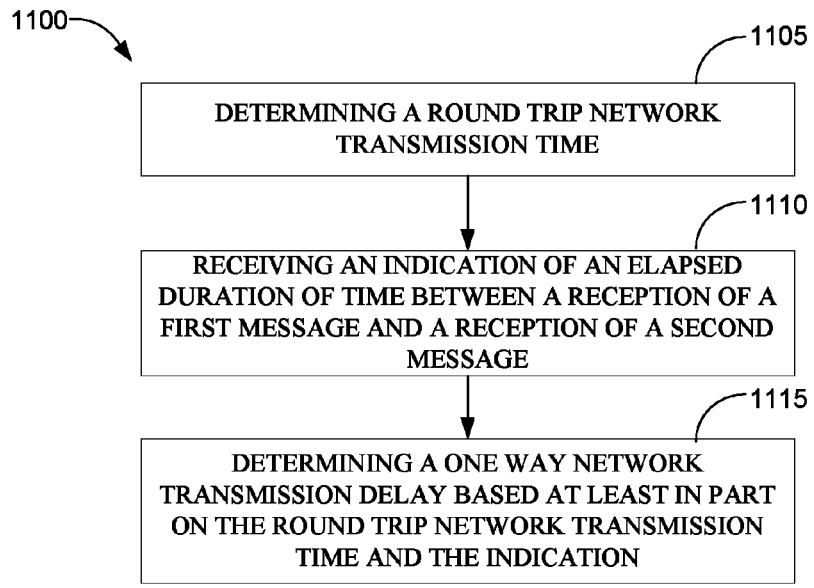

DEVICE AND METHOD FOR ADAPTIVE RATE MULTIMEDIA COMMUNICATIONS ON A WIRELESS NETWORK

CROSS REFERENCE TO RELATED APPLICATIONS

This application claims the benefit of U.S. Provisional Application 61/693,469, filed Aug. 27, 2012, and entitled "DEVICE AND METHOD FOR ADAPTIVE RATE MULTIMEDIA COMMUNICATIONS ON A WIRELESS NETWORK," and assigned to the assignee hereof. This application also claims the benefit of U.S. Provisional Application 61/814,720, filed Apr. 22, 2013, and entitled "DEVICE AND METHOD FOR ADAPTIVE RATE MULTIMEDIA COMMUNICATIONS ON A WIRELESS NETWORK," and assigned to the assignee hereof. The disclosures of these prior applications are considered part of this application, and are hereby incorporated by reference in their entirety.

BACKGROUND

1. Field

The present invention relates to encoding multimedia data on a wireless network, and more specifically to adapting one or more encoding parameters of the multimedia data based on a current capacity of the wireless network.

2. Background

Multimedia data may be encoded for transmission over a wireless network. When multimedia data is encoded, the methods and parameters of the encoding process may control the fidelity of the data provided to a receiver. When the receiver decodes the encoded data, for example, to play a video or audio file, the quality of the multimedia experience may at least in part relate to the fidelity of the encoded data.

The level of fidelity of the data provided may also affect the size of the encoded multimedia data. For example, high fidelity encoded data may be larger than encoded data providing a lower quality multimedia experience. Some networking environments, for example, some uncongested network environments, provide adequate capacity to transmit the high fidelity encoded data with a relatively low latency and packet loss rate. In these environments, the high fidelity data may provide a good user experience. Other network environments do not provide a capacity sufficient to transfer high fidelity data with an acceptable latency and loss rate. These networking environments may suffer from traffic congestion or service outages caused by equipment being offline or other reasons. A poor user experience may result in these environments.

The network capacity of a given network environment may itself vary between the uncongested and congested environments described above. For example, networks may experience peak usage periods that result in relatively high latencies and low bandwidth per user, with the further possibility of packet losses. Off-peak periods may provide improvements in latency and loss rates. In these networking environments, a transmission rate tailored to off-peak network capacities may result in a poor user experience during peak periods, as the high fidelity data transmitted during these periods may exceed the network's capacity, resulting in dropped packets and high latencies. Similarly, transmission rates suitable for peak periods with acceptable latencies and loss rates may provide a lower fidelity user experience than is possible during off-peak periods. During off-peak periods when network capacity is relatively high, the lower transmission rates may underutilize network capacity.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include identification and application of rotation amount and duration to pictures included in a multimedia presentation (e.g., video, sequence of pictures).

One aspect discloses is a method of encoding data. The method includes determining, via an electronic device, a measurement of an amount of received network data relative to an amount of transmitted network data; and adjusting an encoding parameter based at least in part on the measurement. In some aspects, the measurement is a ratio of the amount of received network data to the amount of transmitted network data. In other aspects, the measurement is a difference between the amount of received network data and the amount of transmitted network data. In some aspects, the method also includes receiving a quantity of data received by a receiver, and determining the received network data based at least in part on the quantity. In some aspects, the method includes receiving an encoding parameter value from a receiver, and adjusting the encoding parameter based at least on the received encoding parameter. In some aspects, the method also includes transmitting a quantity of data transmitted to the receiver. In some aspects, the method also includes determining a network jitter, wherein the encoding parameter is adjusted based at least on the network jitter. In some aspects, the method also includes determining if the adjustment of the encoding parameter will increase a transmission rate, and determining a second adjustment to a second encoding parameter that will further increase the transmission rate if the network jitter is below a first jitter threshold.

In some aspects, the encoding parameter and the second encoding parameter are different parameters. In some aspects, the method also includes determining if the adjustment of the encoding parameter will decrease a transmission rate; and determining a second adjustment to a second encoding parameter that will further decrease the transmission rate if the network jitter is above a second jitter threshold. In some aspects, the encoding parameter and the second encoding parameter are different parameters.

In some aspects, the method also includes determining a delay in receiving the quantity of data received by the receiver, and determining the transmitted network data based at least in part on the delay. In some aspects, the method also includes determining a transmission rate based on the determined measurement, wherein the encoding parameter is adjusted based at least in part on the transmission rate.

Another aspect, disclosed is a method of determining a transmission rate. The method includes determining an amount of data buffered in a network, determining a sustainable throughput of the network, and determining a transmission rate based at least in part on the sustainable throughput and the amount of data buffered. In some aspects, the method also includes adjusting an encoding parameter based at least in part on the transmission rate. In some aspects, the method also includes transmitting a parameter based one at least one of the amount of data buffered in the network and the sustainable throughput of the network. In some aspects, the method transmits the transmission rate.

In some aspects, the amount of data buffered in a network is determined based at least in part on a duration of time a transmission rate exceeded a network capacity. In some aspects, the amount of data buffered in a network is determined based at least in part on a difference between a transmission rate and a network capacity.

Another aspect disclosed is a method of determining a network round trip time. The method includes transmitting information identifying a time, receiving information identifying the transmitted time at a receive time, and determining the network round trip time based at least in part on the information and the receive time. In some aspects, the information identifying a time is a timestamp and the information identifying the transmitted time is the timestamp. In some aspects, the method also includes determining a delay between when the transmitted information is received and the received information is transmitted. In these aspects, the network round trip time is determined based on the delay. In some aspects, transmitting the information identifying a time and receiving information identifying the transmitted time are performed iteratively, wherein the time is different for each iteration, and the round trip time is determined based at least in part on each different time. In some aspects, the network round trip time is determined based on an average.

Another aspect disclosed is a method for determining a network queue drain duration. The method includes determining, via an electronic device, a measurement of an amount of transmitted network data relative to an amount of received network data, determining an amount of data buffered in a network, and determining the network queue drain duration based at least in part on the measurement and the amount of data buffered. In some aspects, the measurement is a ratio of the amount of received network data to the amount of transmitted network data. In other aspects, the measurement is a difference between the amount of received network data and the amount of transmitted network data.

In some aspects, the method also includes determining a duration of time when a transmission rate exceeds a sustainable network throughput, determining how much the transmission rate exceeded the sustainable network throughput, and determining the amount of data buffered in the network based at least in part on how much the transmission rate exceeded the sustainable network throughput and the duration.

In some aspects, the method also includes receiving a quantity of data received by a receiver, and determining the received network data based at least in part on the quantity. In some aspects, the method includes determining a delay in receiving the quantity of data received by the receiver, and determining the transmitted network data based at least in part on the delay. In some aspects, the method includes receiving a quantity of data transmitted by a transmitter, and determining the transmitted network data based at least in part on the quantity of data transmitted. In some aspects, the method also includes determining a delay in receiving the quantity of data transmitted by the transmitter, and determining the received network data based at least in part on the delay.

Another aspect disclosed is a method of determining a one way network transmission delay. The method includes determining a round trip network transmission time, receiving an indication of an elapsed time between a reception of a first message and a reception of a second message, and determining the one way network transmission delay based at least in part on the round trip network transmission time and the indication.

In some aspects, the method includes transmitting the first message at a first time, transmitting the second message at a second time, and determining the one way network transmission delay based at least in part on the first time and the second time.

In some aspects, the one way network transmission time is determined based on an elapsed duration of time between the first time and the second time. In some aspects, the one way network transmission delay is determined based on a ratio of an elapsed duration of time between the first time and the second time, and an elapsed duration of time between the reception of the first message and the reception of the second message.

Another aspect discloses is an apparatus for encoding data. The apparatus includes a processor configured to: determine a measurement of an amount of transmitted network data relative to an amount of received network data, and adjust an encoding parameter based at least in part on the measurement. In some aspects, the processor is configured to determine a ratio of the amount of received network data to the amount of transmitted network data as the measurement. In other aspects, the processor is configured to determine the measurement as a difference between the amount of received network data and the amount of transmitted network data. In some aspects, the apparatus also includes a receiver configured to receive a quantity of data received by a receiver, wherein the processor is further configured to determine the received network data based at least in part on the quantity. In some aspects, the apparatus also includes a receiver configured to receive an encoding parameter value from a receiver, wherein the processor is configured to further adjust the encoding parameter based at least on the received encoding parameter. In some aspects, the apparatus also includes transmitting a quantity of data transmitted to the receiver. In some aspects, the apparatus also includes a processor configured to determine a network jitter, wherein the processor is configured to adjust the encoding parameter based at least on the network jitter. In some aspects, the processor is further configured to determine if the adjustment of the encoding parameter will increase a transmission rate, and determine a second adjustment to a second encoding parameter that will further increase the transmission rate if the network jitter is below a first jitter threshold. In some aspects, the encoding parameter and the second encoding parameter are different parameters. In some aspects, the processor is further configured to determine if the adjustment of the encoding parameter will decrease a transmission rate, and determine a second adjustment to a second encoding parameter that will further decrease the transmission rate if the network jitter is above a second jitter threshold. In some aspects, the encoding parameter and the second encoding parameter are different parameters. In some aspects, the processor is further configured to determine a delay in receiving the quantity of data received by the receiver, and determine the transmitted network data based at least in part on the delay. In some aspects, the processor is further configured to determine a transmission rate based on the determined measurement, wherein the encoding parameter is adjusted based at least in part on the transmission rate.

Another aspect disclosed is an apparatus for determining a transmission rate. The apparatus includes a processor configured to determine an amount of data buffered in a network, determine a sustainable throughput of the network, and determine a transmission rate based at least in part on the sustainable throughput and the amount of data buffered. In some aspects, the processor is further configured to adjust an encoding parameter based at least in part on the transmission rate. In some aspects, the apparatus also includes a transmitter configured to transmit a parameter based on at least one of the amount of data buffered in a network and the sustainable throughput of the network. In some aspects, the processor is further configured to transmit the transmission rate. In some aspects, the processor is configured to determine the amount of data buffered in a network based at least in part on a duration of time a transmission rate exceeded a network capacity. In some aspects, the processor is configured to determine the amount of data buffered in a network based at least in part on a difference between a transmission rate and a network capacity.

Another aspect disclosed is an apparatus for determining a network round trip time. The apparatus includes a transmitter configured to transmit information identifying a time, a receiver information identifying the transmitted time at a receive time, and a processor configured to determine the network round trip time based at least in part on the information and the receive time. In some aspects, the information identifying a time is a timestamp and the information identifying the transmitted time is the timestamp. In some aspects, the apparatus also includes a processor configured to determine a delay between when the transmitted information is received and the received information is transmitted, wherein the network round trip time is determined based on the delay.

In some aspects, the transmitter is further configured to transmit the information identifying a time iteratively and the receiver is further configured to receive information identifying the transmitted time iteratively, wherein the time is different for each iteration, and the round trip time is determined based at least in part on each different time. In some aspects, the processor is configured to determine the network round trip time based on an average.

Another aspect disclosed is an apparatus for determining a network queue drain duration. The apparatus includes a processor configured to determine, a measurement of an amount of transmitted network data relative to an amount of received network data, determine an amount of data buffered in a network, and determine the network queue drain duration based at least in part on the measurement and the amount of data buffered. In some aspects, the processor is configured to determine the measurement as a ratio of the amount of received network data to the amount of transmitted network data. In other aspects, the processor is configured to determine the measurement as a difference between the amount of received network data and the amount of transmitted network data.

In some aspects, the processor is further configured to determine a duration of time when a transmission rate exceeds a sustainable network throughput, determine how much the transmission rate exceeded the sustainable network throughput, and determine the amount of data buffered in the network based at least in part on how much the transmission rate exceeded the sustainable network throughput and the duration. In some aspects, the apparatus also includes a receiver configured to receive a quantity of data received by a receiver, wherein the processor is further configured to determine the received network data based at least in part on the quantity. In some aspects, the processor is further configured to determine a delay in receiving the quantity of data received by the receiver, and determine the transmitted network data based at least in part on the delay.

In some aspects, the apparatus also includes a receiver configured to receive a quantity of data transmitted by a transmitter, wherein the processor is further configured to determine the transmitted network data based at least in part on the quantity. In some aspects, the processor is further configured to determine a delay in receiving the quantity of data transmitted by the transmitter, and determine the received network data based at least in part on the delay.

Another aspect disclosed is an apparatus for determining a one way network transmission delay. The apparatus includes a processor configured to determining a round trip network transmission time, and a receiver configured to receive an indication of an elapsed duration of time between a reception of a first message and a reception of a second message, wherein the processor is further configured to determine the one way network transmission delay based at least in part on the round trip network transmission time and the indication. In some aspects, the apparatus includes a transmitter configured to transmit the first message at a first time, and configured to transmit the second message at a second time, wherein the processor is further configured to determine the one way network transmission delay based at least in part on the first time and the second time. In some aspects, the one way network transmission delay is determined based on an elapsed duration of time between the first time and the second time. In some aspects, the processor is configured to determine the one way network transmission delay based on a ratio of the elapsed duration of time between the first time and the second time, and the elapsed duration of time between the reception of the first message and the reception of the second message.

Another aspect disclosed is an apparatus for encoding data. The apparatus includes means for determining, a measurement of an amount of transmitted network data relative to an amount of received network data, and means for adjusting an encoding parameter based at least in part on the determined measurement. In some aspects, the means for determining a measurement is configured to determine a ratio of the amount of received network data to the amount of transmitted network data. In other aspects, the means for determining a measurement is configured to determine a difference between the amount of received network data and the amount of transmitted network data.

In some aspects, the apparatus also includes means for receiving a quantity of data received by a receiver, and means for determining the received network data based at least in part on the quantity. In some aspects, the apparatus also includes means for determining a delay in receiving the quantity of data received by the receiver, and means for determining the transmitted network data based at least in part on the delay. In some aspects, the apparatus also includes means for determining a transmission rate based on the determined measurement, wherein the encoding parameter is adjusted based at least in part on the transmission rate. In some aspects, the apparatus also includes means for receiving an encoding parameter value from a receiver, wherein the means for adjusting the encoding parameter is configured to adjust the encoding parameter based at least on the received encoding parameter. In some aspects, the apparatus also includes means for transmitting a quantity of data transmitted to the receiver. In some aspects, the apparatus includes means for determining a network jitter, wherein the means for adjust the encoding parameter is configured to adjust the encoding parameter based at least on the network jitter. In some aspects, the apparatus includes means for determining if the adjustment of the encoding parameter will increase a transmission rate, means for determining a second adjustment to a second encoding parameter that will further increase the transmission rate if the network jitter is below a first jitter threshold. In some aspects, the encoding parameter and the second encoding parameter are different parameters.

In some aspects, the apparatus also includes means for determining if the adjustment of the encoding parameter will decrease a transmission rate, and means for determining a second adjustment to a second encoding parameter that will further decrease the transmission rate if the network jitter is above a second jitter threshold. In some aspects, the encoding parameter and the second encoding parameter are different parameters.

Another aspect disclosed is an apparatus for determining a transmission rate. The apparatus includes means for determining an amount of data buffered in a network, means for determining a sustainable throughput of the network, and means for determining a transmission rate based at least in part on the sustainable throughput and the amount of data buffered. In some aspects, the apparatus includes means for adjusting an encoding parameter based at least in part on the transmission rate. In some aspects, the apparatus also includes means for transmitting a parameter based on at least one of the amount of data buffered in the network and the sustainable throughput of the network. In some aspects, the apparatus also includes means for transmitting the transmission rate to a transmitting node. In some aspects, the amount of data buffered in a network is determined based at least in part on a duration of time a transmission rate exceeded a network capacity. In some aspects, the amount of data buffered in a network is determined based at least in part on a difference between a transmission rate and a network capacity.

Another aspect disclosed is an apparatus for determining a network round trip time. The apparatus includes means for transmitting information identifying a time, means for receiving information identifying the transmitted time at a receive time; and means for determining the network round trip time based at least in part on the information and the receive time. In some aspects, the information identifying a time is a timestamp and the information identifying the transmitted time is the timestamp. In some aspects, the apparatus also includes means for determining a delay between when the transmitted information is received and the received information is transmitted, wherein the network round trip time is determined based on the delay. In some aspects, the means for transmitting the information identifying a time and the means for receiving information identifying the transmitted time perform the transmitting and receiving iteratively, wherein the time is different for each iteration, and the round trip time is determined based at least in part on each different time. In some aspects, the network round trip time is determined based on an average.

Another aspect disclosed is an apparatus for determining a network queue drain duration. The apparatus includes means for determining, a measurement of an amount of transmitted network data relative to an amount of received network data, means for determining an amount of data buffered in a network, and means for determining the network queue drain duration based at least in part on the measurement and the amount of data buffered. In some aspects, the means for determining a measurement is configured to determine a ratio of the amount of received network data to the amount of transmitted network data. In other aspects, the means for determining a measurement is configured to determine a difference between the amount of received network data and the amount of transmitted network data.

In some aspects, the apparatus also includes means for determining a duration of time when a transmission rate exceeds a sustainable network throughput, means for determining how much the transmission rate exceeded the sustainable network throughput, and means for determining the amount of data buffered in the network based at least in part on how much the transmission rate exceeded the sustainable network throughput and the duration.

In some aspects, the apparatus also includes means for receiving a quantity of data transmitted by a transmitter, and means for determining the transmitted network data based at least in part on the quantity. In some aspects, the apparatus also includes means for determining a delay in receiving the quantity of data transmitted by the transmitter, and means for determining the received network data based at least in part on the delay. In some aspects, the apparatus includes means for receiving a quantity of data received by a receiver, and means for determining the received network data based at least in part on the quantity. In some aspects, the apparatus also includes means for determining a delay in receiving the quantity of data received by the receiver, and means for determining the transmitted network data based at least in part on the delay.

Another aspect disclosed is an apparatus for determining a one way network transmission delay. The apparatus includes means for determining a round trip network transmission time, means for receiving an indication of an elapsed duration of time between a reception of a first message and a reception of a second message, and means for determining the one way network transmission delay based at least in part on the round trip network transmission time and the indication. In some aspects, the apparatus also includes means for transmitting the first message at a first time, means for transmitting the second message at a second time, and means for determining the one way network transmission delay based at least in part on the first time and the second time. In some aspects, the means for determining the one way network transmission delay is configured to determine the one way network transmission delay based on an elapsed duration of time between the first time and the second time. In some aspects, the one way network transmission time is determined based on a ratio of the elapsed duration of time between the first time and the second time, and elapsed duration of time between the reception of the first message and the reception of the second message.

Another aspect disclosed is a non-transitory, computer readable media storing instructions that when executed, cause a processor to perform a method of determining a measurement of an amount of transmitted network data relative to an amount of received network data; and adjusting an encoding parameter based at least in part on the determined measurement. In some aspects, the measurement is a ratio of the amount of received network data to the amount of transmitted network data. In other aspects, the measurement is a difference between the amount of received network data and the amount of transmitted network data.

In some aspects, the method also includes receiving a quantity of data received by a receiver, and determining the received network data based at least in part on the quantity.

In some aspects, the method also includes receiving an encoding parameter value from a receiver, and adjusting the encoding parameter based at least on the received encoding parameter. In some aspects, the method also includes transmitting a quantity of data transmitted to the receiver. In some aspects, the method also includes determining a network jitter, wherein the encoding parameter is further adjusted based at least on the network jitter. In some aspects, the method also includes determining if the adjustment of the encoding parameter will increase a transmission rate; and determining a second adjustment to a second encoding parameter that will further increase the transmission rate if the network jitter is below a first jitter threshold. In some aspects, the encoding parameter and the second encoding parameter are different parameters. In some aspects, the method also includes determining if the adjustment of the encoding parameter will decrease a transmission rate, and determining a second adjustment to a second encoding parameter that will further decrease the transmission rate if the network jitter is above a second jitter threshold. In some aspects, the encoding parameter and the second encoding parameter are different parameters. In some aspects, the method also includes determining a delay in receiving the quantity of data received by the receiver, and determining the transmitted network data based at least in part on the delay. In some aspects, the method also includes determining a transmission rate based on the determined measurement, wherein the encoding parameter is adjusted based at least in part on the transmission rate.

Another aspect disclosed is a non-transitory, computer readable media storing instructions that when executed, cause a processor to perform a method. The method includes determining an amount of data buffered in a network, determining a sustainable throughput of the network, and determining a transmission rate based at least in part on the sustainable throughput and the amount of data buffered. In some aspects, the method includes adjusting an encoding parameter based at least in part on the transmission rate. In some aspects, the method also includes transmitting a parameter based on at least one of the amount of data buffered in the network and the sustainable throughput of the network. In some aspects, the method also includes transmitting the transmission rate. In some aspects, the amount of data buffered in a network is determined based at least in part on a duration of time a transmission rate exceeded a network capacity. In some aspects, the method determines the amount of data buffered in a network based at least in part on a difference between a transmission rate and a network capacity.

Another aspect disclosed is a non-transitory, computer readable media storing instructions that when executed, cause a processor to perform a method of determining a round trip time. The method includes transmitting information identifying a time, receiving information identifying the transmitted time at a receive time, and determining the network round trip time based at least in part on the information and the receive time. In some aspects, the information identifying a time is a timestamp and the information identifying the transmitted time is the timestamp. In some aspects, the method also includes determining a delay between when the transmitted information is received and the received information is transmitted, wherein the network round trip time is determined based on the delay. In some aspects, transmitting the information identifying a time and receiving information identifying the transmitted time are performed iteratively, and the time is different for each iteration, and the round trip time is determined based at least in part on each different time. In some aspects, the network round trip time is determined based on an average.

Another aspect disclosed is a non-transitory, computer readable media storing instructions that when executed, cause a processor to perform a method of determining a network queue drain duration. The method includes determining a measurement of an amount of transmitted network data relative to an amount of received network data, determining an amount of data buffered in a network, and determining the network queue drain duration based at least in part on the measurement and the amount of data buffered. In some aspects, the measurement is a ratio of the amount of received network data to the amount of transmitted network data. In other aspects, the measurement is a difference between the amount of received network data and the amount of transmitted network data.

In some aspects, the method also includes determining a duration of time when a transmission rate exceeds a sustainable network throughput, determining how much the transmission rate exceeded the sustainable network throughput, and determining the amount of data buffered in the network based at least in part on how much the transmission rate exceeded the sustainable network throughput and the magnitude. In some aspects, the method also includes receiving a quantity of data received by a receiver, and determining the received network data based at least in part on the quantity. In some aspects, the method also includes determining a delay in receiving the quantity of data received by the receiver, and determining the transmitted network data based at least in part on the delay.

In some aspects, the method includes receiving a quantity of data transmitted by a transmitter, and determining the transmitted network data based at least in part on the quantity. In some aspects, the method also includes determining a delay in receiving the quantity of data transmitted by the transmitter, and determining the received network data based at least in part on the delay.

In some aspects, the method also includes determining a round trip network transmission time; receiving an indication of an elapsed duration of time between a reception of a first message and a reception of a second message, and determining the one way network transmission delay based at least in part on the round trip network transmission time and the indication. In some aspects, the method also includes transmitting the first message at a first time, transmitting the second message at a second time, and determining the one way network transmission delay based at least in part on the first time and the second time. In some aspects, the one way network transmission delay is determined based on an elapsed duration of time between the first time and the second time. In some aspects, the one way network transmission delay is determined based on a ratio of the elapsed duration of time between the first time and the second time, and elapsed duration of time between the reception of the first message and the reception of the second message.

Another aspect disclosed is a method of transmitting an encoding parameter. The method includes determining, via an electronic device, a measurement of an amount of received network data relative to an amount of transmitted network data, and transmitting an encoding parameter, the encoding parameter based at least in part on the determined measurement. In some aspects, the measurement is a ratio of the amount of received network data to the amount of transmitted network data. In other aspects, the measurement is a difference between the amount of received network data and the amount of transmitted network data.

In some aspects, the method also includes receiving a quantity of data transmitted by a transmitter, and determining the transmitted network data based at least in part on the quantity. In some aspects, the method also includes transmitting the encoding parameter value to a transmitter. In some aspects, the method also includes transmitting a quantity of data received to the transmitter. In some aspects, the method also includes determining a network jitter, wherein the transmitted parameter is based at least on the network jitter. In some aspects, the method also includes determining if the adjustment of the encoding parameter will increase a transmission rate, and determining a second adjustment to a second encoding parameter that will further increase the transmission rate if the network jitter is below a first jitter threshold. In some aspects, the encoding parameter and the second encoding parameter are different parameters. In some aspects, the method also includes determining if the adjustment of the encoding parameter will decrease a transmission rate, and determining a second adjustment to a second encoding parameter that will further decrease the transmission rate if the network jitter is above a second jitter threshold. In some aspects, the encoding parameter and the second encoding parameter are different parameters. In some aspects, the method also includes determining a delay in receiving the quantity of data transmitted by the transmitter; and determining the received network data based at least in part on the delay. In some aspects, the method also includes determining a transmission rate based on the determined measurement, wherein the transmitted parameter is based at least in part on the transmission rate.

Another aspect disclosed is an apparatus for transmitting an encoding parameter. The apparatus includes a processor configured to determine a measurement of an amount of received network data relative to an amount of transmitted network data, and a transmitter configured to transmit an encoding parameter, the encoding parameter based at least in part on the determined measurement. In some aspects, the processor is configured to determine the measurement as a ratio of the amount of received network data to the amount of transmitted network data. In other aspects, the processor is configured to determine the measurement as a difference between the amount of received network data and the amount of transmitted network data.

In some aspects, the apparatus also includes a receiver configured to receive a quantity of data transmitted by a transmitter, and a processor configured to determine the transmitted network data based at least in part on the quantity. In some aspects, the apparatus includes a transmitter configured to transmit the encoding parameter value to a transmitter. In some aspects, the apparatus also includes a transmitter configured to transmit a quantity of data received to the transmitter. In some aspects, the apparatus also includes a processor configured to determine a network jitter, wherein the transmitted parameter is based at least on the network jitter. In some aspects, the apparatus also includes a processor configured to determine if the adjustment of the encoding parameter will increase a transmission rate, and determine a second adjustment to a second encoding parameter that will further increase the transmission rate if the network jitter is below a first jitter threshold. In some aspects, the encoding parameter and the second encoding parameter are different parameters. In some aspects, the apparatus also includes a processor configured to determine if the adjustment of the encoding parameter will decrease a transmission rate, and determine a second adjustment to a second encoding parameter that will further decrease the transmission rate if the network jitter is above a second jitter threshold. In some aspects, the encoding parameter and the second encoding parameter are different parameters. In some aspects, the apparatus also includes a processor configured to determine a delay in receiving the quantity of data transmitted by the transmitter, and determine the received network data based at least in part on the delay. In some aspects, the apparatus also includes a processor configured to determine a transmission rate based on the determined measurement, wherein the transmitted parameter is based at least in part on the transmission rate.

Another aspect disclosed is an apparatus for transmitting an encoding parameter. The apparatus includes means for determining a measurement of an amount of received network data relative to an amount of transmitted network data, and means for transmitting an encoding parameter, the encoding parameter based at least in part on the determined measurement. In some aspects, the means for determining a measurement is configured to determine a ratio of the amount of received network data to the amount of transmitted network data. In other aspects, the means for determining a measurement is configured to determine a difference between the amount of received network data and the amount of transmitted network data.

In some aspects, the apparatus includes means for receiving a quantity of data transmitted by a transmitter, and means for determining the transmitted network data based at least in part on the quantity. In some aspects, the apparatus also includes means for transmitting the encoding parameter value to a transmitting node. In some aspects, the apparatus also includes means for transmitting a quantity of data received to the transmitting node. In some aspects, the apparatus also includes means for determining a network jitter, wherein the means for transmitted parameter is based at least on the network jitter.

In some aspects, the apparatus also includes means for determining if the adjustment of the encoding parameter will increase a transmission rate, and means for determining a second adjustment to a second encoding parameter that will further increase the transmission rate if the network jitter is below a first jitter threshold. In some aspects, the first and second encoding parameters are different parameters. In some aspects, the apparatus also includes means for determining if the adjustment of the encoding parameter will decrease a transmission rate, and means for determining a second adjustment to a second encoding parameter that will further decrease the transmission rate if the network jitter is above a second jitter threshold. In some aspects, the encoding parameter and the second encoding parameter are different parameters.

In some aspects, the apparatus also includes a processor configured to determine a delay in receiving the quantity of data transmitted by the transmitter, and determine the received network data based at least in part on the delay. In some aspects, the apparatus also includes a processor configured to determine a transmission rate based on the determined measurement, wherein the means for transmitting the parameter is configured to base the transmitted parameter at least in part on the transmission rate.

Another aspect disclosed is a non-transitory, computer readable storage medium comprising instructions that when executed cause a processor to perform a method of transmitting an encoding parameter. The method includes determining, via an electronic device, a measurement of an amount of received network data relative to an amount of transmitted network data, and transmitting an encoding parameter, the encoding parameter based at least in part on the determined measurement. In some aspects, the method includes receiving a quantity of data transmitted by a transmitter, and determining the transmitted network data based at least in part on the quantity. In some aspects, the method includes transmitting the encoding parameter value to a transmitter. In some aspects, the method also includes transmitting a quantity of data received to the transmitter. In some aspects, the method also includes determining a network jitter, wherein the transmitted parameter is based at least on the network jitter. In some aspects, the method also includes determining if the adjustment of the encoding parameter will increase a transmission rate, and determining a second adjustment to a second encoding parameter that will further increase the transmission rate if the network jitter is below a first jitter threshold. In some aspects, the encoding parameter and the second encoding parameter are different parameters. In some aspects, the method also includes determining if the adjustment of the encoding parameter will decrease a transmission rate, and determining a second adjustment to a second encoding parameter that will further decrease the transmission rate if the network jitter is above a second jitter threshold. In some aspects, the encoding parameter and the second encoding parameter are different parameters.

In some aspects, the method also includes determining a delay in receiving the quantity of data transmitted by the transmitter, and determining the received network data based at least in part on the delay. In some aspects, the method includes determining a transmission rate based on the determined measurement, wherein the transmitted parameter is based at least in part on the transmission rate.

These and other implementations consistent with the invention are further described below with reference to the following figures.

BRIEF DESCRIPTION OF THE DRAWINGS

FIG. 11A illustrates a process flow diagram for a method of determining a one way network transmission delay.

FIG. 11B is a functional block diagram of an exemplary device 1150. In the figures, to the extent possible, elements having the same or similar functions have the same designations.

DETAILED DESCRIPTION

Figure 1:
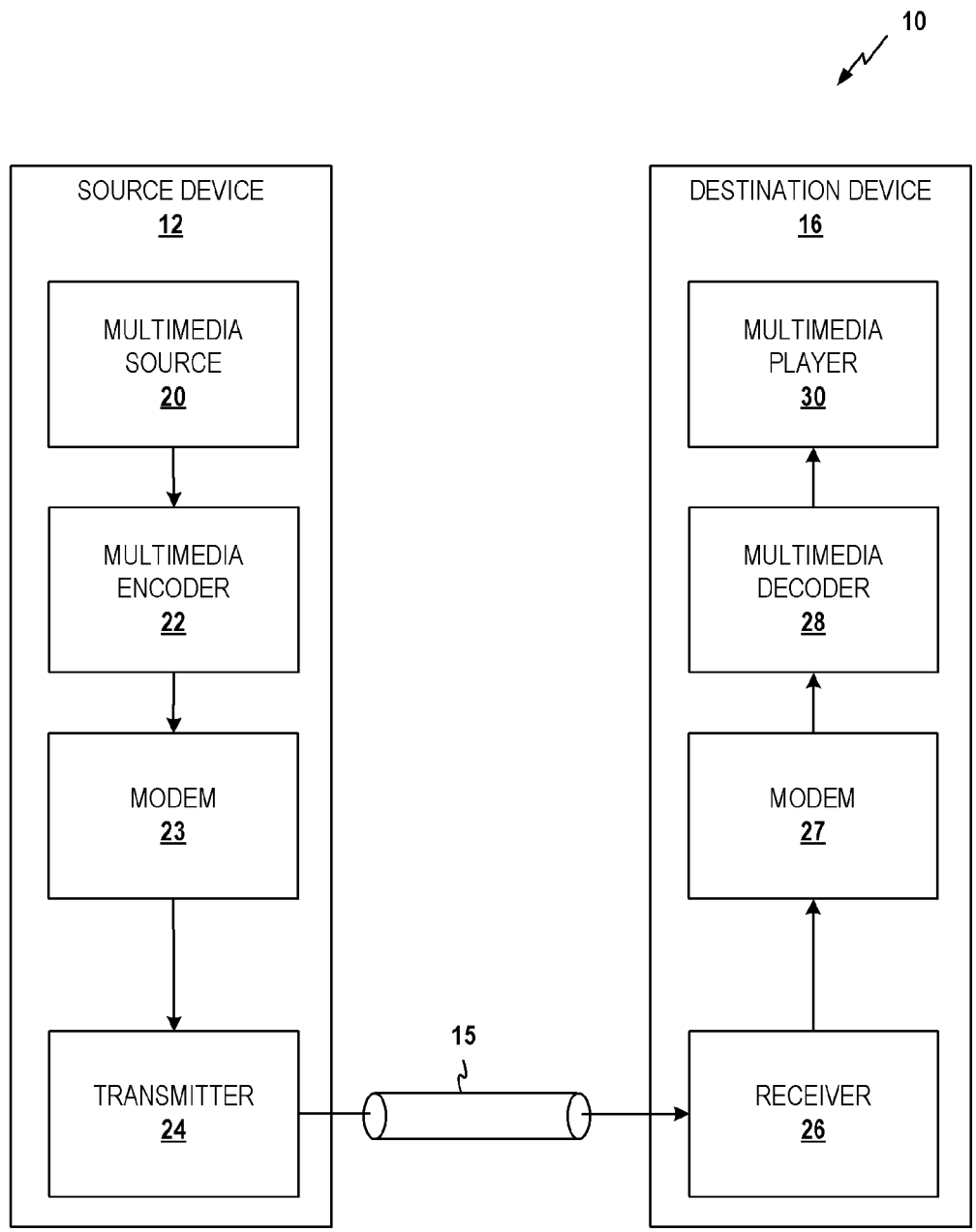
FIG. 1 illustrates a functional block diagram of an exemplary video encoding and decoding system.

Because network capacity may be variable and unpredictable, it may be desirable to vary a transmission rate to match a current network capacity. Without such adaptation, users may experience substantial or prolonged artifacts due to packet losses and latencies. In some embodiments, this may result in jitter or delays in the playback of multi-media data. Described herein are methods, apparatus, and computer readable media that provide for dynamic adaptation of transmission rates based on time-varying network conditions to provide for an improved user experience. In some embodiments, transmission rates may be modified by altering one or more encoding parameters of an encoder that is transmitting multimedia data onto the network.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Disclosed herein are methods, apparatus, and computer readable media that adapt a transmission rate based on network conditions between a transmitter and a receiver. Because network conditions may vary, dynamic adaptation of the transmission rate may provide an improved user experience when compared to a statically determined transmission or encoding rate.

In designing a system that provides for adaptive transmission rates, at least two design approaches can be considered. First, a model-based or closed-form approach may be utilized. In such an approach, a channel is modeled for certain variables, such as bandwidth, by using a fixed or closed mathematical form. The model is parameterized with unknowns that may be derived by experimentation. The encoder output may also be modeled similarly and perform in synchronization with the channel model.

Another approach is a state based or "fuzzy" approach. Such an approach may be token-based, in that network statistics are periodically gathered and provided to a decision engine that derives an expected network state. Such a state then determines a course of action taken by the system. This may include maintaining the current operational mode of the transmitter, or modifying transmitter parameters to either increase or decrease the rate at which data is transmitted into the network. In an embodiment, the transmitter may alter a bit rate in fixed quanta that span a pre-determined range from a minimum to a maximum quanta.

The advantages of a heuristic channel-state based approach may include acceptable margins, robustness in the face of false positives, and a stable output. Since the model is based on network states governed by acceptable margins for network statistics, the system is less sensitive to imprecision and/or deviations incurred by the measurement of network variables. Furthermore, since the system is token based, spurious deviation of network variables may not cause substantial deviations in derived encoder parameters. Updates to transmitter parameters may occur based on a token count (or a combination of token counts pertaining to separate network variables) exceeding one or more thresholds. This characteristic of the system may provide a level of insulation from spurious indications. Additionally, it may be desirable to provide a minimum duration of time between updates to one or more transmitter parameters. This minimum duration of time provides an opportunity for the transmitter to converge to a selected set of parameter values. This may lead to a more predictable encoder output and reduce the possibility of the transmitter output deviating substantially from specified parameters. The quantized aspects of the system help provide for this minimum duration of time between updates to one or more transmitter or encoder parameters.

One disclosed embodiment may derive a transmission rate $R_v(t)$ at time "t" as a mapping of three network variables:

$$R_v(t) = \mathrm{map}(R_f(t), D_f(t), L_f(t)) \quad (1)$$

where:
$R_f(t)$ is a measured forward (sender-to-receiver) throughput
$D_f(t)$ is a measured forward (sender-to-receiver) packet delay, and
$L_f(t)$ is a measured forward (sender-to-receiver) packet loss FIG. 1 illustrates a functional block diagram of an exemplary video encoding and decoding system. As shown in FIG. 1, system 10 includes a source device 12 that may be configured to transmit encoded multimedia data to a destination device 16 via a communication channel 15. Source device 12 and destination device 16 may comprise any of a wide range of devices, including mobile devices or generally fixed devices. In some cases, source device 12 and destination device 16 comprise wireless communication devices, such as wireless handsets, so-called cellular or satellite radiotelephones, personal digital assistants (PDAs), mobile media players, or any devices that can communicate video information over a communication channel 15, which may or may not be wireless. However, the techniques of this disclosure, which concern adapting one or more parameters of the encoder 22, may be used in many different systems and settings. FIG. 1 is merely one example of such a system.

In the example of FIG. 1, the source device 12 may include a multimedia source 20, a multimedia encoder 22, a modulator/demodulator (modem) 23 and a transmitter 24. Destination device 16 may include a receiver 26, a modem 27, a multimedia decoder 28, and a multimedia player 30. In accordance with this disclosure, multimedia encoder 22 of source device 12 may be configured to encode multimedia data. Modem 23 and transmitter 24 may modulate and transmit wireless signals to destination device 16. In this way, source device 12 communicates the encoded multimedia data to destination device 16.

Receiver 26 and modem 27 receive and demodulate wireless signals received from source device 12. Accordingly, multimedia decoder 28 may receive the transmitted multimedia data.

Source device 12 and destination device 16 are merely examples of such coding devices in which source device 12 generates coded multimedia data for transmission to destination device 16. In some cases, devices 12 and 16 may operate in a substantially symmetrical manner such that, each of devices 12 and 16 includes multimedia sources/sinks, encoding/decoding components, modulators/demodulators and transmitters/receivers. Hence, system 10 may support one-way or two-way multimedia transmission between multimedia devices 12 and 16. Source device 12 may also communicate with other destination devices (not shown) in addition to destination device 16 to perform one or more concurrent conversations with multiple destination devices. e.g., for multimedia streaming, multimedia broadcasting, or multimedia telephony.

Multimedia source 20 of source device 12 may include a multimedia capture device, such as a microphone, video camera, an audio or video archive containing previously captured audio or video, or an audio or video feed from a content provider.

The encoded multimedia information may then be modulated by a modem 23 according to a communication standard, e.g., such as code division multiple access (CDMA) or another communication standard, and transmitted to destination device 16 via transmitter 24. The modem 23 may include various mixers, filters, amplifiers or other components designed for signal modulation. The transmitter 24 may include circuits designed for transmitting data, including amplifiers, filters, and one or more antennas.

Receiver 26 of destination device 16 may be configured to receive information over channel 15. A modem 27 may be configured to demodulate the information. The multimedia encoding process may implement one or more of the techniques described herein. The information communicated over channel 15 may include information defined by multimedia encoder 22, which may be used by multimedia decoder 28 consistent with this disclosure. The multimedia player 30 may play a selective subset or all of the decoded multimedia data to a user, and may comprise any of a variety of players such as an audio or video player, or a video telephony player.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16. The techniques of this disclosure do not necessarily require communication of encoded data from one device to another, and may apply to encoding scenarios without the reciprocal decoding. Also, aspects of this disclosure may apply to decoding scenarios without the reciprocal encoding.

Multimedia encoder 22 and multimedia decoder 28 may operate consistent with a compression standard, such as the ITU-T H.264 standard, alternatively described as MPEG-4, Part 10, and Advanced Video Coding (AVC), or the next-generation video coding standard named High Efficiency Video Coding (HEVC). The techniques of this disclosure, however, are not limited to any particular coding standard or extensions thereof. Although not shown in FIG. 1, in some aspects, multimedia encoder 22 and multimedia decoder 28 may include both a video and audio encoder and a video and audio decoder, and may include appropriate MUX-DEMUX units, or other hardware and software, to handle encoding of both audio and video in a common data stream or separate data streams. If applicable, MUX-DEMUX units may conform to a multiplexer protocol (e.g., ITU H.223) or other protocols such as the user datagram protocol (UDP).

Multimedia encoder 22 and multimedia decoder 28 each may be implemented as one or more microprocessors, digital signal processors (DSPs), application specific integrated circuits (ASICs), field programmable gate arrays (FPGAs), discrete logic circuitry, software executing on a microprocessor or other platform, hardware, firmware or any combinations thereof. Each of multimedia encoder 22 and multimedia decoder 28 may be included in one or more encoders or decoders, either of which may be integrated as part of a combined encoder/decoder (CODEC) in a respective mobile device, subscriber device, broadcast device, server, or the like.

Figure 2:
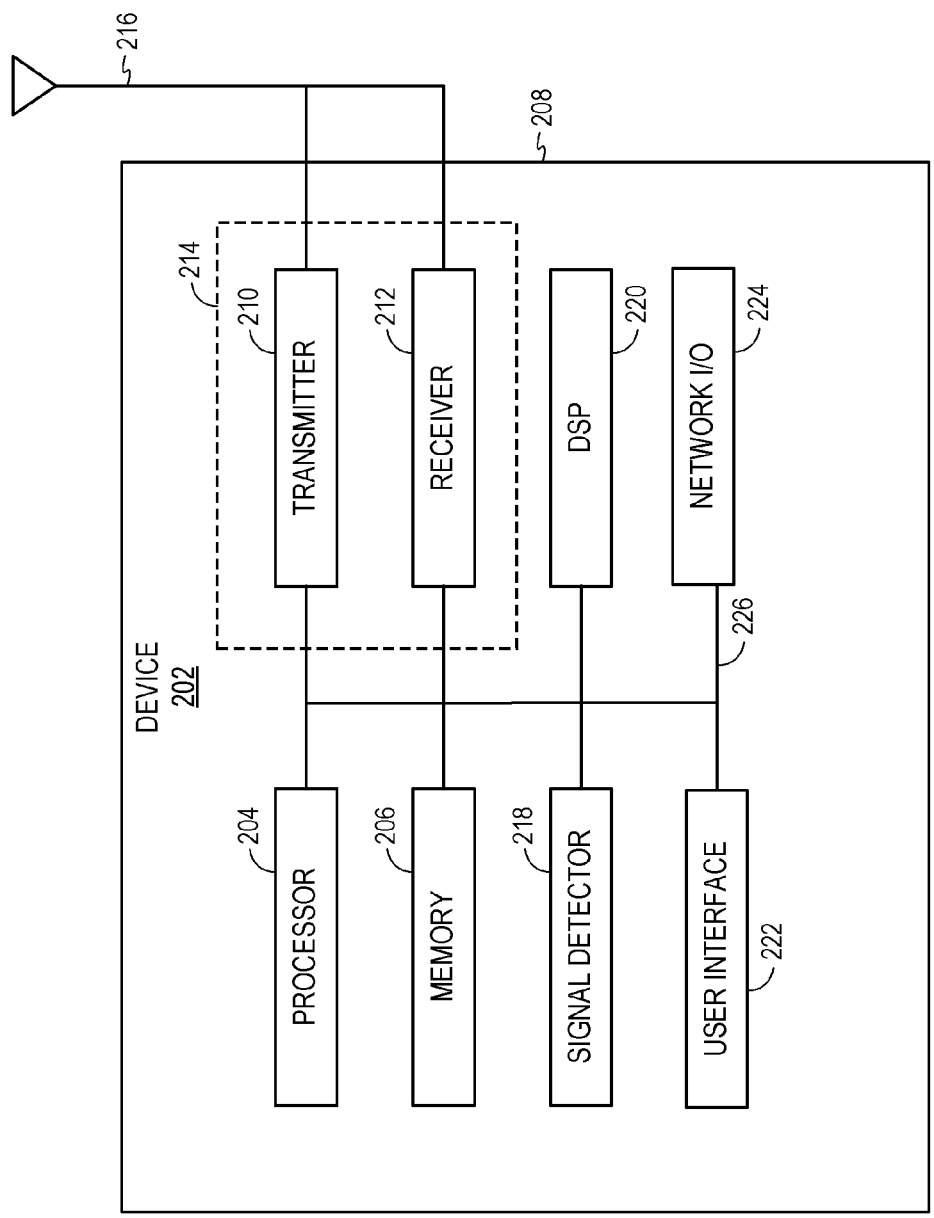
FIG. 2 shows a functional block diagram of an exemplary multimedia processing device.

FIG. 2 shows a functional block diagram of an exemplary multimedia processing device. The device 202 is an example of a device that may be configured to implement the various methods described herein. For example, the device 202 may be implemented as the source device 12 or the destination device 16.

The device 202 may include processor unit(s) 204 which control operation of the device 202. One or more of the processor unit(s) 204 may be collectively referred to as a central processing unit (CPU). Memory 206, which may include both read-only memory (ROM) and random access memory (RAM), provides instructions and data to the processor units 204. The memory 206 may generally be implemented as a computer readable storage medium. A portion of the memory 206 may also include non-volatile random access memory (NVRAM). The processor unit(s) 204 may be configured to perform logical and arithmetic operations based on program instructions stored within the memory 206. The instructions in the memory 206 may be executable to implement the methods described herein.

The processor unit(s) 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In an implementation where the processor unit(s) 204 include a DSP, the DSP may be configured to generate a packet (e.g., a data packet) for transmission. In some aspects, the packet may comprise a physical layer data unit (PPDU).

The device 202 may also include machine-readable media for storing software. The processing unit(s) 204 may comprise one or more non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 204, cause the device 202 to perform the various functions described herein.

The device 202 may include a transmitter 210 and/or a receiver 212 to allow transmission and reception, respectively, of data between the device 202 and a remote location. The transmitter 210 and receiver 212 may be combined into a transceiver 214. An antenna 216 may be attached to the housing 208 and electrically coupled with the transceiver 214. The device 202 may also include (not shown) multiple transmitters, multiple receivers, multiple transceivers, and/or multiple antennas.

The transmitter 210 may be configured to wirelessly transmit packets and/or signals. For example, the transmitter 210 may be configured to transmit different types of packets generated by the processor unit(s) 204, discussed above. The packets to be transmitted are provided to the transmitter 210. For example, the processor unit(s) 204 may store a packet in the memory 206 and the transmitter 210 may be configured to retrieve the packet. Once the transmitter retrieves the packet, the transmitter 210 transmits the packet to via the antenna 216. In some implementations, the transmitter 210 may transmit the packet via a network input/output 224.

If the device 202 is implemented as a destination device 16, the antenna 216 detects wirelessly transmitted packets/signals. The receiver 212 may be configured to process the detected packets/signals and make them available to the processor unit(s) 204. For example, the receiver 212 may store the packet in memory 206 and the processor unit(s) 204 may be configured to retrieve the packet.

The device 202 may also include a signal detector 218 that may be used in an effort to detect and quantify the level of signals received by the transceiver 214. The device 202 may also include a digital signal processor (DSP) 220 for use in processing signals. The DSP 220 may be configured to generate a packet for transmission or receive a packet from the receiver 212. In some aspects, the packet may comprise a physical layer data unit (PPDU).

The device 202 may further comprise a user interface 222 in some aspects. The user interface 222 may comprise a keypad, a microphone, a speaker, and/or a display. In some implementations, the device 202 may be coupled with a display. For example, the device 202 may be implemented as a set-top-box which receives video information, processes the information for display, and transmit the information to a television for display. The user interface 222 may further include any element or component that conveys information to a user of the device 202 and/or receives input from the user. The device 202 may also include a housing 208 surrounding one or more of the components included in the device 202.

The various components of the device 202 may be coupled together by a bus system 226. The bus system 226 may include a data bus, for example, as well as a power bus, a control signal bus, and a status signal bus in addition to the data bus. Those of skill in the art will appreciate the components of the device 202 may be coupled together or accept or provide inputs to each other using some other mechanism.

Although a number of separate components are illustrated in FIG. 2, those of skill in the art will recognize that one or more of the components may be combined or commonly implemented. For example, the processor unit(s) 204 may be used to implement not only the functionality described above with respect to the processor unit(s) 204, but also to implement the functionality described above with respect to the signal detector 218. Further, each of the components illustrated in FIG. 2 may be implemented using a plurality of separate elements.

Figure 3A:
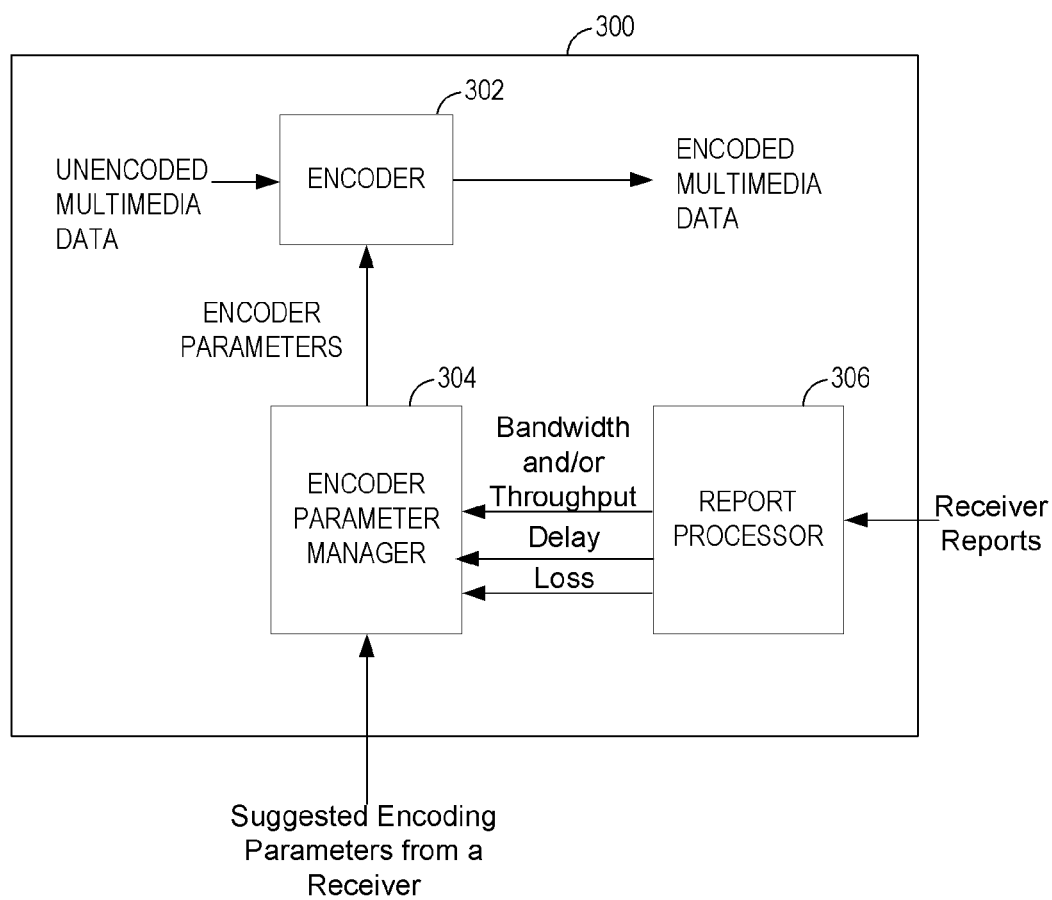
FIG. 3A illustrates a functional block diagram of an exemplary communication device.

FIG. 3A illustrates a functional block diagram of an exemplary communication device 300. In an embodiment, the communication device 300 may be implemented as wireless device 202 of FIG. 2. The communication device 300 includes an encoder 302, encoder parameter manager 304, and a report processor 306. The encoder 302 receives at least two inputs: unencoded multimedia information and encoder parameters. The unencoded multimedia data may be provided to the encoder 302 directly or indirectly by one or more multimedia applications (not shown). The encoder 302 may also receive one or more encoder parameters from encoder parameter manager 304. The encode parameters may identify an encoding scheme to be applied. The encoder parameters may be dynamic and provided for each multimedia stream or for each portion of a multimedia stream.

The encoder 302 may be configured to apply the configured encoding scheme to multimedia data when generating an encoded version of the multimedia data. In some implementations, the encoded version of the multimedia data may be provided to a transmitter for transmission as discussed above. In some implementations, the encoded version of the multimedia data may be further processed by the source device 12 (e.g., encrypted, compressed).

The encoder parameter manager 304 determines encoding parameters to send to the encoder 302. The encoder parameters may be selected based at least in part on the multimedia information, one or more characteristics of the source device 12 (e.g., power, processing capabilities, load), one or more characteristics of the destination device (e.g., power, processing capabilities, load, coupling with source device), one or more characteristics of the network, and/or other information available to the source device 12. Aspects of determining encoding parameters by the encoder parameter manager 304 are discussed herein. In some aspects, the encoder parameter manager 304 also receives suggested encoding parameters from a receiver, for example, device 350 discussed below with respect to FIG. 3B. In some other aspects, no suggested encoding parameters are received from a receiver.

In an embodiment, the encoder parameters are determined based, at least in part, on bandwidth, throughput, delay, and loss information provided by the report processor 306. The encoder parameters may include an encoding bit rate. Encoder parameters may also include temporal adaptation parameters, spatial adaptation parameters, and error resiliency parameters. Error resiliency parameters may include a group of pictures (GOP) size, and/or parameters to control dynamic insertion of refresh frames, for example, in H.264 encoding. Error resiliency parameters may include dynamic slice configuration parameters and/or a dynamic application of temporal scalability.

Figure 4:
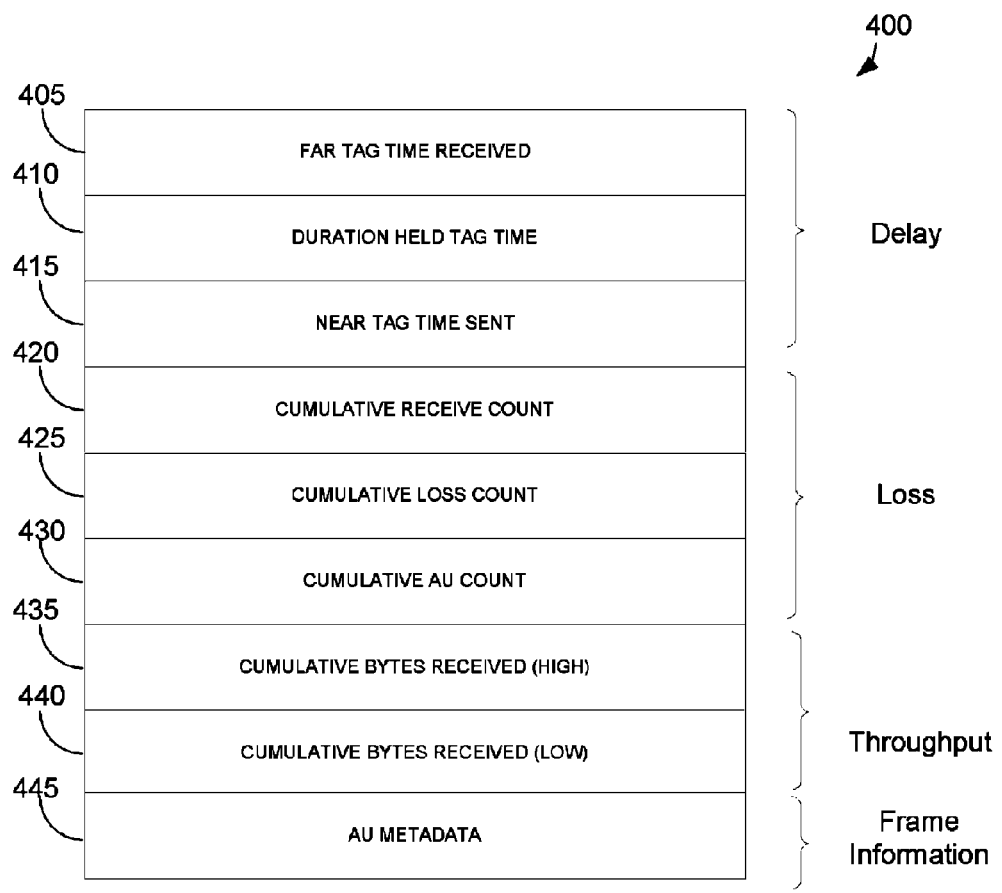
FIG. 4 illustrates one embodiment of a receiver report 400.

The report processor 306 sends one or more of bandwidth information, delay information, and loss information to the encoder parameter manager 304. In an embodiment, the report processor 306 receives receiver reports from a receiver of the encoded multimedia data. One embodiment of a receiver report is shown in FIG. 4.

Figure 3B:
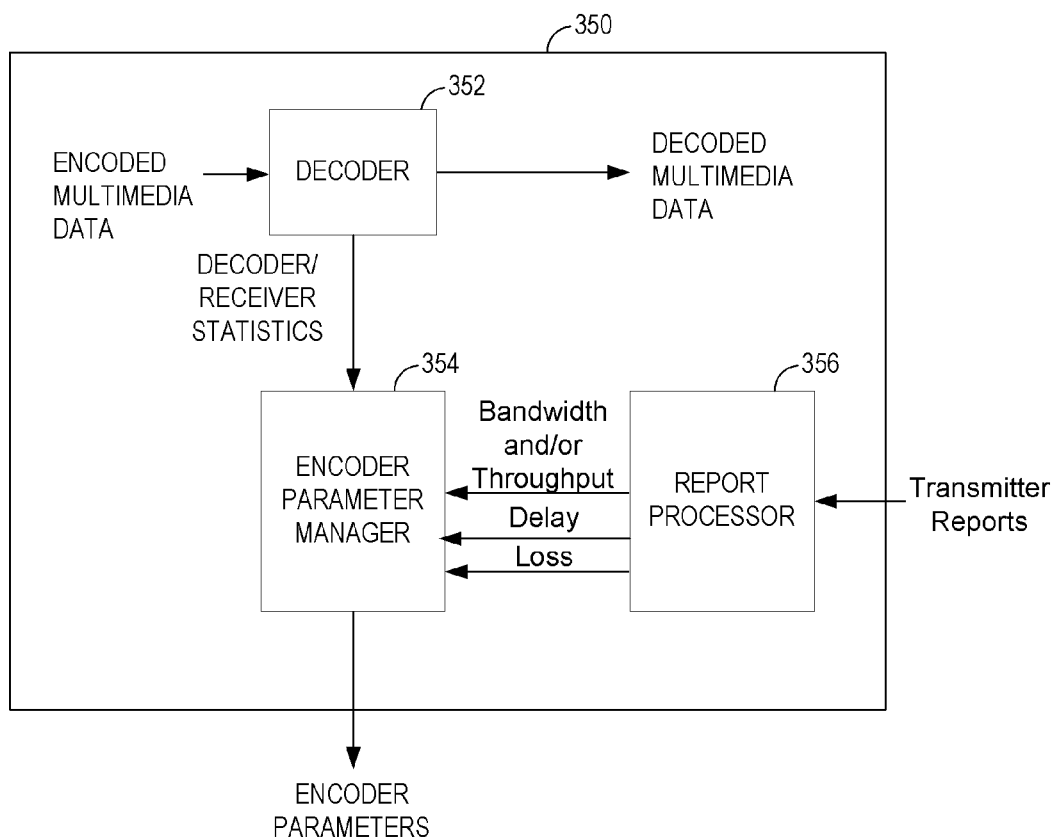
FIG. 3B illustrates a functional block diagram of an exemplary communication device.

FIG. 3B illustrates a functional block diagram of an exemplary communication device 350. In an embodiment, the communication device 350 may be implemented as wireless device 202 of FIG. 2. The communication device 350 includes a decoder 352, encoder parameter manager 354, and a report processor 356. The decoder 352 receives encoded multimedia data from an encoder, for example encoder 302. The decoder decodes the encoded multimedia data and outputs decoded multimedia data. The decoder may also send decoder and/or receiver statistical information to the encoder parameter manager 354.

The encoder parameter manager 354 determines encoding parameters to send to an encoder. For example, the encoder parameter manager 354 may send encoding parameters to device 300. The encoder parameters may be selected based at least in part on the decoded multimedia information, one or more characteristics of the source device 12 (e.g., power, processing capabilities, load), one or more characteristics of the destination device (e.g., power, processing capabilities, load, coupling with source device), one or more characteristics of the network, and/or other information available to the destination device 16. Aspects of determining encoding parameters by the encoder parameter manager 354 are discussed herein.

In an embodiment, the encoder parameters are determined based, at least in part, on bandwidth, throughput, delay, and loss information provided by the report processor 356. The encoder parameters may include an encoding bit rate. Encoder parameters may also include temporal adaptation parameters, spatial adaptation parameters, and error resiliency parameters. Error resiliency parameters may include a group of pictures (GOP) size, and/or parameters to control dynamic insertion of refresh frames, for example, in H.264 encoding. Error resiliency parameters may include dynamic slice configuration parameters and/or a dynamic application of temporal scalability.

Figure 12:
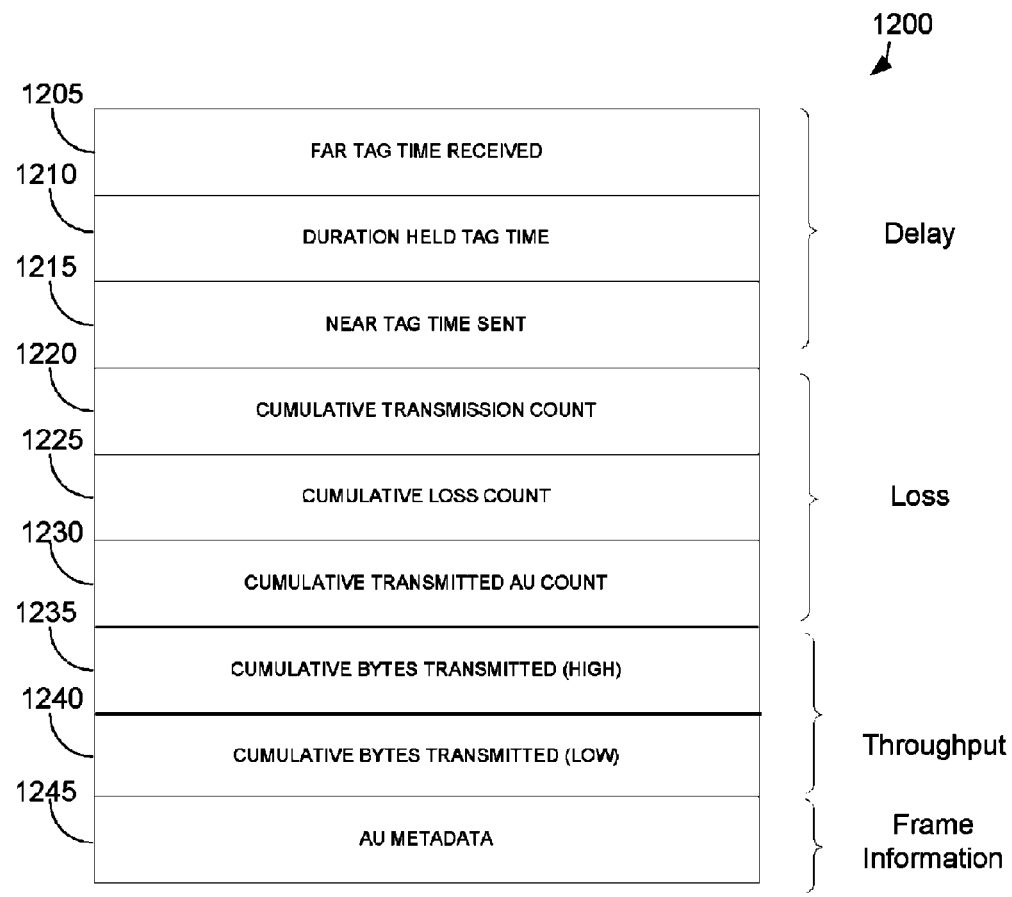
FIG. 12 illustrates one embodiment of a transmitter report 1200.

The report processor 356 sends one or more of bandwidth information, delay information, and loss information to the encoder parameter manager 354. In an embodiment, the report processor 356 receives transmitter reports from a transmitter of the encoded multimedia data. One embodiment of a transmitter report is shown in FIG. 12.

FIG. 4 illustrates one embodiment of a receiver report 400. The receiver report 400 includes data fields that may be utilized for achieving encoder adaptation. In an embodiment, these fields may be derived from a custom feedback structure, such as an RTP-extension. In an embodiment, the fields may be derived from a RTCP AVP and/or AVPF standard structures.

To dynamically adapt encoder parameters as described above based on conditions of a network between a transmitter and a receiver, a feedback loop between the transmitter and the receiver may be established. This feedback loop may utilize receiver reports to communicate information on received data to the transmitter. In an embodiment, receiver reports may be transmitted to the transmitter at a periodic interval, which may be configurable. In an embodiment, receiver reports may be event-triggered. For example, receiver reports may be transmitted when changes to one or more network conditions cross one or more predetermined thresholds. The size and structure of the receiver report, such as the number of fields, size of the fields, or the type of the fields, may vary from that shown in FIG. 4, and may also vary based on the network statistics being reported. In some embodiments, receiver reports may piggy-back on other network communication packets between the transmitter and the receiver. For example, in an embodiment utilizing the Real Time Protocol (RTP), receiver reports may be appended as a custom RTP extension payload format for video packets.

In some embodiments, receiver reports may be structured and communicated using the RTCP AVP and/or AVPF standards. For example, in an embodiment utilizing RTCP AVPF feedback protocols, the above information may be derived from a combination of fields in the Regular/Immediate mode RTCP Sender/Receiver Reports, Generic NACK, Picture Loss Indication (PLI), TMMBR/TMMBN tuples and Full Intra Request (FIR) messages.

The fields of the receiver report 400 may refer to a context of the transmitter of the receive report. The receiver report 400 may include a far tag time received field 405. The far tag time received field 405 may have been previously received by the transmitter of the receiver report 400. The receive report 400 also includes a duration held tag time 410. In an embodiment, the duration held tag time field 410 indicates a duration of time between when the far tag time provided in field 405 was received and the receiver report was transmitted. The receive report 400 also includes a near tag time sent field 415 In some embodiments, the near tag time sent field 415 will be returned as the far tag time received field 405, contained in a receiver report originating from a device receiving receive report 400. In some embodiments, the receiver of the receive report 400 is expected to transmit the near tag time field 415 back to the transmitter of the receive report. The receive report 400 also includes a cumulative receive count field 420. In one embodiment, the cumulative receive count field 420 indicates a cumulative number of received messages received by the receiver. In an embodiment, the cumulative receive count field 420 indicates a cumulative number of received packets received by the receiver. The receive report 400 also includes a cumulative loss count field 425. The cumulative loss count 425 indicates a cumulative number of lost messages or packets detected by the receiver generating the receiver report 400. The receive report 400 further includes a cumulative AU count field 430. The cumulative AU count field 430 indicates the cumulative number of video access units received by this receiver. The receiver report 400 further includes two cumulative bytes received fields 435 (high order bits) and 440 (low order bits). The cumulative bytes received fields 435 and 440 indicate a total number of bytes received within a network communication channel by the receiver sending the receive report 400. The receiver report 400 also includes an AU metadata field 445. The AU metadata field indicates frame information. In an embodiment, receiver reports may vary in size depending on whether they only carry delay related information, known as short receive reports, or if they also include network throughput and loss statistics, known as full receive reports.

As shown, the receiver report contains aggregate byte counts and receiver time-line information. Information contained in a receiver report may be used to calculate a moving average reception rate, $R_f(t)$, which is used as an indicator of throughput. In an embodiment, $R_f(t)$ may represent a rate in kilobits per second. In one embodiment, $R_f(t)$ may be derived as a rectangular moving average as:

$$R_f(t) = \frac{\left(\int_{t-\Delta t}^{t} b(t)\right)}{\Delta t} |\Delta t \geq \Delta t_f; R_v = K(\text{Constant}) \quad (2)$$

where:
$b(t)$ is the bytes received at time t on a receiver clock
$\Delta t$ is an interval for calculating an average
$\Delta t_f$ is a minimum interval for a reliable average, and
$R_v$ is the current transmitting rate The interval $\Delta t_f$ should be determined to ensure a reliable average that is robust to network jitter. To provide for an ability to adapt to a drop in network throughput within an acceptable timeframe, receiver reports providing byte counts and timing information used in calculating a throughput may be provided at a finer resolution than $\Delta t_f$, denoted as $\Delta t_{rr}$, where $\Delta t_{rr} \ll \Delta t_f$. In an embodiment, a transmitter may store previously received receiver reports. The transmitter may search the stored receiver reports for a most recent report such that $\Delta t \geq \Delta t_f$ at a static encoding rate $R_v$.

The throughput estimate may be improved by use of an averaging strategy to smooth network jitter. In an embodiment, a single-tap (LP) infinite impulse response (IIR) filter may be employed as:

$$R'_f(t_n) = \beta \cdot R'_f(t_n-1) + (1-\beta) \cdot R_f(t_n) \quad (3)$$

where:

$R'_f(t_k)$ is the one-tap IIR average throughput estimate at time $t_k$ (k=n, n−1)

$R_f(t_n)$ is the rectangular moving average throughput calculation for the current instant $t_n$ The calculated throughput above includes a delay $D_r(t_n)$ which may be composed of delays introduced when a receiver report is transmitted, and then received and parsed by the transmitter. Because of this delay, $R'_f(t_n)$ refers to a throughput estimate at the receiver as observed at time $(t_n-D_r(t_n))$ on the transmitter's clock. To use the calculated throughput, a consumption to production measurement is determined. This measurement will generally not fall below a threshold for a given number of tokens. This measurement is discussed in more detail with respect to FIG. 5.

Figure 5A:
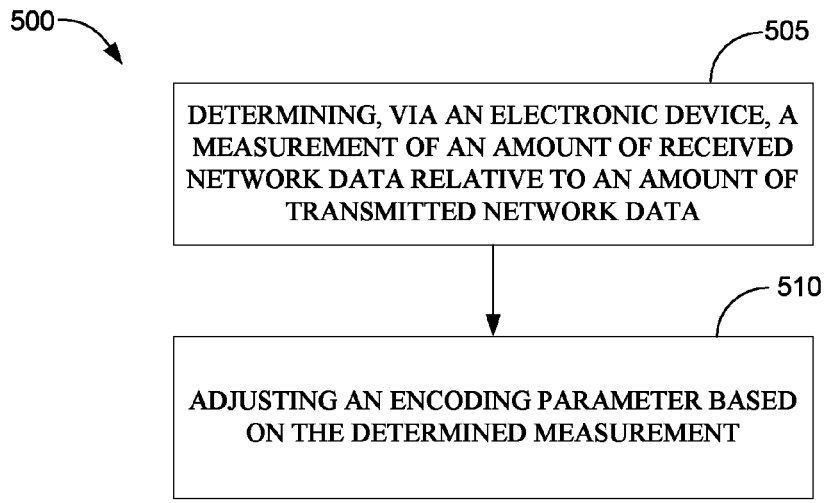
FIG. 5A illustrates a process flow diagram for a method of encoding multimedia information.

FIG. 5A illustrates a process flow diagram for a method of encoding multimedia information. In an embodiment, process 500 may be performed by the wireless device 202 illustrated in FIG. 2. In processing block 505, a measurement of an amount of received network data relative to an amount of transmitted network data is determined via an electronic device. In some aspects, the measurement may be a ratio of received network data to transmitted network data. In an embodiment, the ratio may be calculated as:

$$\rho(t_n) = R'_f(t_n)/R_v(t_n) \quad (4)$$

where:

$t_n$ is a time n at a transmitting node $R_v(t_n)$ is an encoding rate at time n $R'_f(t_n)$ is a receiving rate at time n In an embodiment, a transmitter may maintain a record of an encoding or transmitting rate over time. For example, an embodiment may define a duration of time during which an amount of data encoded or transmitted is accumulated and recorded. When the duration of time has expired, a second time period may begin, with the amount of data encoded or transmitted during the second time period accumulated and recorded. This process repeats, resulting in a series of recorded encoding or transmitting rates, representing an amount of data encoded over each successive time period.

In an embodiment, the receiving rate, such as $R'_f(t_n)$, may be determined based on a report received from a receiver, such as the receiver report described with respect to FIG. 4. In an embodiment, receiver reports may be received periodically. In an embodiment, the transmission of receiver reports may be event-triggered. In an embodiment, both event-triggered and periodic receive reports may be transmitted. In an embodiment, the frequency with which receiver reports are received may be correlated with the frequency with which the encoding rates are accumulated and stored as discussed above. In another embodiment, the frequency of receiver reports may be uncorrelated with the frequency at which encoding or transmitting information is accumulated.

In an embodiment, the ratio of received network data to transmitted network data may be based on a receiving rate and a transmission rate correlated in time as discussed above. For example, the rates used to determine the ratio may be delay adjusted moving average rates. In some embodiments, the transmitting rates and receiving rates may be correlated by adjusting the receiving rate information based on a delay. For example, receiving information may be transmitted by a receiver in a receiver report to a transmitter. The receiver report may be received by the transmitter after a delay period caused by at least network delays and delays associated with the receiver assembling and packaging the receiving information for transmission to the transmitter.

Because the transmitter and receiver may not share a common clock, it may not be possible to correlate transmitting information and receiving information based on a timestamp or other absolute timing information. Instead, estimate determined delay from when receiving information is collected to when the receiving information is received by the transmitter may be used to correlate the receiving information with transmitting information. In an embodiment, the delay may be determined in a manner substantially in accordance with process 1100, illustrated in FIG. 11. By correlating an encoding rate and a receiving rate for a single time period, the ratio more accurately reflects the relationship between consumption and production during the single time period.

The ratio, in an embodiment $\rho(t_n)$, may provide an indication of network conditions between a transmitter and a receiver. For example, if the ratio is approximately one (1), this may indicate that a rate of transmission at a time $t_n$ minus a delay $D_r(t_n)$ was sustainable. In some embodiments, a ratio within a distance $\alpha$ from one (1) may also be considered to indicate sustainable network conditions. A ratio of approximately one (1) or one $(1) \pm \alpha$ does not necessarily indicate 100% channel utilization.

If the ratio is less than one, or less than $(1-\alpha)$ as described above, it may indicate a current encoding or transmission rate, for example, $R_v(t_n)$ in an embodiment utilizing equation (1), is not sustainable. To verify a low ratio indicates a transmission rate is not sustainable, a transmitter may maintain a record of transmitter or encoder delay-adjusted moving average output rates, for example, $\{r_v(t_n), r_v(t_{n-1}), r_v(t_{n-2}), \ldots\}$. The ratio may then be calculated as:

$$\rho(t_n) = R'_f(t_n)/r_v(t_n)' \quad (5)$$

where:

$t_n$ is a transmitter instant in time when receiver report 'n' is received $R'_f(t_n)$ is the one-tap IIR average throughput estimate at time $t_n$ (from equation (3))

$r_v(t_n)$ is measured over the interval $[t_{n-1}-D_R(t_{n-1}), t_n-D_R(t_n)]$, and $D_R(t_n)$ is an average reverse direction delay for receiver report arrival at time $t_n$ If the ratio is greater than one, or greater than $(1)+\alpha$ as described above, it may indicate that buffered data in the network is being received at a rate higher than new data is being encoded and sent over the network. A ratio greater than one may be experienced after a network recovers from a period of reduced throughput. During the period of reduced throughput, transmission of data by a data source into the network based on an encoding rate may exceed a capacity of the network to transfer data to the receiver. Some of this excess data may be buffered, and some of the excess data may be dropped. When the network recovers and throughput of the network increases, the buffered data in the network may be sent to the receiver. This data may be received by the receiver at a rate that exceeds the transmission rate.

At block 510, an encoding parameter is adjusted based on the determined measurement. Encoding parameters adjusted based on the measurement may include bit rate parameters, temporal adaptation parameters, spatial adaptation parameters, or error resiliency parameters, as discussed previously. In an embodiment, if the determined measurement is a ratio, and the ratio is less than one, or $(1 \pm \alpha)$ as described above, one or more encoding parameters may be adjusted to reduce the size of encoded multimedia data generated by an encoder. In an embodiment, encoding parameters may be adjusted to render encoded data more resilient to errors if the determined ratio is less than one, or less than (1±α). For example, the encoding bit rate may be reduced if the determined measurement is less than one, or (1±α) as described above. In an embodiment, the encoding bit rate may be increased if a predetermined number of sequential ratios are more than one, or (1±α) as described above.

In an embodiment, an encoding parameter may not be adjusted until a sequential threshold number $F_\rho$ of ratios are determined to be less than one (1) or (1−α). For example, if a ratio is determined for each sequential token or quanta, a predetermined number $F_\rho$ of sequential tokens having a ratio less than (1−α) may be necessary before an encoding parameter is adjusted. This may avoid over reacting to spurious deviations in network state.

In an embodiment, an encoding parameter may be adjusted when fewer than $F_\rho$ sequential ratios are determined to be less than (1−α) and a forward link delay estimate is above a second threshold, for example, denoted as $D_F(t_n) \geq D_F^U$.

Figure 5B:
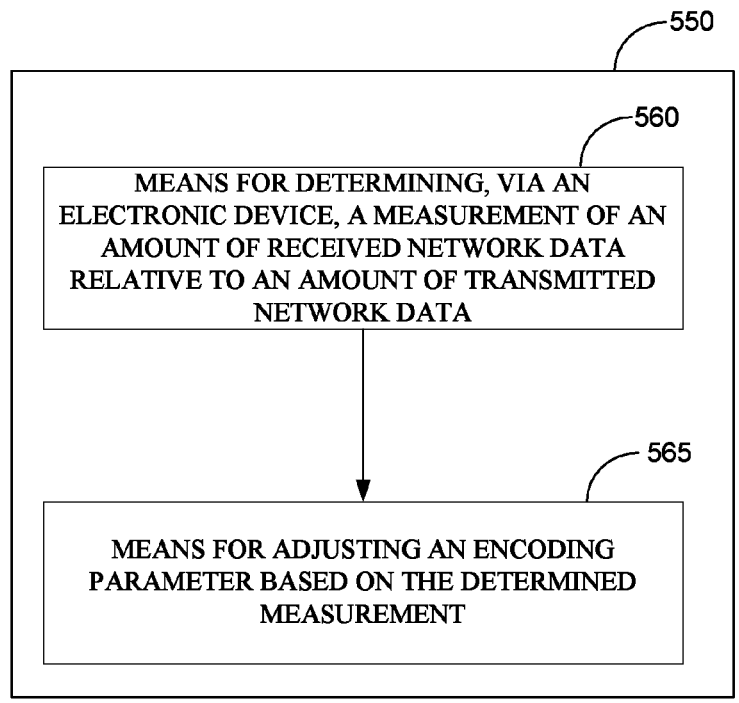
FIG. 5B is a functional block diagram of an exemplary device 550.

In an embodiment, the receiver side throughput influence on a transmission rate may be expressed with the following Boolean functional:

$$B(R_v(t_n+1)<(R_v(t_n))=\{\rho(t_n)<(1-\alpha)\&f_p\geq F_p\}|\{\rho(t_n)<(1-\alpha)\&D_F(t_n)\geq D_F^U\} \quad (6)$$

where:
$t_n$ is a transmitter time instant when a receiver report 'n' is received
$R_v(t_n)$ is an encoding rate at time instant $t_n$
$\rho(t_n)$ is the ratio of received network data to transmitted network data (eq (5))
$f_p$ is a number of sequential determined ratios indicating low throughput
$F_p$ is a threshold number of sequential determined ratios indicating low-throughput
$D_F(t_n)$ is a forward-path delay estimate at transmitter time instant $t_n$, and
$D_F^U$ is a forward-path high delay threshold Note that while in the embodiment discussed above, some transmission or encoding adjustments are performed when the ratio is less than one or less than (1−α), it should be understood that other embodiments may determine a ratio that is the inverse of the ratio disclosed in the embodiment above. In these other embodiments, adjustments to transmission or encoding parameters may be performed in an opposite manner as those described above. For example, in these embodiments, if the determined ratio is more than one, or (1±α), one or more encoding parameters may be adjusted to reduce the size of encoded multimedia data generated by an encoder. In an embodiment, encoding parameters may be adjusted to render encoded data more resilient to errors if the determined ratio is more than one, or more than (1+α). For example, the encoding bit rate may be reduced if the determined ratio is more than one, or (1+α) as described above. In an embodiment, the encoding bit rate may be increased if a predetermined number of sequential ratios are less than one, or (1−α). FIG. 5B is a functional block diagram of an exemplary device 550. In an embodiment, device 550 may be implemented as wireless device 202, illustrated in FIG. 2. The device 550 includes means 560 for determining, via an electronic device, a measurement of an amount of received network data relative to an amount of transmitted network data. In an embodiment, means 560 may be configured to perform one or more of the functions discussed above with respect to block 505. The means for determining a measurement 560 may include a processor, such as processor 204 of FIG. 2. Means 560 may also include one or more of a signal generator, transceiver, decoder, or a combination of hardware and/or software component(s), circuits, and/or module(s). The device 550 further includes means 565 for adjusting an encoding parameter based on the determined measurement. In an embodiment, means 565 may be configured to perform one or more of the functions discussed above with respect to block 510. The means 565 for adjusting an encoding parameter based on the determined ratio may include a processor, such as processor 204 of FIG. 2. Means 565 may also include one or more of a processor, signal generator, transceiver, decoder, or a combination of hardware and/or software component(s), circuits, and/or module(s).

Figure 5C:
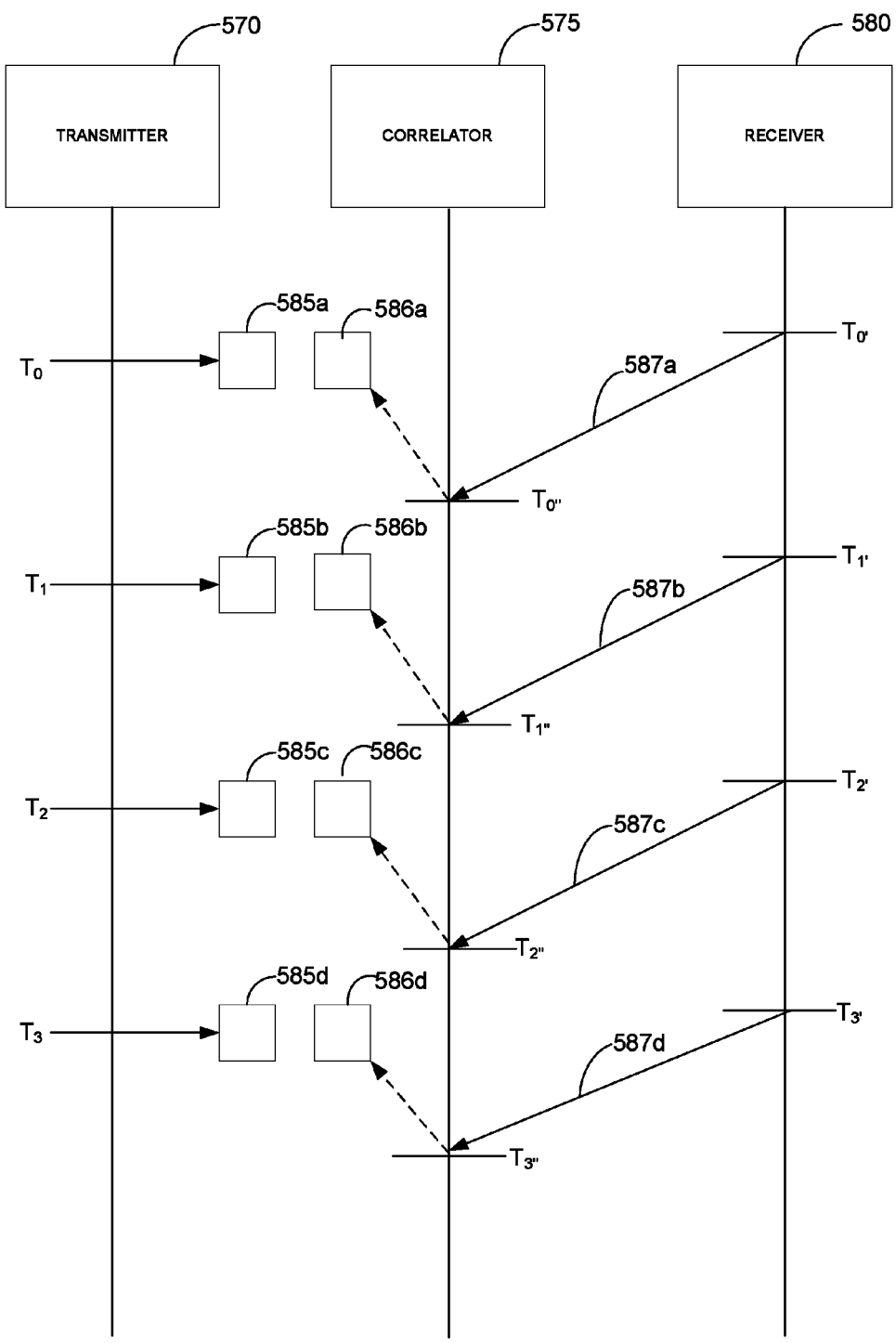
FIG. 5C is an example of a timing diagram illustrating the correlation of transmitting information with receiving information.

FIG. 5C is a timing diagram illustrating the correlation of transmitting information with receiving information. FIG. 5C shows a transmitter 570, receiver 580, and a correlater 575. In an embodiment, any of the transmitter 570, correlator 575, or receiver 580 may be implemented by the wireless device 202, illustrated in FIG. 2. As shown in FIG. 5C, the transmitter 570 generates transmitting information periodically. FIG. 5C shows transmitting information 585a-d generated at times $T_{0-3}$ respectively. Receiver 580 is shown transmitting receiver reports 587a-d to correlator 575. These receiving reports are generated by the receiver 580 at times $T_{0'-3'}$ respectively. Because of at least network delays, receiving reports 587a-d are received by the correlator 575 at times $T_{0''-3''}$ respectively. Based on a network delay, correlator 575 may correlate the transmitting information 585a-d with receiving information 586a-d. This is shown in FIG. 5C as the dashed arrows associating receiving information 586a-d with transmitting information 585a-d. In an embodiment, correlator 575 and transmitter 570 may be implemented in the same wireless device.

Figure 6A:
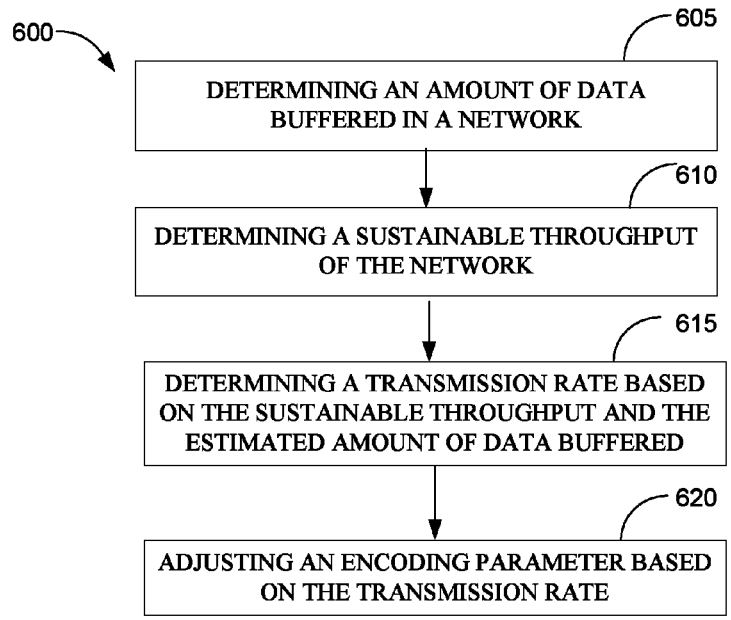
FIG. 6A illustrates a process flow diagram for a method of encoding multimedia information.

FIG. 6A illustrates a process flow diagram for a method of encoding multimedia information. In an embodiment, process 600 may be performed by the wireless device 202 illustrated in FIG. 2. In processing block 605, an amount of data buffered in a network is determined.

In an embodiment, the amount of data buffered may be determined based at least in part on a period of time during which an amount of data transmitted via the network exceeded the network's capacity during the period. In an embodiment, this period of time may be determined as:

$$T_R \approx F_\rho \cdot \Delta t_{RR} \quad (7)$$

where:
$T_R$ is a reaction time
$F_\rho$ is a token threshold for throughput based rate reduction, and
$\Delta t_{RR}$ is a receiver report interval In an embodiment, the amount of data buffered in the network may be based at least in part on how much the amount of data transmitted exceeds the network's capacity during the time period. In an embodiment, if a transmission rate is $R_v(t_n)$ the amount the transmission rate exceeds the network's capacity at an instant in time $t_n$ may be expressed as:

$$R_{surplus} = R_v(t_n) - R'_f(t_n) \quad (8)$$

where:
$R'_f(t_n)$ is an estimated receiver throughput at time instant $t_n$
(see equation (3))

In an embodiment, the amount of data buffered in a network may then be determined as:

$$b_R = R_{surplus} \cdot T_R \text{ or} \quad (9)$$

$$b_R = (R_v(t_n) - R'_f(t_n)) \cdot F_\rho \cdot \Delta t_{RR} \quad (10)$$

In processing block 610, a sustainable throughput of the network is determined. In an embodiment, the sustainable throughput may be based, at least in part, on a margin of safety. The margin of safety may be determined so as to provide an opportunity for data buffered during a period of reduced network capacity (for example, due to network congestion or hardware failure) to complete transmission after the network's capacity improves. In some embodiments, the margin of safety may be based, at least in part, on a percentage of a determined network capacity. For example, in an embodiment, ten percent of a determined network capacity may be reserved to provide an excess capacity.

In block 615, a transmission rate is determined based on the sustainable throughput and the amount of data buffered. In an embodiment, the transmission rate should be determined such that the amount of data buffered in a network is eliminated or drained within a time period $t_R$. In some environments, a value of one second for time period $t_R$ provides good results. In an embodiment, the transmission rate may be determined as:

$$r_v(t_{n+1}) = R'_v(t_n)(1 - R_H^{\%}) - b_R \quad (11)$$

where:
$R_H^{\%}$ represents a percentage of network capacity based on the margin of safety discussed above, and
$b_R$ represents the amount of data buffered in the network
$t_R$ is assumed to be unity (1 second)

In an embodiment, a final rate $R_v(t_n+1)$ may be obtained by quantizing $r_v(t_n+1)$ to a value from an operational range of rates $R_v(D)$ as:

$$R_v(t_{n+1}) = \text{Quant}(R_v(D)[r_v(t_{n+1})]), \text{where } R_v \leq r_v \quad (12)$$

In block 620, an encoding parameter is adjusted based on the transmission rate. Encoding parameters adjusted based on the transmission rate may include bit rate parameters, temporal adaptation parameters, spatial adaptation parameters, or error resiliency parameters, as discussed previously.

Figure 6B:
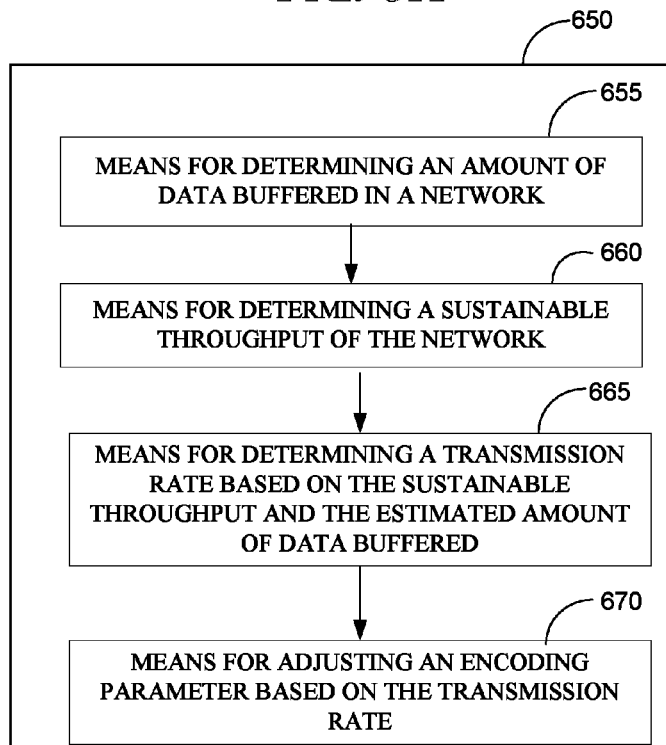
FIG. 6B is a functional block diagram of an exemplary device 650.

FIG. 6B is a functional block diagram of an exemplary device 650. In an embodiment, device 650 may be implemented as wireless device 202, illustrated in FIG. 2. The device 650 includes means 655 for determining an amount of data buffered in a network. In an embodiment, means 655 may be configured to perform one or more of the functions discussed above with respect to block 605. The means for determining an amount of data buffered may include a processor, such as processor 204 of FIG. 2. Means 655 may also include one or more of a signal generator, transceiver, decoder, or a combination of hardware and/or software component(s), circuits, and/or module(s). The device 650 further includes means 660 for determining a sustainable throughput of the network. In an embodiment, means 660 may be configured to perform one or more of the functions discussed above with respect to block 610. The means 660 for determining an amount of data buffered in a network may include a processor, such as processor 204 of FIG. 2. Means 660 may also include one or more of a processor, signal generator, transceiver, decoder, or a combination of hardware and/or software component(s), circuits, and/or module(s). The device 650 further includes means 665 for determining a transmission rate based on the sustainable throughput and the amount of data buffered. In an embodiment, means 665 may be configured to perform one or more of the functions discussed above with respect to block 615. The means 665 for determining an amount of data buffered in a network may include a processor, such as processor 204 of FIG. 2. Means 665 may also include one or more of a processor, signal generator, transceiver, decoder, or a combination of hardware and/or software component(s), circuits, and/or module(s). The device 650 further includes means 670 for adjusting an encoding parameter based on the transmission rate. In an embodiment, means 670 may be configured to perform one or more of the functions discussed above with respect to block 620. The means 670 for adjusting an encoding parameter based on the transmission rate may include a processor, such as processor 204 of FIG. 2. Means 670 may also include one or more of a processor, signal generator, transceiver, decoder, or a combination of hardware and/or software component(s), circuits, and/or module(s).

Figure 6C:
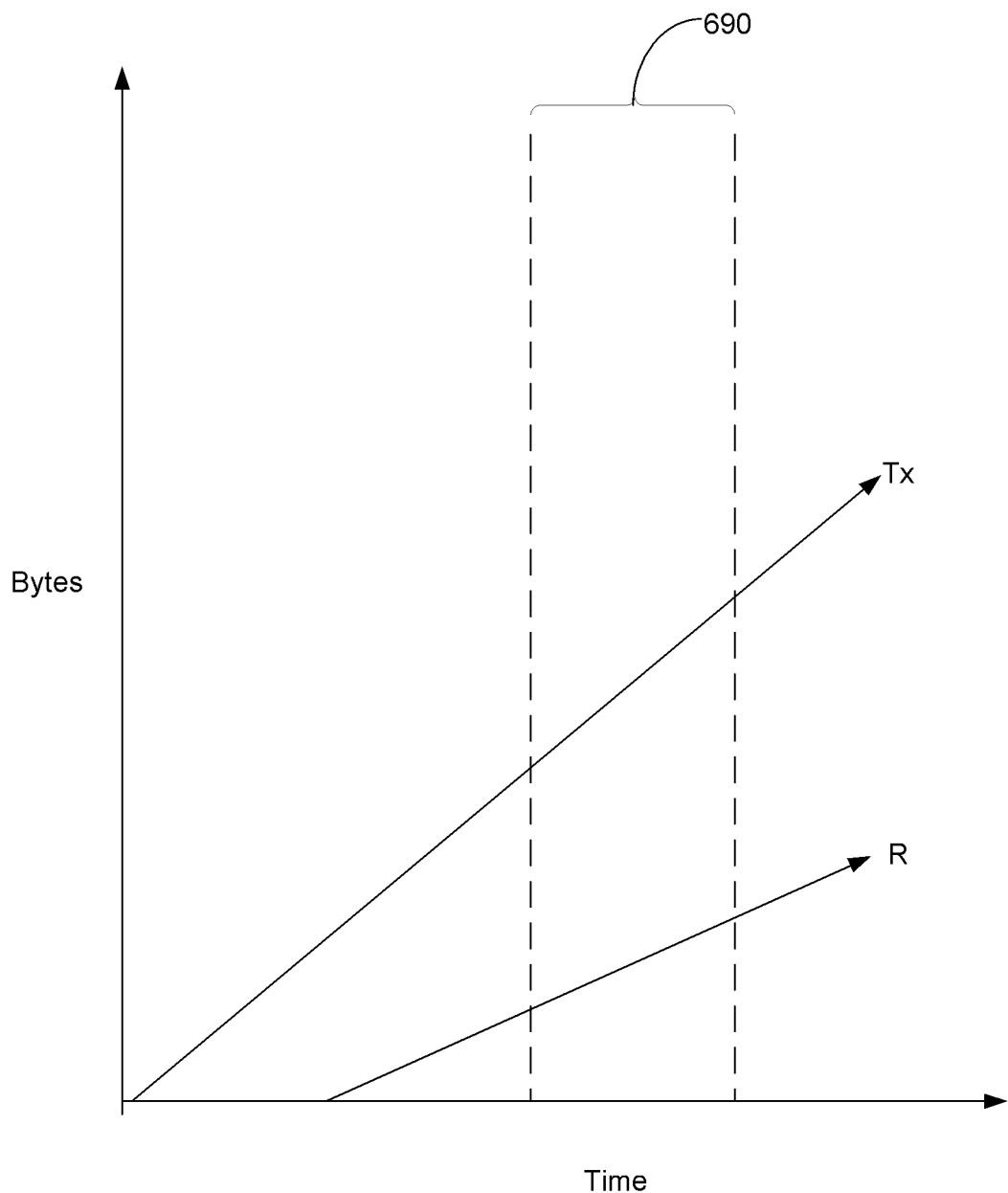
FIG. 6C illustrates a transmission rate and a reception rate.

FIG. 6C illustrates a transmission rate and a reception rate. As observed, the upper line "Tx" represents a transmission rate that is exceeding the receiving rate indicated by the lower line "R." Time period 690 represents at least a portion of a duration of time during which the transmission rate is exceeding the reception rate. The difference between the transmission and reception rate is represented by differences in a slope of the Tx and R lines. In an embodiment, an amount of data buffered in a network may be determined based on time period 690 and a difference between a transmission rate and a reception rate during that time.

Figure 7:
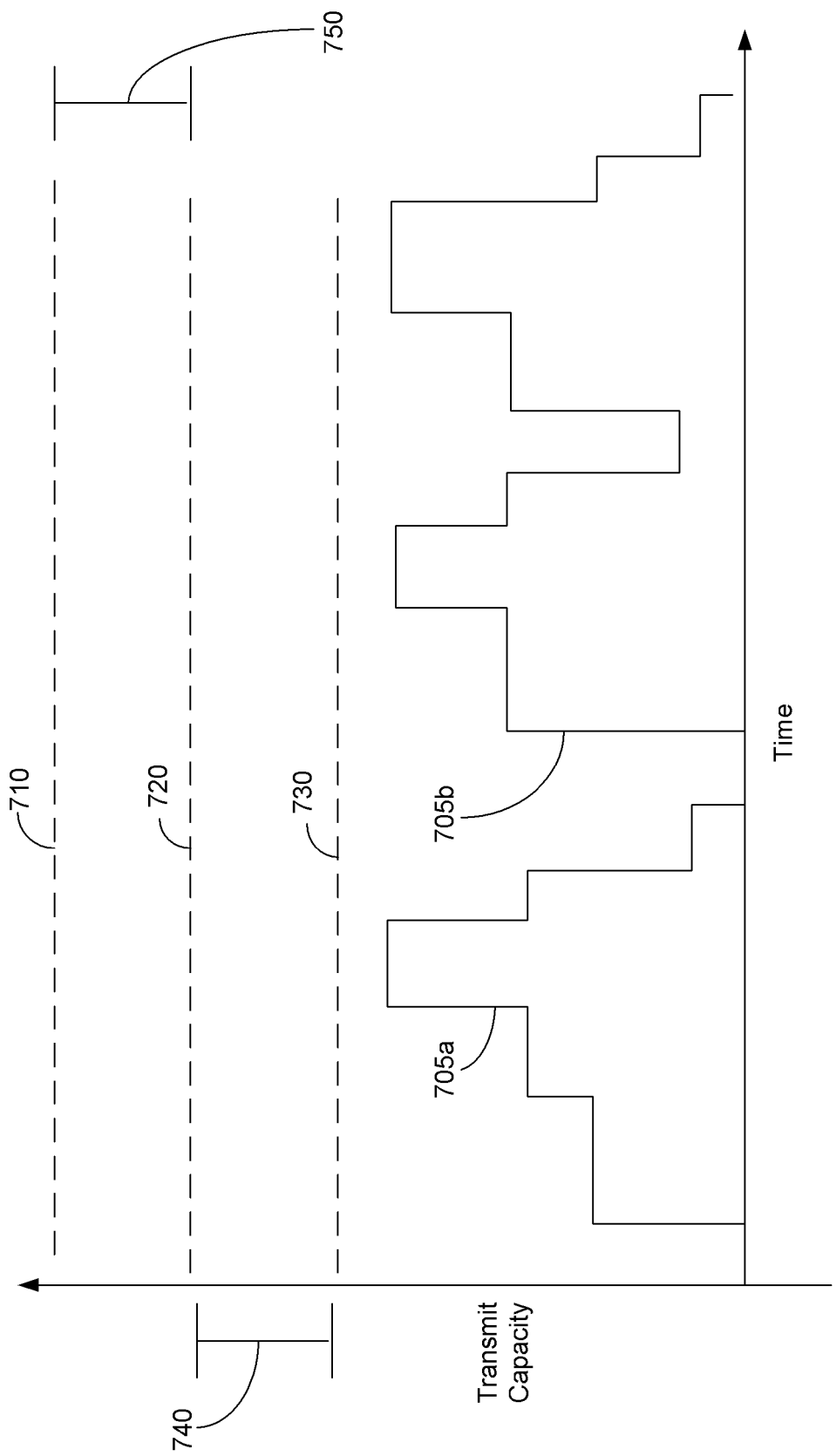
FIG. 7 illustrates a transmission rate of a transmitter over time that is implementing at least one of the operative embodiments.

FIG. 7 illustrates a transmission rate of a transmitter over time that is implementing at least one of the operative embodiments. FIG. 7 illustrates a network capacity 710. In an embodiment, a transmission rate may be discounted or reduced from the network capacity 710 based on an amount of data buffered in the network. The amount of this reduction is represented by rate difference 750, providing a reduced transmission rate represented by transmission rate 720. Rate 720 may be further discounted or reduced by a margin of safety as discussed with respect to FIG. 6A. The margin of safety is represented by rate reduction 740. The resulting further reduced transmission rate is represented by line 730. This further reduced transmission rate 730 may be known as a sustainable transmission rate. In an embodiment, actual transmission rates 705a-b shown in FIG. 7 vary below the sustainable network capacity 730 but do not exceed sustainable network capacity 730.

Figure 8A:
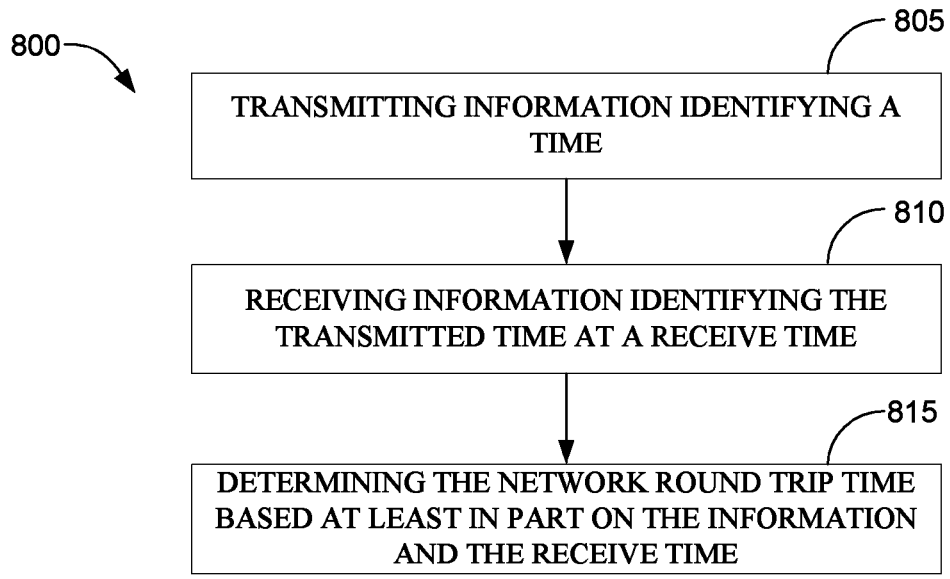
FIG. 8A illustrates a process flow diagram for a method of determining a network round trip time.

FIG. 8A illustrates a process flow diagram for a method of determining a network round trip time. One challenge with reliable and accurate measurement of delay is the absence of a common clock across all elements of a network communication. Many feedback protocols require a common clock facility (for example, RTCP requires such a facility) or the use of the NTP 64-bit clock protocol. With NTP, each device communicates with an NTP server, which provides a clock time over a network connection. Obtaining real-time NTP time-stamps may provide variable and unknown latency in some networking environments. These NTP time-stamps may be unable to accurately provide time information relevant to adjusting transmission rates as a network capacity varies.

Process 800 described below determines a network round trip time via an exchange of time indicators between a transmitting and a receiving node. In an embodiment, process 800 may be performed by the wireless device 202 illustrated in FIG. 2. In an embodiment, process 800 may be performed by a transmitting node. In some aspects, process 800 may be performed as part of one or more of processes 500 or 600, discussed above. Process 800 may also be performed in some aspects of processes 900, 1300, or 1400, discussed below.

In processing block 805, information identifying a time is transmitted. In an embodiment, the information is a time-stamp. In another embodiment, the information may be an index or other reference identifying a storage location storing a timestamp. In an embodiment, the information may be transmitted over a network to a receiving node. In block 810, information identifying the transmitted time is received at a receive time. In an embodiment, the received information is a timestamp transmitted in block 805. In an embodiment, the information received in block 810 is transmitted by the receiving node.

In block 815, a network round trip time is determined based at least in part on the information and the receive time. In an embodiment, the round trip time is based at least in part on an elapsed time. The elapsed time may be determined based at least in part on a time the information was transmitted in block 805 and a time the information identifying the transmitted time is received in block 810. For example, in an embodiment, the elapsed time may be a time the information is transmitted in block 805 subtracted from a time information is received in block 810. In an embodiment, the round trip time may also be based on a determined response time of the receiving node. For example, the round trip time may be determined by subtracting the determined response time of the receiving node from the elapsed time.

In an embodiment, blocks 805 and 810 are performed iteratively. In this embodiment, multiple elapsed times may be determined based on the results of each iteration. In an embodiment, each of these multiple elapsed times may be adjusted based on determined response time. The network round trip time may then be determined based on the multiple elapsed times. For example, the multiple elapsed times may be averaged to determine the network round trip time. In another embodiment, a moving average of multiple elapsed times may be determined as a network round trip time. In an embodiment, the network round trip time may be determined as the average elapsed time since a full receive report has been received. In an embodiment, process 800 may be performed by both the transmitting and receiving nodes discussed above.

In an embodiment, the determined network round trip time may be smoothed by filtering through a low pass and single-tap Infinite Impulse Response (IIR) filter. For example:

$$\Delta'_{RR}(t_n+1)=\beta \cdot \Delta'_{RR}(t_n)+(1-\beta) \cdot \Delta_{RR}(t_n) \quad (13)$$

where:

$\Delta'_{RR}(t_k)$ is the one-tap IIR average throughput estimate at time $t_k$ (k=n, n+1)

Figure 8B:
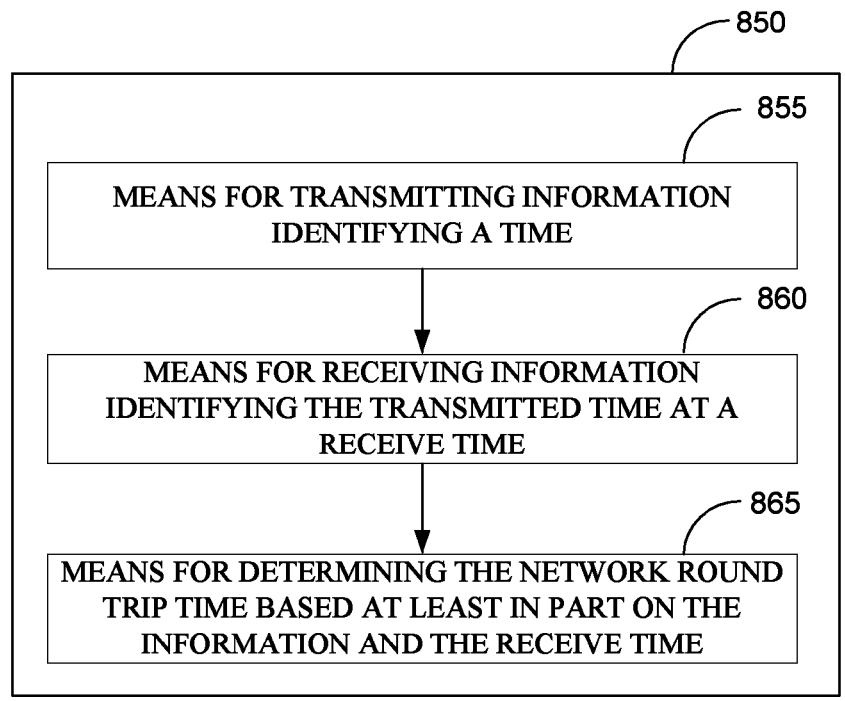
FIG. 8B is a functional block diagram of an exemplary device 850.

$\Delta_{RR}(t_n)$ is the rectangular moving average throughput calculation for the current instant $t_n$ FIG. 8B is a functional block diagram of an exemplary device 850. In an embodiment, device 850 may be implemented as wireless device 202, illustrated in FIG. 2. The device 850 includes means 855 for transmitting information identifying a time. In an embodiment, means 855 may be configured to perform one or more of the functions discussed above with respect to block 805. In an embodiment, the means for transmitting information identifying a time may include a transmitter, such as transmitter 210 of FIG. 2. Means 855 may also include one or more of a processor, signal generator, transceiver, decoder, or a combination of hardware and/or software component(s), circuits, and/or module(s). The device 850 further includes means 860 for receiving information identifying the transmitted time at a receive time. In an embodiment, means 860 may be configured to perform one or more of the functions discussed above with respect to block 810. The means 860 for receiving information identifying the transmitted time may include a receiver, such as receiver 212 of FIG. 2. Means 860 may also include one or more of a processor, signal generator, transceiver, decoder, or a combination of hardware and/or software component(s), circuits, and/or module(s). The device 850 further includes means 865 for determining the network round trip time based at least in part on the information and the receive time. In an embodiment, means 865 may be configured to perform one or more of the functions discussed above with respect to block 815. In an embodiment, the means for determining the network round trip time based at least in part on the information and the receive time may include a processor, such as processor 204 of FIG. 2. Means 865 may also include one or more of a signal generator, transceiver, decoder, or a combination of hardware and/or software component(s), circuits, and/or module(s).

Figure 8C:
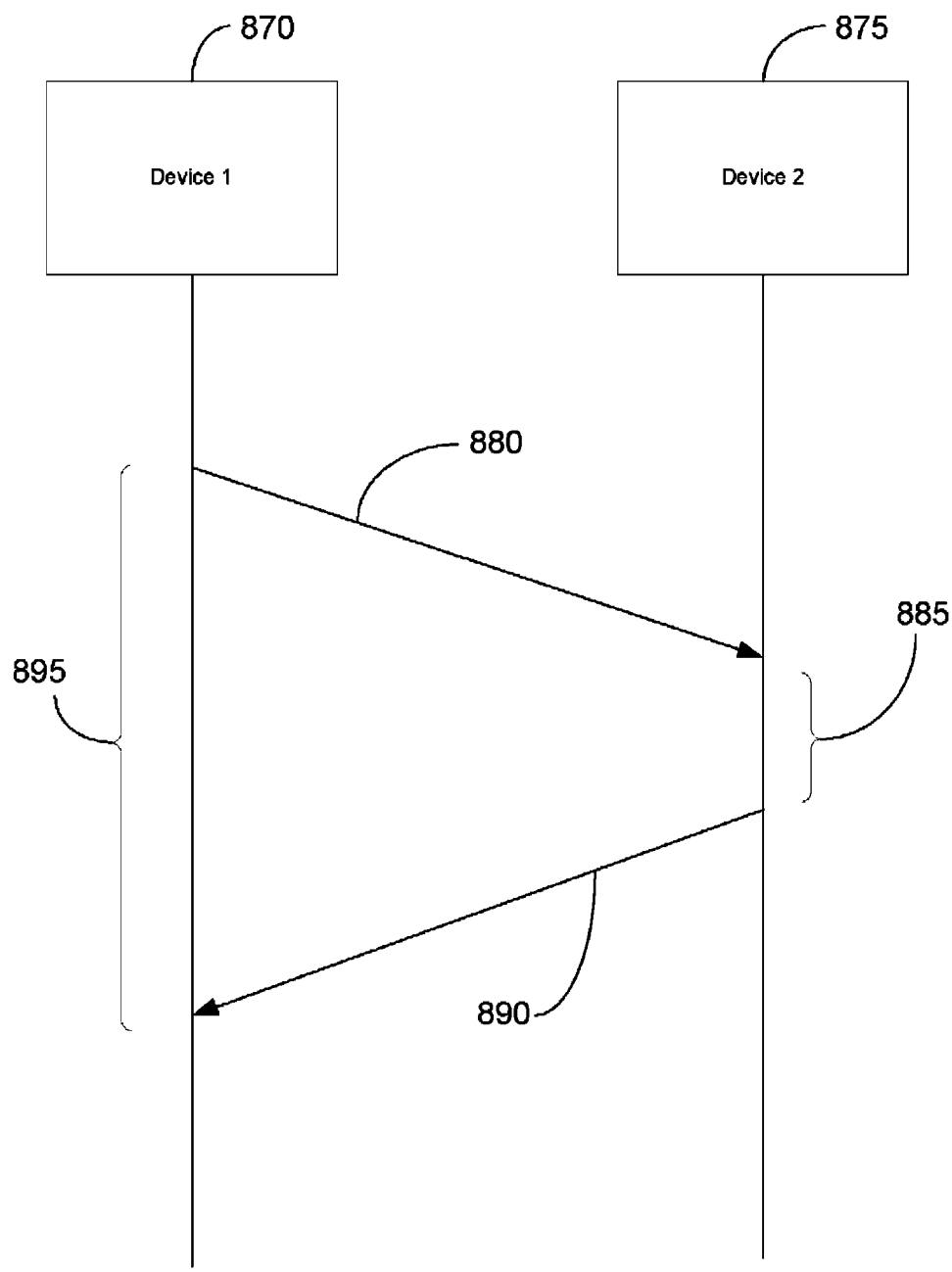
FIG. 8C is a sequence diagram illustrating messages transmitted and received in one embodiment of a method of determining a network round trip time.

FIG. 8C is a sequence diagram illustrating messages transmitted and received in one embodiment of a method of determining a network round trip time. Shown are two devices 870 and 875. In an embodiment, either device 870 or device 875 may be wireless device 202 illustrated in FIG. 2. In some aspects, device 1 870 shown in FIG. 8C may perform process 800 discussed above. As shown in FIG. 8C, device 870 first sends a message 880 to device 875. Message 880 may include an indication of a time. Upon receiving the message 880, device 875 transmits a message 890 to device 870. Message 890 may include an indication of the time referenced in message 880. Device 875 introduces a delay 885 between the time message 880 is received until the time device 875 transmits message 890 to device 870. The total elapsed time experienced by device 870 from sending message 880 until message 890 is received is elapsed time 895. In an embodiment, a round trip time may be based on elapsed time 895. In an embodiment, the round trip time may also be based on the delay 885 or an estimate of the delay 885. For example, a round trip time may be determined by subtracting the delay 885 if known or an estimate of delay 885 from elapsed time 895. In an embodiment, the sequence of messages shown in FIG. 8C may be exchanged iteratively. An estimated round trip time may then be determined based on multiple values of elapsed time 895 resulting from the iterative exchange of the messages shown in FIG. 8C. For example, the multiple values may be averaged to determine a round trip time. Note that while FIG. 8C illustrates device 870 sending message 880 to device 875 and device 875 sending message 890 to device 870, in some embodiments, the roles of the two devices may be reversed. In some embodiments, the message exchange illustrated in FIG. 8C will be performed in both directions. For example, device 870 will send message 880 to device 875, and device 875 will send message 880 to device 870. Device 875 may send a message 890 to device 870, and device 870 may send a message 890 to device 875.

Figure 9A:
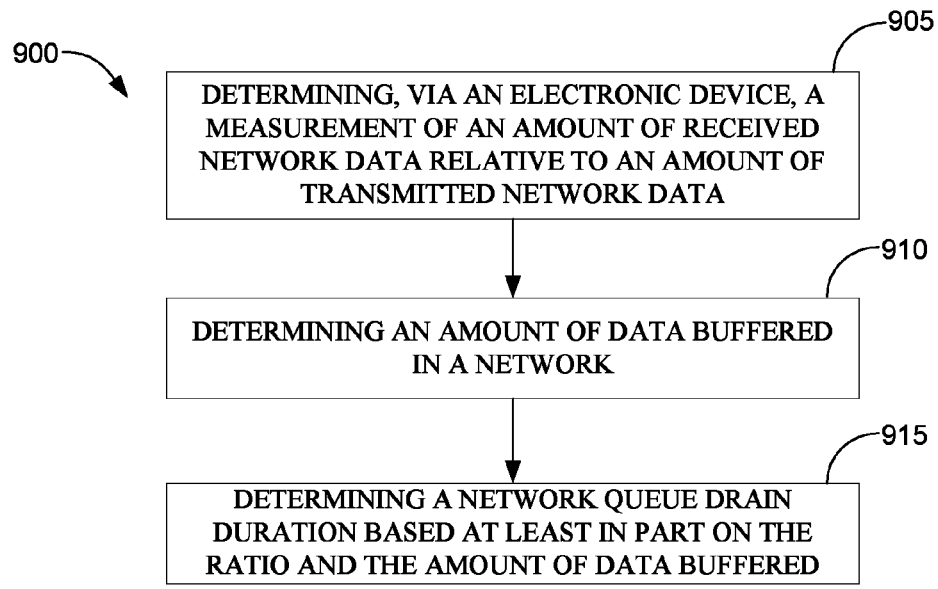
FIG. 9A illustrates a process flow diagram for a method of determining a network queue drain duration.

FIG. 9A illustrates a process flow diagram for a method of determining a network queue drain duration. When a bandwidth constriction develops in a network, transmitting nodes may not react instantaneously. Therefore, transmitting nodes may continue to transmit at a rate higher than a reduced network capacity caused by the bandwidth constriction can support. During this period, the unsustainable transmission rate may result in the buffering of data in the network, and potentially packet loss. After the cause of the constriction is alleviated, network capacity may improve. When this occurs, the data buffered in the network may be transferred through the network to its destination. If transmission rates have been reduced due to the constriction, the amount of buffered data in the network may reduce. This process of buffered data reduction may be referred to as network drain or buffer drain. The time necessary to drain the network of buffered data may depend on a network throughput available after the constriction is alleviated. From the previous discussion above, the buffer build up in a network can be determined in an embodiment by:

$$b_R = (R_v(t_n) - R'_f(t_n)) \cdot F_\rho \cdot \Delta t_{RR} \qquad (14)$$

Therefore, the time $t_d$ to drain $b_R$ in this embodiment can be represented as:

$$\int_0^{td} (B(t) - r_v(t)) dt) = b_R \qquad (15)$$

Another embodiment is represented by process 900. In an embodiment, process 900 may be performed by the wireless device 202 illustrated in FIG. 2. In processing block 905 a measurement of an amount of received network data relative to an amount of transmitted network data is determined. In an embodiment, the measurement may be a ratio of received network data to transmitted network data. In some aspects, block 905 may be performed substantially in conformance with the description of block 505, discussed above with respect to FIG. 5A. In an embodiment, when the ratio is greater than one, or $(1+\alpha)$, the amount of data being removed from the network (by being received) is greater than the amount of data being added to the network (by being transmitted). When this occurs, the network may be said to be "draining," in that excess data is being removed from the network. For example, packets buffered in one or more network devices along a network path between a transmitter and a receiver may move along the network path and eventually be received by the receiver, thus removing them from the network. If the received packets are not replaced, via transmission of new packets, at the rate at which they are received, the ratio may be greater than one. In an embodiment, the size of the ratio may represent how quickly the network is draining. For example, a network with a ratio of three (3) may drain more quickly than a network with a ratio of two (2).

In block 910, an amount of data buffered in a network is determined. The amount of data buffered in the network may affect the time required to drain the buffered data. In some aspects, block 910 may be performed substantially in conformance with the description of block 605 discussed above with respect to FIG. 6A. In block 915, a network queue drain duration is determined based at least in part on the measurement and on the amount of data buffered. In some aspects, the network queue drain duration may be determined according to Equation (15) discussed above.

Figure 9B:
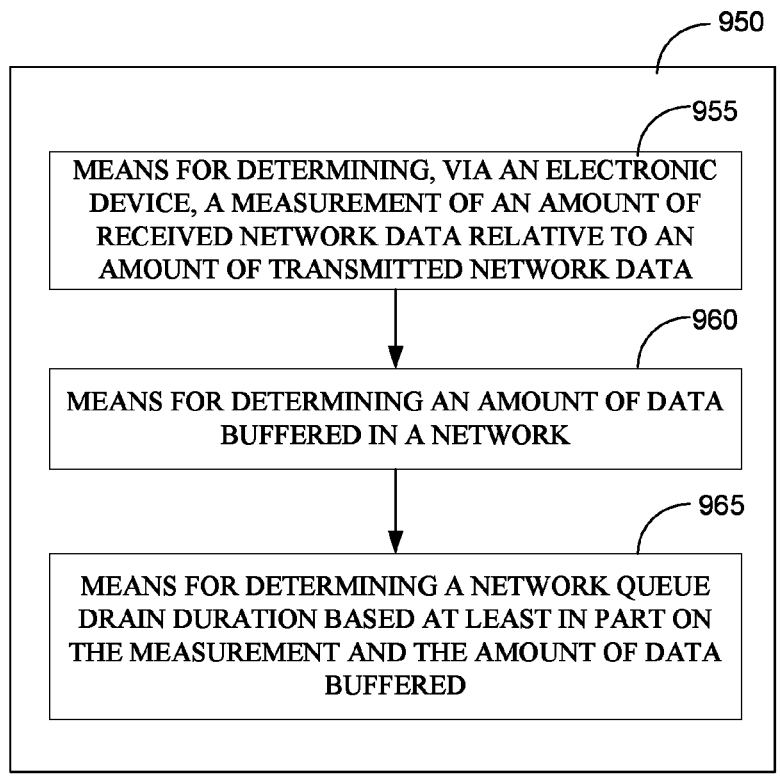
FIG. 9B is a functional block diagram of an exemplary device 950.

FIG. 9B is a functional block diagram of an exemplary device 950. In an embodiment, device 950 may be implemented as wireless device 202, illustrated in FIG. 2. The device 950 includes means 955 for determining, via an electronic device, a measurement of an amount of transmitted network data relative to an amount of received network data. In an embodiment, means 955 may be configured to perform one or more of the functions discussed above with respect to block 905. The means for determining a measurement 955 may include a processor, such as processor 204 of FIG. 2. Means 955 may also include one or more of a signal generator, transceiver, decoder, or a combination of hardware and/or software component(s), circuits, and/or module(s). The device 950 further includes means 960 for determining an amount of data buffered in a network. In an embodiment, means 960 may be configured to perform one or more of the functions discussed above with respect to block 910. The means 960 for determining an amount of data buffered in a network may include a processor, such as processor 204 of FIG. 2. Means 960 may also include one or more of a processor, signal generator, transceiver, decoder, or a combination of hardware and/or software component(s), circuits, and/or module(s). The device 950 further includes means 965 for determining the network queue drain duration based at least in part on the measurement and the amount of data buffered. In an embodiment, means 965 may be configured to perform one or more of the functions discussed above with respect to block 915. In an embodiment, the means for determining a network queue drain duration based at least in part on the measurement and the amount of data buffered may include a processor, such as processor 204 of FIG. 2. Means 965 may also include one or more of a signal generator, transceiver, decoder, or a combination of hardware and/or software component(s), circuits, and/or module(s).

Figure 10A:
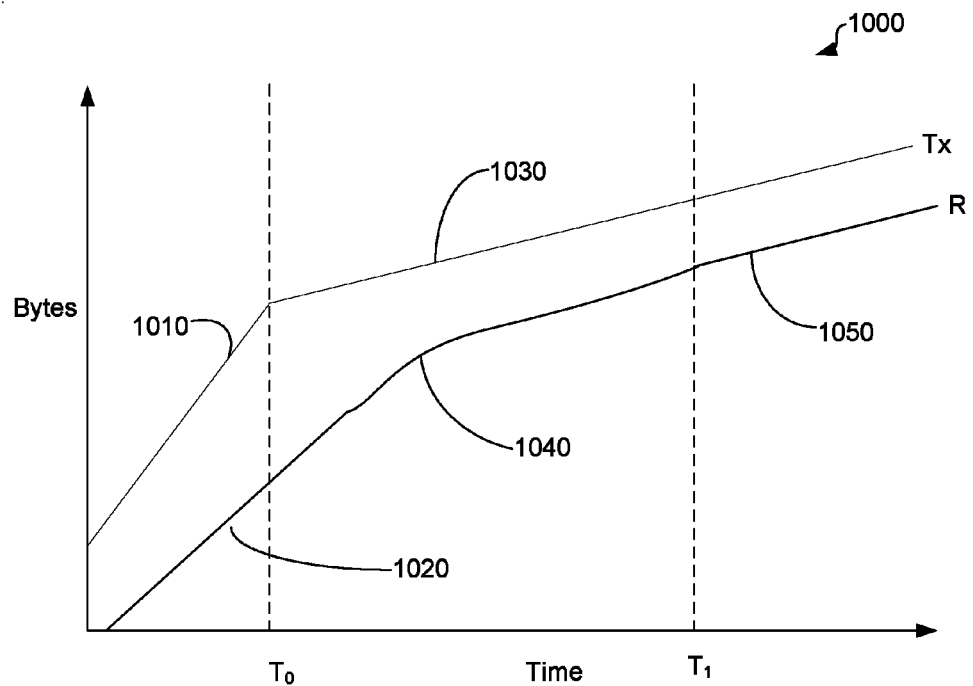
FIG. 10A is a graph illustrating the relationship between a transmission and reception rate.

FIG. 10A is a graph illustrating the relationship between a transmission and reception rate. The top line labeled "Tx" represents a transmission rate over time, while the lower line labeled "R" represents a receive rate over time. During a first time period before $T_0$, the transmission rate exceeds the receive rate. This can be observed in that the slope of the transmission rate line at 1010 is greater than the slope of the receive line at 1020. This relationship between the slope of the two lines results in increasing distance between the two lines before time $T_0$. This increasing distance represents data buffered in the network. At time $T_0$, the transmission rate is reduced. This can be seen as a decreased slope of the top line Tx at 1030 when compared to the slope of the transmission line at 1010. During the time period between $T_0$ and $T_1$, the receiver initially continues to receive at a high rate. Because the rate of transmission has decreased after $T_0$, the receiver is able to reduce the amount of data buffered in the network during the time period between $T_0$ and $T_1$. As the amount of data buffered in the network decreases, the rate of reception may also be reduced, as can be observed by the inflection in the receive rate at 1040. In an embodiment, the time between $T_0$, when the transmission rate is reduced, and $T_1$, when the ratio of the reception rate to the transmission rate is approximately one (1), may be considered a network queue drain duration. After time $T_1$, the transmission rate and reception rate are approximately equal, as can be seen by the relatively equivalent slopes of the transmission line Tx and reception line R after $T_1$. The distance between the transmission rate and the reception rate may represent a nominal amount of data buffered in the network after a steady state transmission and reception rate is achieved.

Figure 10B:
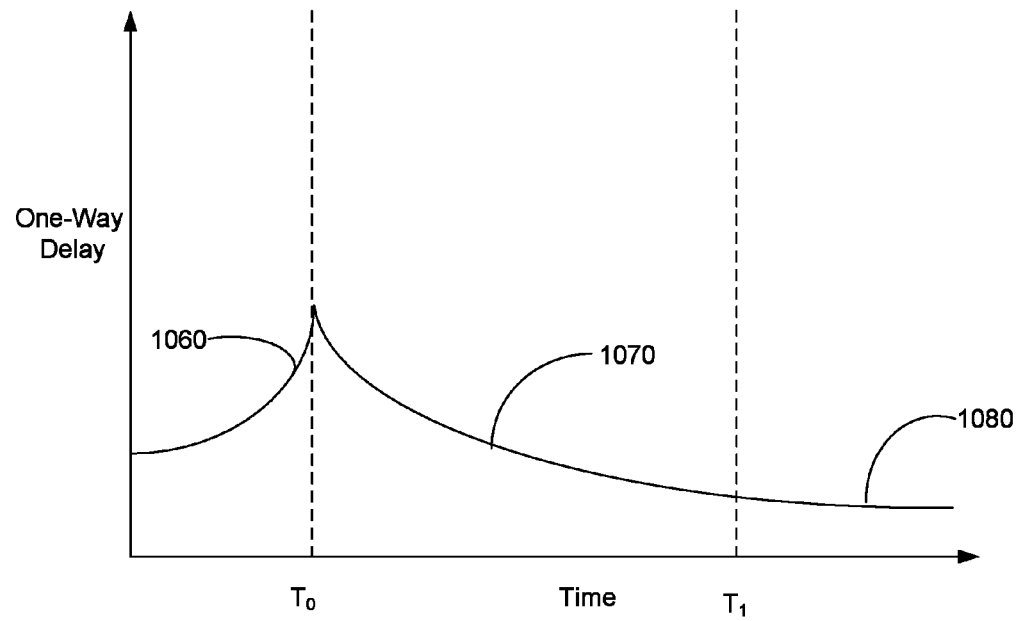
FIG. 10B is a graph illustrating one-way network delay.

FIG. 10B is a graph illustrating network delay. The time axis of FIG. 10B is spatially correlated with the time axis of FIG. 10A. During the portion of the graph of FIG. 10B before time $T_0$, delay increases as the transmission rate exceeds the reception rate and data in the network is buffered as shown at 1060. At time $T_0$, the transmission rate is reduced, as shown in the graph of FIG. 10A. As data buffered in the network drains and the amount of buffered data is reduced, delay is reduced, as shown at 1070. At time $T_1$, when the amount of data buffered in the network is nominal as shown by FIG. 10A, nominal delays are also experienced, as shown in FIG. 10B at 1080.

FIG. 11A illustrates a process flow diagram for a method of determining a one way network transmission delay. In some network environments, dividing a network round trip time by two may not provide a reliable indication of a one way network transmission delay. For example, if one direction suffers disproportionately high delay, an inaccurate one way transmission delay may be determined with this approach. In embodiments that utilize a one way transmission delay to determine a transmission rate, dividing the round trip time by two may result in inappropriate changes to the transmission rate based on an inaccurate estimate of the one way transmission delay.

In an embodiment, process 1100 may be performed by the wireless device 202 illustrated in FIG. 2. In processing block 1105, a round trip network transmission time may be determined. In an embodiment, block 1105 may be performed substantially in accordance with process 800, illustrated in FIG. 8A. In block 1110, an indication of an elapsed duration of time between a reception of a first message and a reception of a second message is received. This elapsed duration of time may be known as an inter-arrival duration. In an embodiment, the indication may be transmitted by a receiver of the first and second message. In an embodiment, process 1100 may also include sending the first and second message to the receiver. In this embodiment, an elapsed duration of time between sending the first and second message may be known as an inter-transmittal duration.

In block 1115, a one way network transmission delay is determined based on the round trip network transmission time and the indication. In an embodiment, the one way network transmission delay may be determined based on the inter-arrival duration. In an embodiment, the one way network transmission delay may also be determined based on an inter-transmittal duration.

For example, the determined round trip time may be weighted by a ratio of the inter-arrival duration and inter-transmittal duration discussed above to determine a one way network transmission delay. In an embodiment, forward and reverse direction delays may be determined as:

$$D_r(t_n) = \Delta'_{RR}(t_n) \quad (16)$$

$$D_F(t_n) = \Delta'_{RR}(t_n) - D_r(t_n) \quad (17)$$

Where:
$D_r(t_n)$ is a reverse direction network one way transmission delay
$D_F(t_n)$ is a forward direction network one way transmission delay
$\Delta'_{RR}(t_n)$ is the determined round trip time The forward direction one way time may be the network one way transmission time when transmitting data from the node performing process 1100 to a receiving node. The reverse direction one way time may be the network one way transmission time when the node performing process 1100 receives network data from the receiving node. In another embodiment, forward and reverse direction one way transmission times may be determined as below:

$$D_r(t_n) = \left( \frac{\text{inter-arrival duration }(tn)}{\text{inter-transmittal duration }(tn)} \right) \cdot \Delta'_{RR}(t_n)/2, \quad (18)$$

$$\text{clip } [D_r(t_n), \{0, \Delta'_{RR}(t_n)\}]$$

$$D_F(t_n) = \Delta'_{RR}(t_n) - D_r(t_n) \quad (19)$$

FIG. 11B is a functional block diagram of an exemplary device 1150. In an embodiment, device 1150 may be implemented as wireless device 202, illustrated in FIG. 2. The device 1150 includes means 1155 for determining a round trip network transmission time. In an embodiment, means 1155 may be configured to perform one or more of the functions discussed above with respect to block 1105. The means for determining a round trip network transmission time may include a processor, such as processor 204 of FIG. 2. Means 1155 may also include one or more of a signal generator, transceiver, decoder, or a combination of hardware and/or software component(s), circuits, and/or module(s). The device 1150 further includes means 1160 for receiving an indication of an elapsed time between a reception of a first message and a reception of a second message. In an embodiment, means 1160 may be configured to perform one or more of the functions discussed above with respect to block 1110. The means 1160 for receiving an indication of an elapsed duration of time between the reception of a first message and a second message may include a receiver, such as receiver 212 of FIG. 2. Means 1160 may also include one or more of a processor, signal generator, transceiver, decoder, or a combination of hardware and/or software component(s), circuits, and/or module(s). The device 1150 further includes means 1165 for determining a one way network transmission delay based on the round trip network transmission time and the indication. In an embodiment, means 1165 may be configured to perform one or more of the functions discussed above with respect to block 1115. In an embodiment, the means for determining a one way network transmission time based on the round trip network transmission delay and the indication may include a processor, such as processor 204 of FIG. 2. Means 1165 may also include one or more of a signal generator, transceiver, decoder, or a combination of hardware and/or software component(s), circuits, and/or module(s).

FIG. 12 illustrates one embodiment of a transmitter report 1200. The transmitter report 1200 includes data fields that may be utilized for achieving encoder adaptation. In an embodiment, these fields may be derived from a custom feedback structure, such as an RTP-extension. In an embodiment, the fields may be derived from a RTCP AVP and/or AVPF standard structures.

As discussed above, to dynamically adapt encoder parameters as described above based on conditions of a network between a transmitter and a receiver, a feedback loop between the transmitter and the receiver may be established. Some embodiment may utilize receiver reports, such as receiver report 400 described above to communicate information on received data to the transmitter. In some other embodiments, a transmitter report, such as transmitter report 1200, may be transmitted to a receiver. The receiver may then determine a target transmission or encoding rate. The receiver may then transmit this information to a transmitter or encoder. In some embodiments, transmitter reports and receiver reports may be utilized.

In an embodiment, transmitter reports may be transmitted to the receiver at a periodic interval, which may be configurable. In an embodiment, transmitter reports may be event-triggered. For example, transmitter reports may be transmitted when changes to one or more network conditions cross one or more predetermined thresholds. The size and structure of the transmitter report, such as the number of fields, size of the fields, or the type of the fields, may vary from that shown in FIG. 12, and may also vary based on the network statistics being reported. In some embodiments, transmitter reports may piggy-back on other network communication packets between the transmitter and the receiver. For example, in an embodiment utilizing the Real Time Protocol (RTP), transmitter reports may be appended as a custom RTP extension payload format for video packets.

In some embodiments, transmitter reports may be structured and communicated using the RTCP AVP and/or AVPF standards. For example, in an embodiment utilizing RTCP AVPF feedback protocols, the above information may be derived from a combination of fields in the Regular/Immediate mode RTCP Sender/Receiver Reports, Generic NACK, Picture Loss Indication (PLI), TMMBR/TMMBN tuples and Full Intra Request (FIR) messages.

The fields of the transmitter report 1200 may refer to a context of the transmitter of the transmitter report. The transmitter report 1200 may include a far tag time received field 1205. The far tag time received field 1205 may have been previously received by the transmitter of the transmitter report 1200. The transmitter report 1200 also includes a duration held tag time 1210. In an embodiment, the duration held tag time field 1210 indicates a duration of time between when the far tag time provided in field 1205 was received and the transmitter report was transmitted. The transmitter report 1200 also includes a near tag time sent field 1215. In some embodiments, the near tag time sent field 1215 will be returned as the far tag time received field 1205, contained in a transmitter report originating from a device receiving transmitter report 1200. In some embodiments, the receiver of the transmitter report 1200 is expected to transmit the near tag time field 1215 back to the transmitter of the transmitter report. The transmitter report 1200 also includes a cumulative transmission count field 1220. In one embodiment, the cumulative transmission count field 1220 indicates a cumulative number of transmitted messages transmitter by the transmitter of the report. The transmitter report 1200 also includes a cumulative loss count field 1225. The cumulative loss count 1225 indicates a cumulative number of lost messages or packets detected by the transmitter generating the transmitter report 1200. The transmitter report 1200 further includes a cumulative transmitted AU count field 1230. The cumulative transmitted AU count field 1230 indicates the cumulative number of video access units transmitted by the transmitter of the transmitter report. The transmitter report 1200 further includes two cumulative bytes transmitted fields 1235 (high order bits) and 1240 (low order bits). The cumulative bytes transmitted fields 435 and 440 indicate a total number of bytes transmitted within a network communication channel by the transmitter transmitting the transmitter report 1200. The transmitter report 1200 also includes an AU metadata field 1245. The AU metadata field indicates frame information. In an embodiment, transmitter reports may vary in size depending on whether they only carry delay related information, known as short transmitter reports, or if they also include network throughput and loss statistics, known as full transmitter reports.

As shown, the transmitter report contains aggregate byte counts and transmitter time-line information. Information contained in a transmitter report may be used to determine a moving average transmission rate, $R'_v(t)$, which is used as an indicator of throughput. In an embodiment, $R'_v(t)$ may represent a rate in kilobits per second. In one embodiment, $R'_v(t)$ may be derived as a rectangular moving average as:

$$R'_v(t) = \frac{\left(\int_{t-\Delta t}^{t} b(t)\right)}{\Delta t} |\Delta t \geq \Delta t_f; R_f = K(\text{Constant}) \quad (20)$$

where:
b(t) is the bytes transmitted at time t on a transmitter clock
$\Delta t$ is an interval for calculating an average
$\Delta t_f$ is a minimum interval for a reliable average, and
$R_f$ is the current receiving rate The interval $\Delta t_f$ should be determined to ensure a reliable average that is robust to network jitter. To provide for an ability to adapt to a drop in network throughput within an acceptable timeframe, transmitter reports providing byte counts and timing information used in calculating a throughput may be provided at a finer resolution than $\Delta t_f$, denoted as $\Delta t_{tr}$, where $\Delta t_{tr} \ll \Delta t_f$. In an embodiment, a receiver may store previously received transmitter reports. The receiver may search the stored transmitter reports for a most recent report such that $\Delta t_{tr} \geq \Delta t_f$ at a static encoding rate $R'_v$.

The throughput estimate may be improved by use of an averaging strategy to smooth network jitter. In an embodiment, a single-tap (LP) infinite impulse response (IIR) filter may be employed as:

$$R'_v(t_n) = \beta \cdot R'_v(t_n-1) + (1-\beta) \cdot R'_v(t_n) \quad (21)$$

where:
$R'_v(t_k)$ is the one-tap IIR average throughput estimate at time $t_k$ (k=n, n−1)
$R'_v(t_n)$ is the rectangular moving average throughput calculation for the current instant $t_n$ The calculated transmission throughput above includes a delay $D_r(t_n)$ which may be composed of delays introduced when a transmitter report is transmitted, and then received and parsed by the receiver. Because of this delay, $R'_v(t_n)$ refers to a throughput estimate at the transmitter as observed at time $(t_n - D_r(t_n))$ on the receiver's clock. To use the calculated throughput, a consumption to production ratio is determined. This ratio will generally not fall below a threshold for a given number of tokens. This ratio is discussed above with respect to FIG. 5A when determined in one aspect by a transmitter and FIG. 13A when determined in one aspect by a receiver.

Figure 13A:
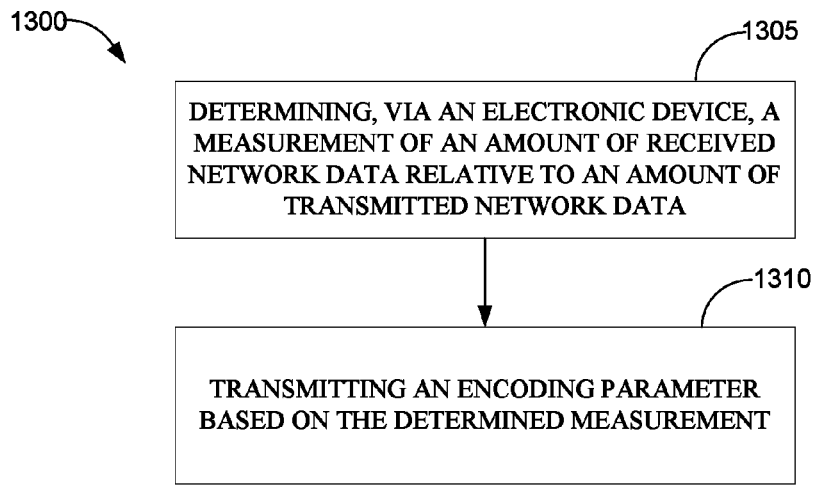
FIG. 13A illustrates a process flow diagram for a method of determining an encoding parameter.

FIG. 13A illustrates a process flow diagram for a method of encoding multimedia information. In an embodiment, process 1300 may be performed by the wireless device 202 illustrated in FIG. 2. In an embodiment, process 1300 may be performed by the device 202 of FIG. 2. In another embodiment, process 1300 may be performed by a receiver. In processing block 1305, a measurement of an amount of received network data relative to an amount of transmitted network data is determined. In some aspects, the measurement may be a ratio of received network data to transmitted network data. In an embodiment, the ratio may be calculated as:

$$\rho(t_n) = R_f(t_n)/R'_v(t_n) \quad (22)$$

where:
$t_n$ is a time n at a receiving node
$R'_v(t_n)$ is an estimated encoding rate at time n
$R_f(t_n)$ is a receiving rate at time n In an embodiment, a receiver may maintain a record of a receiving rate over time. For example, an embodiment may define a duration of time during which an amount of data received is accumulated and recorded. When the duration of time has expired, a second time period may begin, with the amount of data received during the second time period accumulated and recorded. This process repeats, resulting in a series of recorded receiving rates, representing an amount of data received over each successive time period. A receiver may obtain the amount of data encoded or transmitted during one or more periods via a transmitter report, such as transmitter report 1200 discussed above with respect to FIG. 12. In an embodiment, transmitter reports may be received periodically. In an embodiment, the transmission of transmitter reports may be event-triggered. In an embodiment, both event-triggered and periodic transmitter reports may be receiver by a receiver. In an embodiment, the frequency with which transmitter reports are received may be correlated with the frequency with which the receiving rates are accumulated and stored as discussed above. In another embodiment, the frequency of transmitter reports may be uncorrelated with the frequency at which receiving information is accumulated by a receiver.

In an embodiment, the receiving rate, such as $R_f(t_n)$, may be determined by a receiver based on data actually received by the receiver.

In an embodiment, the ratio of received network data to transmitted network data may be based on a receiving rate and a transmission rate correlated in time as discussed above. For example, the rates used to determine the ratio may be delay adjusted moving average rates. In some embodiments, the transmitting rates and receiving rates may be correlated by adjusting the transmitting rate information based on a delay. For example, transmitting information may be transmitted by a transmitter in a transmitter report to a receiver. The transmitter report may be received by the receiver after a delay period caused by at least network delays and delays associated with the transmitter assembling and packaging the transmitting information for transmission to the receiver. Because the transmitter and receiver may not share a common clock, it may not be possible to correlate transmitting information and receiving information based on a timestamp or other absolute timing information. Instead, an estimate of the delay from when transmitting information is collected to when the transmitting information is received by the receiver may be used to correlate the transmitting information with local receiving information. In an embodiment, the delay may be determined in a manner substantially in accordance with process 1100, illustrated in FIG. 11. By correlating an encoding or transmitting rate and a receiving rate for a single time period, the ratio more accurately reflects the relationship between consumption and production during the single time period.

The ratio, in an embodiment $\rho(t_n)$, may provide an indication of network conditions between a transmitter and a receiver. For example, if the ratio is approximately one (1), this may indicate that a rate of transmission at a time $t_n$ minus a delay $D_r(t_n)$ was sustainable. In some embodiments, a ratio within a distance $\alpha$ from one (1) may also be considered to indicate sustainable network conditions. A ratio of approximately one (1) or one (1)±α does not necessarily indicate 100% channel utilization.

If the ratio is less than one, or less than (1−α) as described above, it may indicate a current encoding or transmission rate, for example, $R'_v(t_n)$ in an embodiment utilizing equation (1), is not sustainable. To verify a low ratio indicates a transmission rate is not sustainable, a receiver may maintain a record of receiver delay-adjusted moving average output rates, for example, $\{r'_v(t_n), r'_v(t_{n-1}), r'_v(t_{n-2}), \ldots\}$. The ratio may then be calculated as:

$$\rho(t_n) = R_f(t_n)/r'_v(t_n) \quad (23)$$

where:
$t_n$ is a receiver instant in time when transmitter report 'n' is received
$R_f(t_n)$ is a receiving rate at time $t_n$
$r'_v(t_n)$ is estimated over the interval $[t_{n-1} - D_T(t_{n-1}), t_n - D_T(t_n)]$, and
$D_T(t_n)$ is an average reverse direction delay for transmitter report arrival at time $t_n$ If the ratio is greater than one, or greater than one (1)+α as described above, it may indicate that buffered data in the network is being received at a rate higher than new data is being encoded and sent over the network. A ratio greater than one may be experienced after a network recovers from a period of reduced throughput. During the period of reduced throughput, transmission of data by a data source into the network based on an encoding rate may exceed a capacity of the network to transfer data to the receiver. Some of this excess data may be buffered, and some of the excess data may be dropped. When the network recovers and throughput of the network increases, the buffered data in the network may be sent to the receiver. This data may be received by the receiver at a rate that exceeds the transmission rate.

At block 1310, an encoding parameter is transmitted based on the determined measurement. In an embodiment, the encoding parameter is transmitted to a transmitting node. In an embodiment, the encoding parameter transmitted may be a recommended encoded parameter for the transmitting node to use when encoding or transmitting data.

Encoding parameters transmitted based on the measurement may include bit rate parameters, temporal adaptation parameters, spatial adaptation parameters, or error resiliency parameters, as discussed previously. The transmitted encoding parameters may be different than one or more current encoding parameters used by the transmitting node.

In an embodiment, if the determined measurement is a ratio, and the ratio is less than one, or (1±α) as described above, the one or more transmitted encoding parameters may function to reduce the size of encoded multimedia data generated by an encoder at the transmitting node. In an embodiment, encoding parameters may be adjusted to render encoded data more resilient to errors if the determined ratio is less than one, or less than (1±α). For example, the encoding bit rate may be reduced if the determined ratio is less than one, or (1±α) as described above. In an embodiment, a recommendation to increase the encoding bit rate may be transmitted to the transmitting node if a predetermined number of sequential ratios are more than one, or (1±α) as described above.

In an embodiment, a recommended encoding parameter may not be transmitted until a sequential threshold number $F_\rho$ of ratios are determined to be less than one (1) or (1−α). For example, if a ratio is determined for each sequential token or quanta, a predetermined number $F_\rho$ of sequential tokens having a ratio less than (1−α) may be necessary before a recommended encoding parameter is transmitted. This may avoid over reacting to spurious deviations in network state.

In an embodiment, an encoding parameter may be transmitted when fewer than $F_\rho$ sequential ratios are determined to be less than (1−α) and a forward link delay is above a second threshold, for example, denoted as $D_F(t_n) \geq D_F^U$.

In an embodiment, the receiver side throughput influence on a transmission rate may be expressed with the following Boolean functional:

$$B(R_v(t_n+1) < (R_v(t_n)) = \{\rho(t_n) < (1-\alpha) \& f_\rho \geq F_\rho\} | \{\rho(t_n) < (1-\alpha) \& D_F(t_n) \geq D_F^U\} \quad (24)$$

where:
$t_n$ is a receiver time instant when a transmitter report 'n' is received
$R'_v(t_n)$ is an encoding rate estimate at time instant $t_n$
$\rho(t_n)$ is the ratio of received network data to transmitted network data (eq (23))
$f_\rho$ is a number of sequential determined ratios indicating low throughput
$F_\rho$ is a threshold number of sequential determined ratios indicating low-throughput
$D_F(t_n)$ is a forward-path delay estimate at receiver time instant $t_n$, and
$D_F^U$ is a forward-path high delay threshold Note that while in the embodiment discussed above, a receiver may recommend or suggest to a transmitter some transmission or encoding parameter adjustments when the ratio is less than one or less than $(1-\alpha)$, it should be understood that other embodiments may determine a ratio that is the inverse of the ratio disclosed in the embodiment above. In these other embodiments, recommended or suggested transmission or encoding parameters may be transmitted in an opposite manner as those described above. For example, in these embodiments, if the determined ratio is more than one, or $(1\pm\alpha)$, one or more encoding parameters may be recommended or suggested to a transmitter. These recommendations may reduce the size of encoded multimedia data generated by an encoder on the transmitting node. In an embodiment, encoding parameters may be transmitted by the receiver to the transmitter which suggest or recommend to render encoded data more resilient to errors if the determined ratio is more than one, or more than $(1+\alpha)$. For example, the encoding bit rate may be reduced if the determined ratio is more than one, or $(1+\alpha)$ as described above. In an embodiment, a receiver may recommend to the transmitter an encoding bit rate be increased if a predetermined number of sequential ratios are less than one, or $(1-\alpha)$.

Figure 13B:
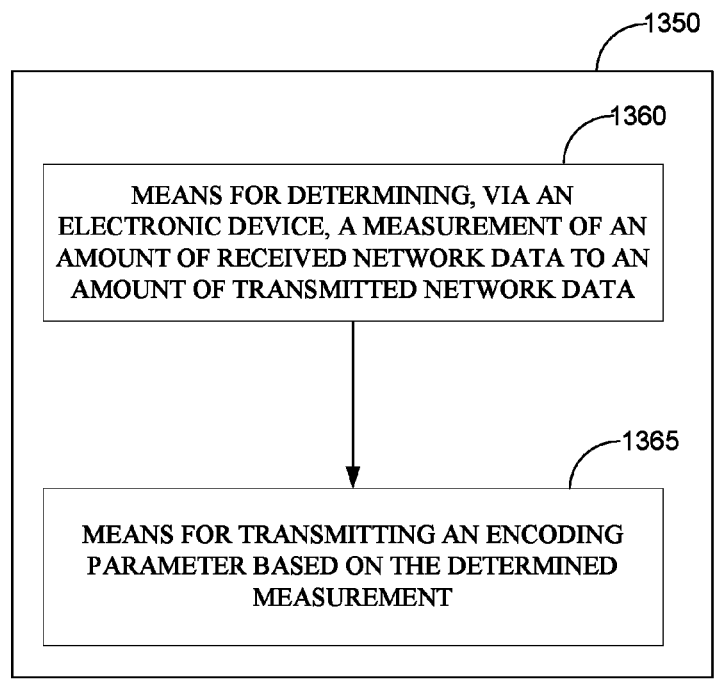
FIG. 13B is a functional block diagram of an exemplary device 1350.

FIG. 13B is a functional block diagram of an exemplary device 1350. In an embodiment, device 1350 may be implemented as wireless device 202, illustrated in FIG. 2. The device 1350 includes means 1360 for determining, via an electronic device, a measurement of an amount of received network data relative to an amount of transmitted network data. In an embodiment, means 1360 may be configured to perform one or more of the functions discussed above with respect to block 1305. The means for determining a measurement 1360 may include a processor, such as processor 204 of FIG. 2. Means 1360 may also include one or more of a signal generator, transceiver, decoder, or a combination of hardware and/or software component(s), circuits, and/or module(s). The device 1350 further includes means 1365 for transmitting an encoding parameter based on the determined measurement. In an embodiment, means 1365 may be configured to perform one or more of the functions discussed above with respect to block 1310. The means 1365 for transmitting an encoding parameter based on the determined measurement may include a transmitter, such as transmitter 210 of FIG. 2. Means 1365 may also include one or more of a processor, signal generator, transceiver, decoder, or a combination of hardware and/or software component(s), circuits, and/or module(s).

Figure 13C:
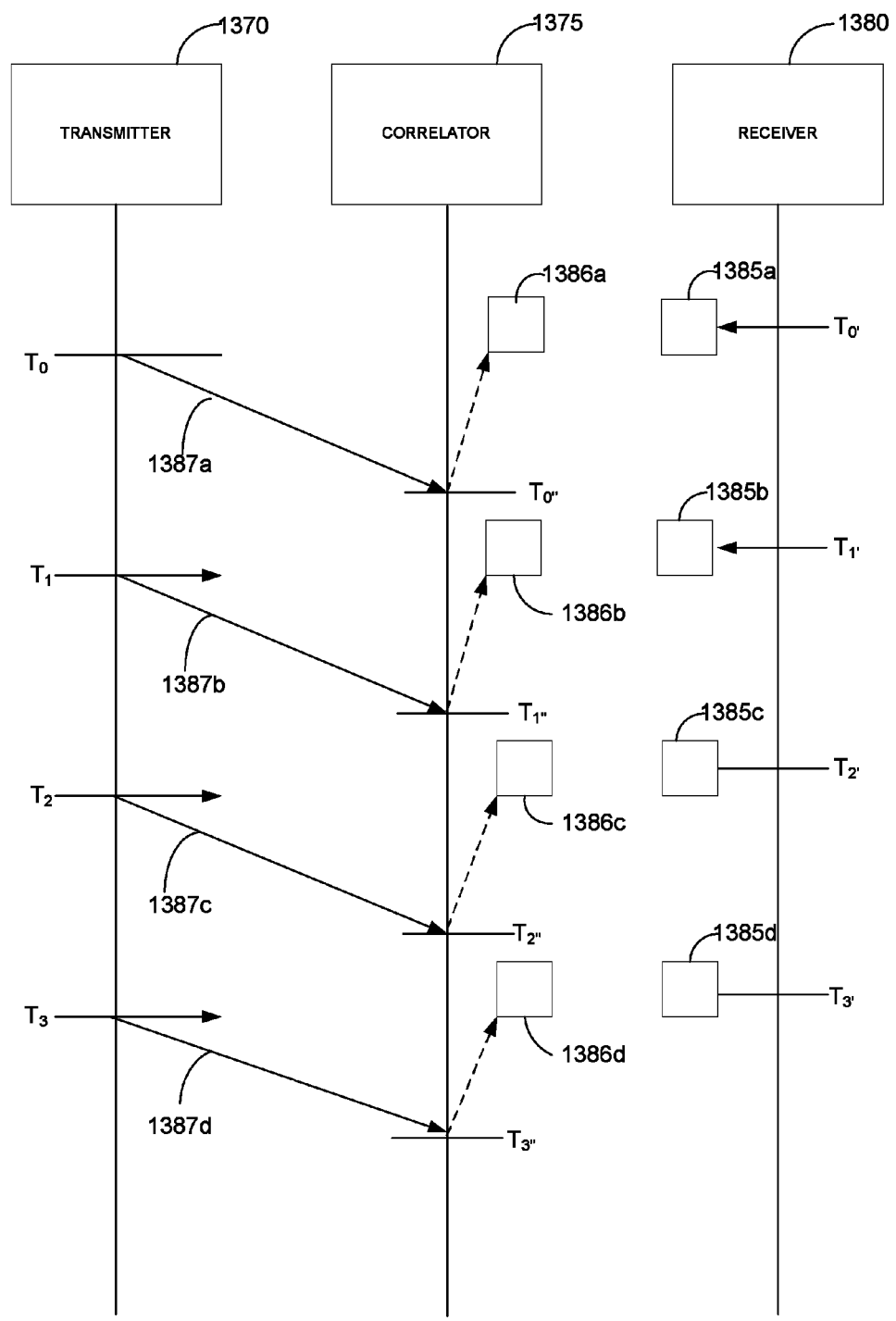
FIG. 13C is an example of a timing diagram illustrating the correlation of transmitting information with receiving information.

FIG. 13C is a timing diagram illustrating the correlation of transmitting information with receiving information at a receiver. FIG. 13C shows a transmitter 1370, receiver 1380, and a correlator 1375. In an embodiment, any of the transmitter 1370, correlator 1375, or receiver 1380 may be implemented by the wireless device 202, illustrated in FIG. 2. In some aspects, the correlator 1375 may be performed or executed on the same physical device as the receiver 1380. As shown in FIG. 13C, the receiver 1380 generates receiving information 1385a-d periodically. FIG. 13C shows receiving information 1385a-d generated at times $T_{0'-3'}$ respectively. Transmitter 1370 is shown transmitting transmitter reports 1387a-d to correlator 1375. These transmitter reports are generated by the transmitter 1380 at times $T_{0-3}$ respectively. Because of at least network delays, transmitter reports 1387a-d are received by the correlator 1375 at times $T_{0''-3''}$ respectively. Based on a determination of a network delay, correlator 1375 may correlate the receiving information 1385a-d with transmitting information 1386a-d. This is shown in FIG. 13C as the dashed arrows associating transmitting information 1386a-d with receiving information 1385a-d. In an embodiment, correlator 1375 and receiver 1380 may be implemented in the same wireless device.

Note that some implementations include transmitting nodes that send transmitter reports to a receiving node, while the receiving node transmits receiver reports to the transmitting node. In these implementations, aspects of FIGS. 5C and 13C may be combined. For example, the transmitting node may receive receiver reports and correlate information in the receiver report with transmitting information referenced to a transmitting node time reference. The receiving node may receive transmitter reports and correlate information in the transmitter report with receiving information referenced to a receiving node time reference. In these aspects, the receiving node may determine one or more encoding or transmission parameters and transmit the parameters to the transmitting node. The transmitting node may then adapt one or more encoding parameters based on the transmitted parameters.

Figure 14A:
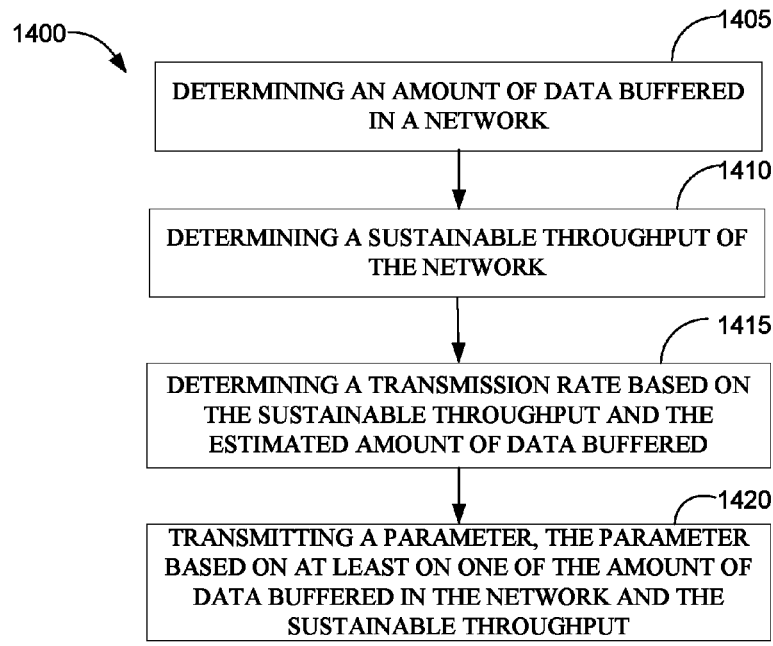
FIG. 14A illustrates a process flow diagram for a method of determining an encoding parameter.

FIG. 14A illustrates a process flow diagram for a method of transmitting a parameter to a transmitting node. In an embodiment, process 1400 may be performed by a receiving node. In an embodiment, the transmitted parameter may represent a recommendation, suggestion or directive for a node receiving the parameter to adjust an encoding process based on the parameter. In an embodiment, process 1400 may be performed by the wireless device 202 illustrated in FIG. 2. In processing block 1405, an amount of data buffered in a network is determined.

In an embodiment, the amount of data buffered may be determined based at least in part on a period of time during which an amount of data transmitted via the network exceeded the network's capacity during the period. In an embodiment, this period of time may be determined as:

$$T_R \approx F_\rho \cdot \Delta t_{TR} \quad (25)$$

where:

$T_R$ is a reaction time $F_\rho$ is a token threshold for throughput based rate reduction, and $\Delta t_{TR}$ is a transmitter report interval In an embodiment, the amount of data buffered in the network may be based at least in part on how much the amount of data transmitted exceeds the network's capacity during the time period. In an embodiment, if a transmission rate is $R'_v(t_n)$, the amount the transmission rate exceeds the network's capacity at an instant in time $t_n$ may be expressed as:

$$R_{surplus} = R'_v(t_n) - R_f(t_n) \quad (26)$$

where:

$R'_v(t_n)$ is an estimated transmitter throughput at time instant $t_n$ $R_f(t_n)$ is a receiver throughput at time instant $t_n$ In an embodiment, the amount of data buffered in a network may then be:

$$b_R = R_{surplus} \cdot T_R \text{ or} \quad (27)$$

$$b_R = (R'_v(t_n) - R_f(t_n)) \cdot F_\rho \cdot \Delta t_{TR} \quad (28)$$

In some other aspects, block 1405 may be performed in substantial accordance with the description of block 605, discussed above with respect to FIG. 6A. In processing block 1410, a sustainable throughput of the network is determined. In an embodiment, the sustainable throughput may be based, at least in part, on a margin of safety. The margin of safety may be determined so as to provide an opportunity for data buffered during a period of reduced network capacity (for example, due to network congestion or hardware failure) to complete transmission after the network's capacity improves. In some embodiments, the margin of safety may be based, at least in part, on a percentage of a determined network capacity. For example, in an embodiment, ten percent of a determined network capacity may be reserved to provide an excess capacity. In some aspects, block 1410 may be performed in substantial accordance with the description of block 610, discussed above with respect to FIG. 6A.

In block 1415, a recommended or suggested transmission rate is determined based on the sustainable throughput and the amount of data buffered. In an embodiment, the suggested or recommended transmission rate should be determined such that the amount of data buffered in a network is eliminated or drained within a time period $t_R$. In some environments, a value of one second for time period $t_R$ provides good results. In an embodiment, the transmission rate may be determined as:

$$r_v(t_{n+1}) = R_f(t_n)(1 - R_H^{\%}) - b_R \quad (29)$$

where:
$R_H^{\%}$ represents a percentage of network capacity based on the margin of safety discussed above, and
$b_R$ represents the amount of data buffered in the network as discussed above with respect to Equation 14 $t_R$ is assumed to be unity (1 second)

In an embodiment, a final rate $R_v(t_n+1)$ may be obtained by quantizing $r_v(t_n+1)$ to a value from an operational range of rates $R_v(D)$ as:

$$R_v(t_{n+1}) = \text{Quant}(R_v(D)[r_v(t_{n+1})]), \text{ where } R_v \leq r_v \quad (30)$$

In block 1420, a parameter is transmitted. The parameter is based at least on at least one of the amount of data buffered in the network and the sustainable throughput. In some aspects, the transmission rate is transmitted. Other parameters transmitted may include bit rate parameters, temporal adaptation parameters, spatial adaptation parameters, or error resiliency parameters, as discussed previously with respect to block 1310. Some implementations of process 1400 do not include block 1415.

Figure 14B:
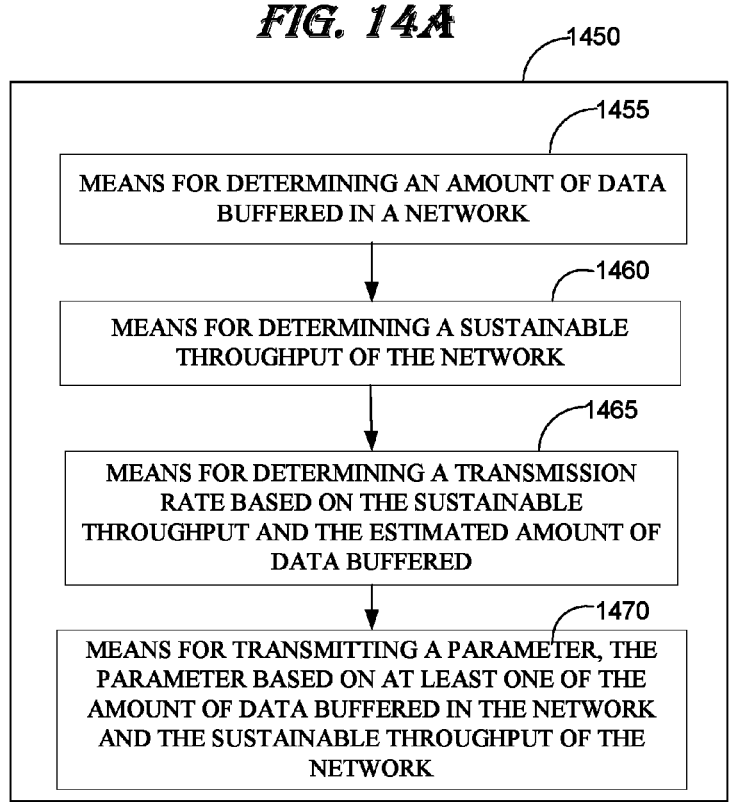
FIG. 14B is a functional block diagram of an exemplary device 1450.

FIG. 14B is a functional block diagram of an exemplary device 1450. In an embodiment, device 1450 may be implemented as wireless device 202, illustrated in FIG. 2. The device 1450 includes means 1455 for determining an amount of data buffered in a network. In an embodiment, means 1455 may be configured to perform one or more of the functions discussed above with respect to block 1405. The means for determining an amount of data buffered may include a processor, such as processor 204 of FIG. 2. Means 1455 may also include one or more of a signal generator, transceiver, decoder, or a combination of hardware and/or software component(s), circuits, and/or module(s). The device 1450 further includes means 1460 for determining a sustainable throughput of the network. In an embodiment, means 1460 may be configured to perform one or more of the functions discussed above with respect to block 1410. The means 1460 for determining an amount of data buffered in a network may include a processor, such as processor 204 of FIG. 2. Means 1460 may also include one or more of a processor, signal generator, transceiver, decoder, or a combination of hardware and/or software component(s), circuits, and/or module(s). The device 1450 further includes means 1465 for determining a transmission rate based on the sustainable throughput and the amount of data buffered. In an embodiment, means 1465 may be configured to perform one or more of the functions discussed above with respect to block 1415. The means 1465 for determining an amount of data buffered in a network may include a processor, such as processor 204 of FIG. 2. Means 1465 may also include one or more of a processor, signal generator, transceiver, decoder, or a combination of hardware and/or software component(s), circuits, and/or module(s). Some implementations of device 1450 do not include means 1465. The device 1450 further includes means 1470 for transmitting a parameter based on at least one of the amount of data buffered in the network and the sustainable throughput of the network. In an embodiment, means 1470 may be configured to perform one or more of the functions discussed above with respect to block 1420. The means 1470 for transmitting a parameter based on at least one of the amount of data buffered in the network and the sustainable throughput of the network may include a transmitter, such as transmitter 210 of FIG. 2. Means 1470 may also include one or more of a processor, signal generator, transceiver, decoder, or a combination of hardware and/or software component(s), circuits, and/or module(s).

Figure 15A:
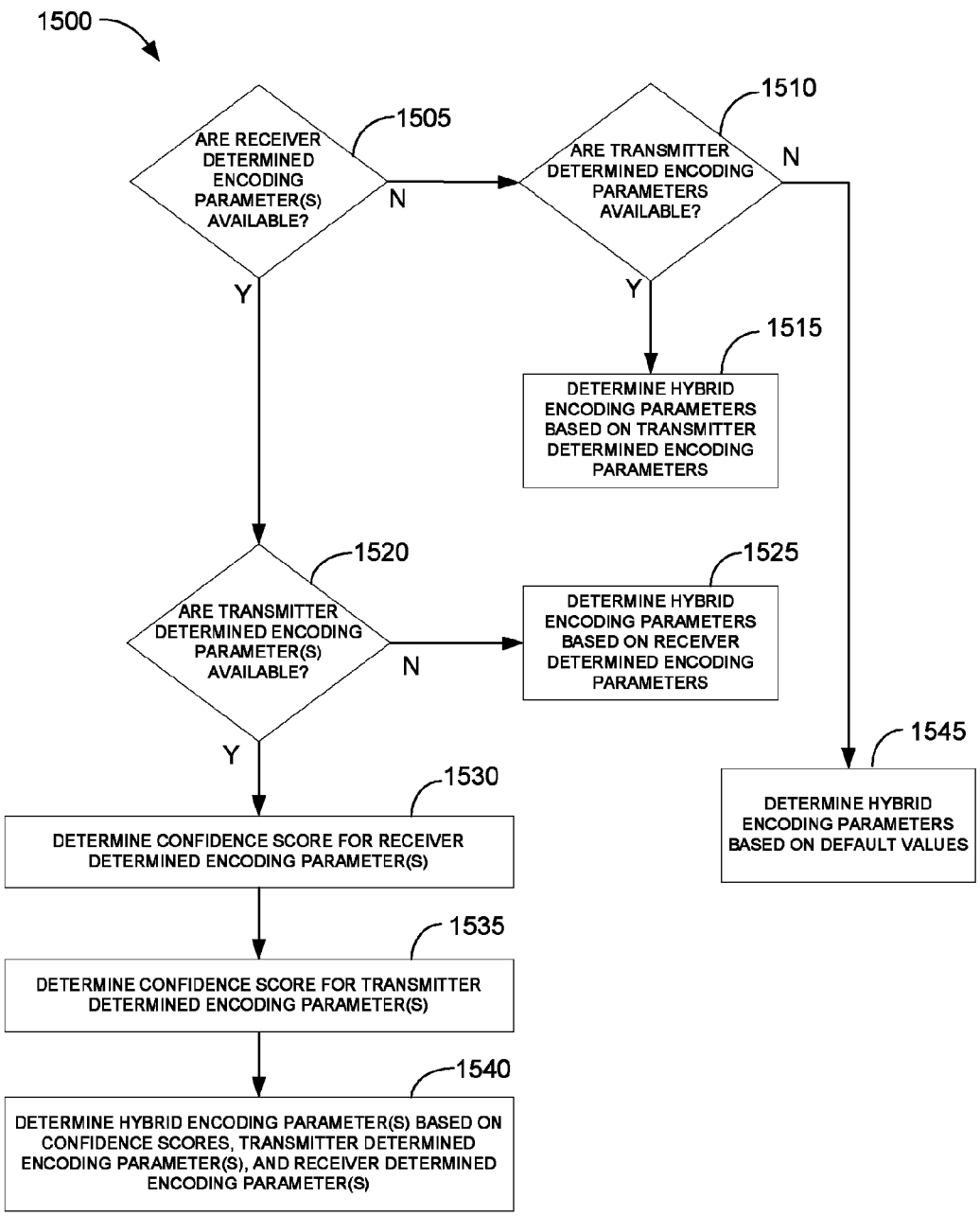
FIG. 15A illustrates a process flow diagram for a method of determining encoding parameters.

FIG. 15A illustrates a process flow diagram for a method of determining an encoding parameter. In an embodiment, process 1500 may be performed by the wireless device 202 illustrated in FIG. 2. In some aspects, process 1500 may be performed by a transmitting node encoding and transmitting information on a network. The transmitting node may determine an encoding rate at which it transmits data to the receiving node. For example, the node may perform process 500 and/or process 600 as described above with respect to FIGS. 5A and 6A. Process 1500 may be performed in some aspects as part of block 510 of process 500, and/or block 620 of process 600, and/or block 1310 of process 1300, and/or block 1420 of process 1400. In some aspects, the determined encoding rate may be based on receiver reports, such as receiver report 400, received from a receiving node that receives the transmitted data.

In some aspects, the transmitting node may transmit transmitter reports, such as transmitter report 1200 described above with respect to FIG. 12, to the receiving node. The transmitting node may also receive a suggested or recommended encoding or transmitting parameter from the receiving node.

In some implementations only one of the receiving or transmitting nodes may determine one or more encoding parameters. In these embodiments, data transmitted by the transmitting node may be based on the encoding parameters determined by the one node. In some other implementations, both the transmitting node and the receiving node may determine encoding parameters. In these implementations, the transmitting node may reconcile the two sets of encoding parameters (determined by the transmitting node and receiving node) to determine a "final" set of encoding parameter(s). This "final" encoding parameter set may be used to encode data before transmission to the receiving node. Process 1500 illustrates one possible implementation of a process to reconcile encoding parameters. The example process 1500 determines "final" or "hybrid" encoding parameters under three scenarios. Those scenarios include 1) only parameters determined by the transmitting node are available; 2) only parameters determined by the receiving node are available; or 3) both parameters determined by the transmitting node and parameters determined by the receiving node are available.

Block 1505 determines whether receiver determined encoding parameters are available. In some implementations, a receiver may not determine encoding parameters. In some implementations, a transmitting node may not transmit a transmitter report, such as transmitter report 1200 to the receiver. In these implementations, the receiver may not have the information available to determine one or more transmission or encoding parameters. In these implementations, process 1500 moves from decision block 1505 to block 1510, which determines whether transmitter determined encoding parameters are available. If transmitter determined encoding parameters are available, process 1500 moves to block 1515, where hybrid encoding parameters are determined based on the transmitter determined encoding parameters.

In some other implementations, the receiver may determine one or more encoding parameters. For example, in some of these implementations, a transmitter report such as transmitter report 1200 may be sent to the receiver. The receiver may then perform process 1300 and/or process 1400 and transmit one or more encoding or transmission parameters to the transmitting node. In these implementations, process 1500 moves from decision block 1505 to decision block 1520, which determines whether transmitter determined encoding parameters are available. Some implementations may rely entirely on a receiver to determine one or more encoding parameters. In these implementations, determinations by the receiver may be more accurate than determinations by a transmitting node. In these implementations, process 1500 moves from block 1520 to block 1525, where hybrid encoding or transmission parameter(s) are determined based on receiver determined encoding parameter(s).

If both transmitter determined and receiver determined encoding parameter(s) are available, process 1500 moves from decision block 1520 to block 1530, where a confidence score is determined for the receiver determined encoding parameter(s). The confidence score may be based on one or more of a history of encoding parameter recommendations or suggestions by the receiver, the timing of encoding parameter recommendations or suggestions by the receiver, signaling availability of the receiver, and/or a history of encoder rate adaptation (for example, if the encoder has recently increased an encoding or transmitting rate, decreased the encoding or transmitting rate, or maintained the encoding or transmitting rate).

In block 1535 a confidence score is determined for the transmitter determined one or more encoding parameters. The confidence score may be based on one or more of a history of encoding parameter recommendations or suggestions by the transmitter, the timing of encoding parameter recommendations or suggestions by the transmitter, signaling availability of the transmitter, and/or a history of encoder rate adaptation (for example, if the encoder has recently increased an encoding or transmitting rate, decreased the encoding or transmitting rate, or maintained the encoding or transmitting rate).

In block 1540, hybrid encoding parameters are determined based on the confidence scores, the transmitter determined encoding parameter(s), and the receiver determined encoding parameter(s).

In some other embodiments, blocks 1530-1540 may not be performed. Instead, hybrid encoding parameters may be determined to achieve a minimum change resulting in a current encoding rate if either the transmitter encoding parameter(s) or the receiver determined encoding parameter(s) are utilized. In still other embodiments, block 1530-1540 may not be performed. Instead, hybrid encoding parameters may be determined based on a minimum transmission or encoding rate resulting from application of either the transmitter determined encoding parameter(s) or the receiver determined encoding parameter(s).

Figure 15B:
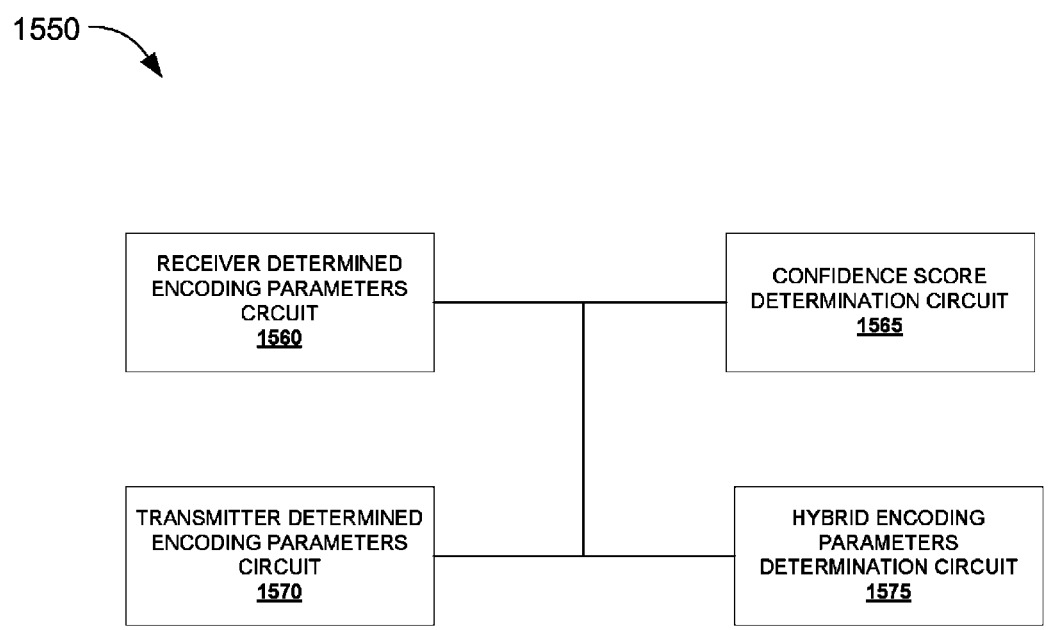
FIG. 15B is a functional block diagram of an exemplary device 1550.

FIG. 15B shows a functional block diagram for a wireless communication apparatus. Those skilled in the art will appreciate that a wireless communication apparatus may have more components than the simplified wireless communication apparatus 202 shown in FIG. 2. The wireless communication apparatus 1550 shown includes only those components useful for describing some prominent features of implementations within the scope of the claims. In some aspects, apparatus 1550 may include one or more of the components or circuits of apparatus 550, 650, 850, 950, 1150, 1350, 1450, or 1650. The wireless communication apparatus 1550 may include a receiver determined encoding parameter(s) circuit 1560, a confidence score determination circuit 1565, a transmitter determined encoding parameters circuit 1570, and a hybrid encoding parameters determination circuit 1575.

In some implementations, the receiver determined encoding parameters circuit 1560 may be configured to perform one or more of the functions discussed above with respect to blocks 1505. The receiver determined encoding parameters circuit 1560 may include one or more of a programmable chip, a processor, a memory, and a network interface. For example, the receiver determined encoding parameters circuit 1560 may include the processor 204. In some implementations, a means for determining receiver determined encoding parameters may include the receiver determined encoding parameters circuit 1560.

In some implementations, the confidence score determination circuit 1575 may be configured to perform one or more of the functions discussed above with respect to blocks 1530, and/or 1540. The confidence score determination circuit 1565 may include one or more of a programmable chip, a processor, a memory, and a network interface. For example, the confidence score determination circuit 1565 may include the processor 204. In some implementations, a means for determining a confidence score may include the confidence score determination circuit 1565.

In some implementations, the transmitter determined encoding parameters circuit 1570 may be configured to perform one or more of the functions discussed above with respect to blocks 1510, and/or 1520. The transmitter determined encoding parameters circuit 1570 may include one or more of a programmable chip, a processor, a memory, and a network interface. For example, the transmitter determined encoding parameters circuit 1570 may include the processor 204. In some implementations, a means for determining transmitter determined encoding parameters may include the transmitter determined encoding parameters circuit 1570.

In some implementations, the hybrid encoding parameters determination circuit 1575 may be configured to perform one or more of the functions discussed above with respect to blocks 1515, 1525, and/or 1540. The trans hybrid encoding parameters determination circuit 1575 may include one or more of a programmable chip, a processor, a memory, and a network interface. For example, the hybrid encoding parameters determination circuit 1575 may include the processor 204. In some implementations, a means for determining hybrid encoding parameters may include the hybrid encoding parameters circuit 1575.

Figure 16A:
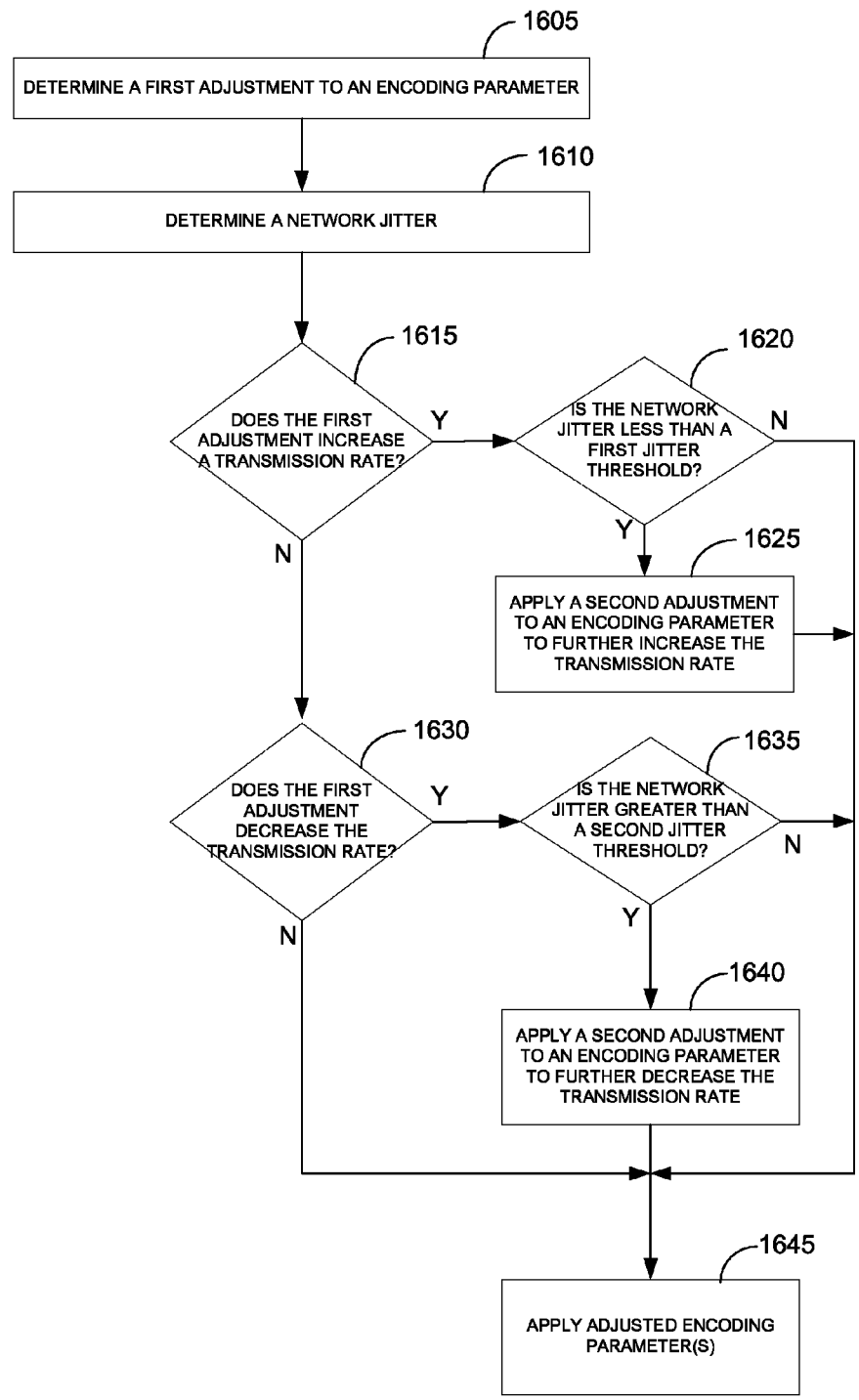
FIG. 16A illustrates a process flow diagram for a method of determining an encoding parameter based on a network jitter.

FIG. 16A illustrates a process flow diagram for a method of determining an encoding parameter. In some aspects, process 1600 utilizes jitter information as auxiliary information for the purpose of dynamic bitrate adaptation. Jitter information may be utilized to accelerate an encoding or transmission rate increase or decrease when certain conditions are met.

In an embodiment, process 1600 may be performed by the wireless device 202 illustrated in FIG. 2. In some aspects, process 1600 may be performed by a node or device encoding and transmitting information on a network. The encoding or transmitting node may determine an encoding rate. For example, the encoding or transmitting node may perform process 500 and/or process 600 as described above with respect to FIGS. 5A and 6A. In some aspects, process 1600 may be performed by a receiving node determining an encoding parameter for a transmitting or encoding node. The receiving node may perform one or more of processes 1300, and/or 1400. Therefore, in various aspects, process 1600 may be performed as part of one or more of blocks 510, 615, 620, 1310, and/or 1415.

Some implementations define at least two jitter thresholds:

$J_{th}^{dec}$: Jitter threshold for rate decrease
$J_{th}^{inc}$: Jitter threshold for rate increase The above jitter thresholds may be determined based on moving averages of inter-arrival jitter of each packet after a classification defined as below.

include current inter-arrival jitter value in a moving window to compute $J_{th}^{dec}$ if $$B<(1-\alpha)R \text{ or } D_0>D_{th}^{dec}$$

And compute $J_{th}^{dec}$ by moving average filtering.

Otherwise, include current inter-arrival jitter value in a moving window to compute $J_{th}^{inc}$ if $$B>(1-\beta)R \text{ and } D_0<D_{th}^{inc} \text{ } B<(1-\beta)R \text{ and } D_0<D_{th}^{inc}$$

And compute $J_{th}^{inc}$ by moving average filtering.

Where

B: throughput measured or estimate
R: encoding rate
$D_0$: amount of data buffered in a network
$D_{th}^{inc}$: threshold of amount of data buffered in a network to consider rate increase
$D_{th}^{dec}$: threshold of amount of data buffered in a network to consider rate decrease
$\alpha$, $\beta$: design parameters Since filtering of jitter data may be improved with a certain amount of data available, initial data may be used to train the jitter thresholds in some implementations. In these implementations, use of jitter thresholds to further adjust encoding parameter(s) may not be performed when the moving average jitter values are being trained. When the moving average jitter values become available after a training period, the measured network jitter may be utilized to either reduce or increase rate further. For example, network jitter may be used in some implementations when:

1. throughput or bandwidth, and or loss, and or delay indicates encoding or transmission rate should be reduced, determine if the current inter-arrival jitter J meets the following condition:

$$J>(1-\gamma)J_{th}^{dec}$$

if this condition is met, then encoding or transmission rate is further reduced by $\Delta^{dec}$.

2. throughput or bandwidth, and or loss, and or delay indicates encoding or transmission rate should be increased, determine if the current inter-arrival jitter J meets the following condition:

$$J<(1+\delta)J_{th}^{inc}, \text{ and } D_0<D_{th}^{inc}, \text{ and } B\approx R$$

if this condition is met, then encoding rate is further increased by $\Delta^{inc}$.

One example implementation of the above described method is illustrated as process 1600 and shown in FIG. 16A. In some aspects, process 1600 is performed by the wireless device 202, shown in FIG. 2. Process 1600 may be performed in some aspects as part of block 510 of process 500, and/or block 620 of process 600, and/or block 1310 of process 1300, and/or block 1420 of process 1400.

In block 1605, a first adjustment is determined to an encoding parameter. In some aspects, determining an encoding parameter that is different than an existing encoding parameter may represent an adjustment to an encoding parameter. In block 1610, a network jitter is determined. The network jitter may be packet inter-arrival jitter in some implementations. In some other aspects, the network jitter may be filtered network jitter information.

Block 1615 determines whether the first adjustment will increase a transmission rate. For example, in some aspects, one or more of processes 500, 600, 1300, or 1400 may determine an encoding parameter that if applied, will result in an increase in the transmission rate of an encoding node utilizing the determined encoding parameter. In this case, process 1600 moves from decision block 1615 to decision block 1620. In block 1620, the network jitter is compared to a first jitter threshold. If the network jitter is less than the first jitter threshold, process 1600 moves to block 1630, where a second adjustment to an encoding parameter is determined which further increases the transmission rate. In some aspects, an encoding parameter adjusted in block 1625 is also adjusted in block 1605. For example, in some aspects, an encoding bit rate is increased in block 1605 and also increased further in block 1625. In some other aspects, an error resiliency parameter may be adjusted in block 1605 and a temporal adaptation parameter and/or spatial adaptation parameter may be adjusted in block 1625. In various aspects, one or more encoding parameters adjusted in block 1625 overlap or do not overlap with one or more encoding parameters adjusted in block 1605.

If the first adjustment does not increase the transmission rate, block 1630 determines whether the first adjustment decreases the transmission rate. If the first adjustment does decrease the transmission rate, the network jitter is compared to a second jitter threshold in block 1635. In the network jitter is greater than a second jitter threshold, then a second adjustment to an encoding parameter is determined to further decrease the transmission rate. If the network jitter is less than the second jitter threshold, process 1600 moves from block 1635 to block 1645. In some aspects, the second jitter threshold is higher than the first jitter threshold.

In block 1645, the one or more adjusted encoding parameters are applied. If process 1600 is performed on an encoding or transmitting node, applying the adjusted encoding parameters may include encoding and/or transmitting data based on the adjusted encoding parameter(s). If process 1600 is performed on a receiving node, applying the adjusted encoding parameter(s) may include transmitting an indication of the adjusted encoding parameters to an encoding or transmitting node.

Figure 16B:
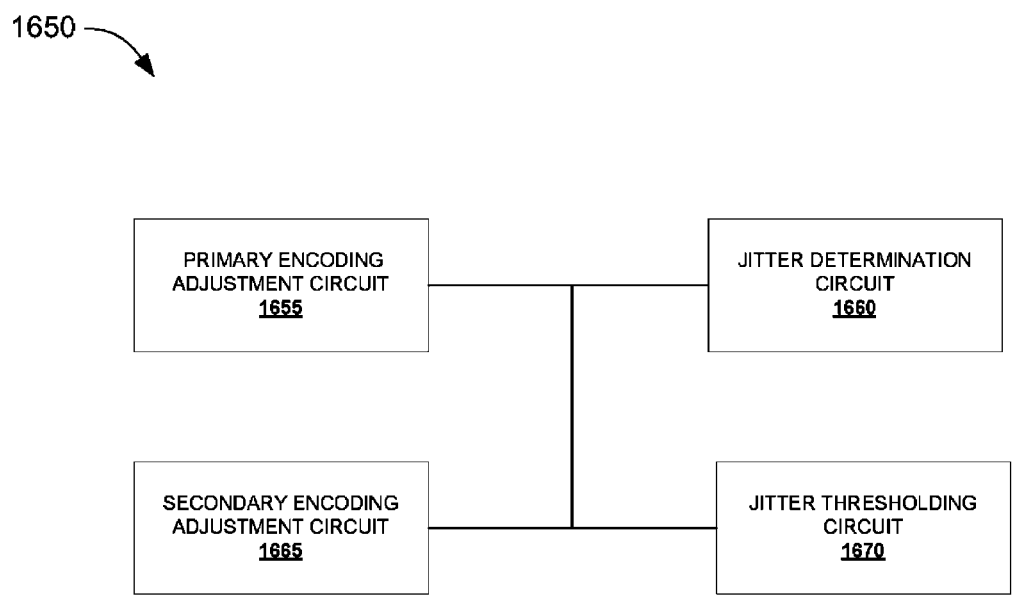
FIG. 16B is a functional block diagram of an exemplary device 1650.

FIG. 16B shows a functional block diagram for a wireless communication apparatus. Those skilled in the art will appreciate that a wireless communication apparatus may have more components than the simplified wireless communication apparatus 202 shown in FIG. 2. The wireless communication apparatus 1650 shown includes only those components useful for describing some prominent features of implementations within the scope of the claims. In some aspects, apparatus 1650 may include one or more of the components or circuits of apparatus 550, 650, 850, 950, 1150, 1350, 1450, or 1550, The wireless communication apparatus 1650 may include a primary encoding adjustment circuit 1655, a jitter determination circuit 1660, a secondary encoding adjustment circuit 1665, and a jitter thresholding circuit 1670.

In some implementations, the primary encoding adjustment circuit 1655 may be configured to perform one or more of the functions discussed above with respect to block 1605. The primary encoding adjustment circuit 1655 may include one or more of a programmable chip, a processor, a memory, and a network interface. For example, the primary encoding adjustment circuit 1655 may include the processor 204. In some implementations, a means for determining a first adjustment to an encoding parameter may include the primary encoding adjustment circuit 1655.

In some implementations, the jitter determination circuit 1660 may be configured to perform one or more of the functions discussed above with respect to block 1610. The jitter determination circuit 1660 may include one or more of a programmable chip, a processor, a memory, and a network interface. For example, the jitter determination circuit 1660 may include the processor 204. In some implementations, a means for determining a network jitter may include the jitter determination circuit 1660.

In some implementations, the secondary encoding adjustment circuit 1665 may be configured to perform one or more of the functions discussed above with respect to block 1625 and/or 1640. The secondary encoding adjustment circuit 1665 may include one or more of a programmable chip, a processor, a memory, and a network interface. For example, the secondary encoding adjustment circuit 1665 may include the processor 204. In some implementations, a means for applying a second adjustment to an encoding parameter may include the secondary encoding adjustment circuit 1665

In some implementations, the jitter thresholding circuit 1670 may be configured to perform one or more of the functions discussed above with respect to block 1670. The jitter thresholding circuit 1670 may include one or more of a programmable chip, a processor, a memory, and a network interface. For example, the jitter thresholding circuit 1670 may include the processor 204. In some implementations, a means for determining whether a network jitter is above or below a threshold may include the jitter thresholding circuit 1670. Throughout this disclosure, network nodes may be referred to as a transmitter, receiver, transmitting node, or receiving node. While most network nodes both transmit and receive data, use of these terms within this disclosure is intended to refer to a nodes respective role in the exchange of a unidirectional data stream whose transmission rate or encoding rate is being managed by the methods described here. For example, a transmitter or transmitting node is a node transmitting the unidirectional data stream whose rate is being managed by the disclosed methods. A receiver or transmitting node is a node receiving a unidirectional data stream whose rate is being managed by the disclosed methods. The words "transmitter" and "receiver" may also be used to refer to hardware components, such as transmitter 210 and receiver 212. However, one skilled in the art may easily differentiate between a transmitting node and a transmitter 210, for example, based on the context in which the word is used.

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers.

Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Similarly, the signals described above include one or more fields which may be used in various implementations. The signals may include additional fields, fewer fields, and/or alternative field arrangements without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an encoding device and/or decoding device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for determining a network queue drain duration in a network, comprising:
    determining, via an electronic device, a ratio of an amount of network data received by a receiving device relative to an amount of network data transmitted by a different transmitting device, wherein a ratio greater than one (1) indicates buffered data in the network is being received at a rate higher than new data is being encoded and transmitted over the network;
    determining via the electronic device, a sustainable network throughput based on the ratio's proximity to one (1);
    determining, via the electronic device, a duration of time when a transmission rate exceeds the sustainable network throughput;
    determining via the electronic device, how much the transmission rate exceeded the sustainable network throughput during the duration of time;
    determining, via the electronic device, an amount of data buffered in the network based at least in part on how much the transmission rate exceeded the sustainable network throughput and the duration;
    determining, via the electronic device, the network queue drain duration based at least in part on the ratio and the amount of data buffered; and
    determining, via the electronic device, an update to a transmission rate for the different transmitting device such that a time to drain the amount of data buffered in the network is within a time period, and transmitting on the network at the modified transmission rate.

2. The method of claim 1, further comprising:
    receiving, by the transmitting device, a network message from the receiving device, the network message including an aggregate quantity of data received by the receiving device; and
    determining, by the transmitting device, the amount of received network data based at least in part on the aggregate quantity.

3. The method of claim 2, further comprising:
    determining a delay in receiving the quantity of data received by the receiver; and
    determining the transmitted network data based at least in part on the delay.

4. The method of claim 1, further comprising:
    receiving a quantity of data transmitted by a transmitter; and
    determining the transmitted network data based at least in part on the quantity of data transmitted.

5. The method of claim 4, further comprising:
    determining a delay in receiving the quantity of data transmitted by the transmitter; and
    determining the received network data based at least in part on the delay.

6. An apparatus for determining a network queue drain duration in a network, comprising:
an electronic hardware processor;
an electronic hardware memory operably coupled to the electronic hardware processor, and storing instructions that configure the electronic hardware processor to:
determine a ratio of an amount of network data received by a receiving device relative to an amount of network data transmitted by a different transmitting device, wherein a ratio greater than one (1) indicates buffered data in the network is being received at a rate higher than new data is being encoded and transmitted over the network;
determine a sustainable network throughput based on the ratio's proximity to one (1);
determine a duration of time when a transmission rate exceeds the sustainable network throughput;
determine how much the transmission rate exceeded the sustainable network throughput during the duration of time;
determine an amount of data buffered in the network based at least in part on how much the transmission rate exceeded the sustainable network throughput and the duration;
determine the network queue drain duration based at least in part on the ratio and the amount of data buffered; and
determining an update to a transmission rate for the different transmitting device such that a time to drain the amount of data buffered in the network is within a time period; and
a transmitter configured to transmit on the network at the modified transmission rate.

7. The apparatus of claim 6, further comprising a receiver configured to receive a network message including an aggregate quantity of data received by the receiving device, wherein the processor is further configured to determine the amount of received network data based at least in part on the quantity.

8. The apparatus of claim 7, wherein the processor is further configured to:
determine a delay in receiving the quantity of data received by the receiving device; and
determine the transmitted network data based at least in part on the delay.

9. The apparatus of claim 6, further comprising a receiver configured to receive a network message including an aggregate quantity of data transmitted by the transmitting device, wherein the processor is further configured to determine the transmitted network data based at least in part on the aggregate quantity.

10. The apparatus of claim 9, wherein the processor is further configured to:
determine a delay in receiving the quantity of data transmitted by the transmitter; and
determine the received network data based at least in part on the delay.

11. An apparatus for determining a network queue drain duration in a network, comprising:
means for determining a ratio of an amount of network data received by a receiving device relative to an amount of network data transmitted by a different transmitting device, wherein a ratio greater than one (1) indicates buffered data in the network is being received at a rate higher than new data is being encoded and transmitted over the network;
means for determining a sustainable network throughput based on the ratio's proximity to one (1);
means for determining a duration of time when a transmission rate exceeds the sustainable network throughput;
means for determining how much the transmission rate exceeded the sustainable network throughput during the duration of time; and
means for determining an amount of data buffered in the network based at least in part on how much the transmission rate exceeded the sustainable network throughput and the duration;
means for determining the network queue drain duration based at least in part on the ratio and the amount of data buffered; and
means for determining an update to a transmission rate for the different transmitting device such that a time to drain the amount of data buffered in the network is within a time period, and transmitting on the network at the modified transmission rate.

12. The apparatus of claim 11, further comprising:
means for receiving a network message indicating an aggregate quantity of data transmitted by the transmitting device; and
means for determining the amount of transmitted network data based at least in part on the quantity.

13. The apparatus of claim 12, further comprising:
means for determining a delay in receiving the quantity of data transmitted by the transmitter; and
means for determining the received network data based at least in part on the delay.

14. The apparatus of claim 11, further comprising:
means for receiving a network message including an aggregate quantity of data received by the receiving device; and
means for determining the amount of received network data based at least in part on the quantity.

15. The apparatus of claim 14, further comprising:
means for determining a delay in receiving the aggregate quantity of data received by the receiver; and
means for determining the transmitted network data based at least in part on the delay.

16. A non-transitory, computer readable media storing instructions that when executed, cause a processor to perform a method of determining a network queue drain duration in a network, the method comprising:
determining a ratio of an amount of network data received by a receiving device relative to an amount of network data transmitting by a different transmitting device, wherein a ratio greater than one (1) indicates buffered data in the network is being received at a rate higher than new data is being encoded and transmitted over the network;
determining a sustainable network throughput based on the ratio's proximity to one (1);
determining a duration of time when a transmission rate exceeds the sustainable network throughput;
determining how much the transmission rate exceeded the sustainable network throughput during the duration of time; and
determining the amount of data buffered in the network based at least in part on how much the transmission rate exceeded the sustainable network throughput and the duration;
determining the network queue drain duration based at least in part on the ratio and the amount of data buffered; and determining an update to a transmission rate for the different transmitting device such that a time to drain the amount of data buffered in the network is within a time period, and transmitting on the network at the modified transmission rate.

17. The non-transitory computer readable medium of claim 16, the method further comprising:
receiving a quantity of data received by a receiver; and
determining the received network data based at least in part on the quantity.

18. The non-transitory computer readable medium of claim 17, the method further comprising:
determining a delay in receiving the quantity of data received by the receiving device; and
determining the transmitted network data based at least in part on the delay.

19. The non-transitory computer readable medium of claim 16, the method further comprising:
receive a network message indicating an aggregate quantity of data transmitted by the transmitting device; and
determine the transmitted network data based at least in part on the quantity.

20. The non-transitory computer readable medium of claim 17, the method further comprising:
determining a delay in receiving the quantity of data transmitted by the transmitter; and
determining the received network data based at least in part on the delay.

* * * * *